(12) United States Patent
Takagi et al.

(10) Patent No.: US 6,261,649 B1
(45) Date of Patent: Jul. 17, 2001

(54) OPTICAL FILM

(75) Inventors: Akira Takagi, Kawasaki; Tadahiro Kaminade, Yokohama; Takuya Matsumoto, Yokohama; Yosuke Numao, Yokohama; Takayuki Hirayama, Kawasaki; Masato Sone, Tsukuba, all of (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/008,007

(22) Filed: Jan. 16, 1998

(30) Foreign Application Priority Data

Jan. 17, 1997 (JP) .................................................. 9-038272
Apr. 10, 1997 (JP) .................................................. 9-091791

(51) Int. Cl.⁷ ........................... C09K 19/38; G02F 1/1335
(52) U.S. Cl. ...................... 428/1.1; 349/117; 252/299.01; 428/1.3
(58) Field of Search ....................... 252/299.01; 349/134, 349/117; 428/1.1, 1.3

(56) References Cited

U.S. PATENT DOCUMENTS

| | | | |
|---|---|---|---|
| 5,460,748 | 10/1995 | Mazaki et al. | 252/299.01 |
| 5,578,243 | 11/1996 | Mazaki et al. | 252/299.01 |
| 5,599,478 | * 2/1997 | Matumoto et al. | 252/299.01 |
| 5,943,110 | * 8/1999 | Yoda et al. | 349/134 |
| 5,989,758 | * 11/1999 | Komatsu et al. | 430/20 |
| 6,008,401 | * 12/1999 | Komatsu et al. | 558/423 |

* cited by examiner

Primary Examiner—Shean C. Wu
(74) Attorney, Agent, or Firm—Scully, Scott Murphy & Presser

(57) ABSTRACT

A high-quality optical compensator for use in liquid crystal display elements can be prepared from a film comprising an end unit modified liquid crystalline polymer which has a monofunctional structural unit and which exhibits an optically positive uniaxiality, and, as needed, a liquid crystalline polymer which has a logarithmic viscosity at least 0.01 dl/g higher than that of the end unit modified liquid crystalline polymer and a glass transition point at least 5° C. higher than that of the end unit modified liquid crystalline polymer and which exhibits an optically positive uniaxiality, wherein a nematic hybrid orientation which is formed in the liquid crystal state is immobilized.

6 Claims, 18 Drawing Sheets

Rubbing Direction
(Side View of Compensating Film)

OPTICAL FILM

FIELD OF THE INVENTION

The present invention relates to an optical film. More particularly, the present invention relates to a film having an immobilized nematic hybrid orientation for use as an optical element, an optically compensating film which uses this film and is used in a liquid crystal display element, and a twisted nematic liquid crystal display device provided with this film.

BACKGROUND OF THE INVENTION

An active-matrix twisted-nematic liquid-crystal-display device (hereinafter abbreviated as "TN-LCD"), which uses a TFT element or an MIM element, exhibits excellent image quality comparable to that of CRT when viewed from the front face while holding inherent features such as a thin type, light weight and low consumption of electricity. Because of these features, a TN-LCD is widely used as a display device for note-type personal computers, portable televisions and portable information terminals. However, since a conventional TN-LCD is inherently associated with a problem of angle of visual field in that the display color varies or the display contrast decreases when the display is viewed obliquely because the liquid crystalline molecules have an anisotropy in refractive index. Accordingly, there is a strong demand for the solution of this problem, and various attempts have been made.

Methods already proposed and put to trial include, for example, a method wherein a pixel is divided into portions and applied voltages to these portions vary at a certain ratio (halftone gray scale method), a method wherein a pixel is divided into portions and the rising directions of liquid crystalline molecules in these portions vary (domain division method), a method wherein a lateral electric filed is applied to the liquid crystal (IPS method), a method wherein a vertically oriented liquid crystal is actuated (VA liquid crystal method), and a method wherein a bend-oriented cell and an optical compensator are combined (OCB method).

Although these methods are effective to some extent, they encounter eventual difficulty in production and cost-up, because these methods require to use different type of oriented films, electrodes, orientation made of liquid crystals and the like and because these changes require the establishment of production technologies and the installation of new production equipment.

Meanwhile, there is a method wherein an angle of visual field is widened by incorporating an optically compensating film into a conventional TN-LCD without changing the structure of the TN-LCD. This method, which requires neither change of the existing production facility of the TN-LCD nor additional equipment, is excellent in terms of costs and can be easily employed. Accordingly, this method is now drawing attentions and many proposals have been made in connection with this method.

The problem of the angle of visual field of a TN-LCD in a normally white (NW) mode is ascribed to the oriented state of the liquid crystal in a cell at the time that the voltage is applied and black is displayed. In this state, the liquid crystal is oriented in a nearly perpendicular direction and exhibits an optically positive uniaxiality. Therefore, the use of a film which exhibits an optically negative uniaxiality as an optically compensating film for the purpose of widening the angle of visual field is proposed in order to compensate the positive uniaxiality at the state of displaying black of a liquid crystal cell. It is also proposed to further widen the angle of visual field by use of a film of an optically negative uniaxiality having a tilted optical axis for the purpose of compensation, because the liquid crystal molecules in a region near to the boundary of the orienting film in a cell are oriented parallel to or tilted against the plane of the cell even when the crystal cell is in a black display.

For example, Japanese Patent Application Laid-Open (JP-A) Nos. 4-349,424 and 6-250,166 propose an optically compensating film using a cholesteric film having a tilted axis of helix and an LCD using this optically compensating film. However, it is difficult to produce a cholesteric film having a tilted axis of helix, and in fact the above-mentioned documents do not describe any method for tilting the axis of helix.

JP-A Nos. 5-249,547 and 6-331,979 propose an LCD using a negative uniaxial compensator having a tilted optical axis, and an concrete example of embodiment disclosed therein uses a multilayer thin film compensator.

JP-A Nos. 7-146,409 and 8-5,837 propose an optically compensating film prepared by the tilt-orientation of a discotic liquid crystal as a negative uniaxial compensator having a tilted optical axis and an LCD using this optically compensating film. However, the optical structure of the discotic liquid crystal is complicated and therefore the synthesis thereof is complicated. In addition, since the discotic liquid crystal is a liquid crystal having a low molecular weight, the formation of films of this liquid crystal requires a complicated process including a photo-induced crosslinking step. Accordingly, the industrial production encounters difficulties and eventual cost-up.

As another embodiment of the optically compensating film, also proposed is an oriented film using a liquid crystalline polymer having a positive uniaxiality.

For example, JP-A Nos. 7-140,326 proposes a compensator which is designed for use in LCD and which is composed of a twisted tilt-oriented liquid crystalline polymer and used for widening the angle of visual field of the LCD. This liquid crystalline polymer uses a liquid crystalline polymer compound (composition) composed of a bifunctional monomer. However, the procurement of the bifunctional monomer which is produced in an industrial scale is not easy, and it is not easy to induce a tilted orientation and a twisted orientation simultaneously in the industrial production of the compensator.

JP-A Nos. 7-198,942 and 7-181,324 propose a similar technique by utilizing a compensator for widening angle of visual field, which compensator comprises an oriented film of nematic liquid crystalline polymer, whose optical axis and the plane of the liquid crystalline film cross each other, and also an LCD using this compensator. This technique, however, does not sufficiently widen the angle of visual field, because this technique uses a compensator in which the optical axis is simply tilted.

OBJECT OF THE INVENTION

An object of the present invention is to solve the above-mentioned problems of prior art.

More specifically, the object is to provide a film which has the characteristics described below and which is designed for use as an optical element and particularly as an optically compensating film for a liquid crystal display element.

A constituent material is a liquid crystalline polymer which is easily derived from easily obtainable raw materials for the production thereof, and the process of the film production are simple.

A complicated technique for improving performance such as the introduction of twist is not employed, contrary to the case of conventional optically compensating films comprising a liquid crystalline polymer, but the angle of visual field is widened to such an extent unattainable by a simple tilt-oriented film.

Properties such as heat resistance and humidity resistance are reliable enough to ensure the marketability of the product.

SUMMARY OF THE INVENTION

Firstly, the present invention is a film for use as an optical element, comprising a first liquid crystalline polymer (hereinafter referred to as "end-unit-modified liquid crystalline polymer" on occasion) which has at one end or both ends of polymer chain thereof a monofunctional structural unit and which exhibits an optically positive uniaxiality, wherein a nematic hybrid orientation created in a liquid crystalline state is immobilized.

In a preferred mode, the film for use as an optical element comprises the first liquid crystalline polymer and a second liquid crystalline polymer which has a logarithmic viscosity at least 0.01 dl/g higher than that of the first crystalline polymer and a glass transition point at least 5° C. higher than that of the first liquid crystalline polymer and which exhibits an optically positive uniaxiality.

Secondly, the present invention is an optically compensating film for a liquid crystal display element using the above-mentioned film.

Thirdly, the present invention is a twisted nematic liquid crystal display device comprising at least an active liquid crystal cell having a pair of transparent substrates each provided with an electrode and a nematic liquid crystal and an upper polarizer and a lower polarizer positioned, respectively, over and under the substrate, wherein at least one film described above is positioned either between the substrate and the upper polarizer or between the substrate and the lower polarizer or both between the substrate and the upper polarizer and between the substrate and the lower polarizer.

DETAILED DESCRIPTION OF THE INVENTION

The detail of the present invention is given below.

The optically compensating film of the present invention significantly alleviates the problem of dependence on angle of visual field of a TN-LCD. Firstly, mention is made of a TN-LCD to which the optically compensating film is directed.

According to types of drive, TN-LCDs can be classified into, for example, a simple matrix system and an active matrix system in which an active element is used as an electrode such as a TFT (thin film transistor) electrode, an MIM (metal insulator metal) electrode and a TFD (thin film diode) electrode. The optically compensating film of the present invention is effective to any of the above-mentioned drive systems.

A halftone gray scale system (divided pixel system) and a divided domain system, both of which are hitherto known, widen the angle of visual field of an LCD from the side of a liquid crystal cell. The optically compensating film of the present invention is also effective to such an LCD having somewhat improved angle of visual field, and the angle of visual field can be further widened.

In the optically compensating film of the present invention, a nematic hybrid orientation is immobilized. The term "nematic hybrid orientation" as used herein means a state of a nematic orientation of a liquid crystalline polymer wherein the angles between the directors of the liquid crystalline polymer and the plane of the film differ between the upper face and the lower face of the film. Since the angle between a director and the plane of the film in the vicinity of the upper face of the film differs from the angle between a director and the plane of the film in the vicinity of the lower face of the film, it can be said that the angle varies continuously between the upper face of the film and lower face of the film.

Since the optically compensating film of the present invention is a film in which a nematic hybrid orientation is immobilized, a director of the liquid crystalline polymer in any position in the direction of film thickness makes a different angle with the plane of the film. Accordingly, as a structural body in the form of a film, the optically compensating film of the present invention has no longer any optical axis.

The liquid crystalline polymer of the present invention is described below. First of all, the detail of the monofunctional structural unit for the end-unit-modified liquid crystalline polymer is explained.

The term "monofunctional structural unit" as used herein means a structure incorporated into a polymer molecule by producing the polymer in the presence (during or after polymerization reaction of the polymer) of a monomer having one functional group, which corresponds to the functional groups of a bifunctional monomer to be used for the formation of the liquid crystalline polymer through a polycondensation process. The monofunctional structural unit is normally attached to one end or both ends of the polymer chain. Accordingly, the number of the monofunctional structural unit present in a polymer molecule is 1 to 2.

More specifically, an example of the end-unit-modified crystalline polymer having a monofunctional structural unit is a structure obtained by producing the polymer in the presence of a monohydric alcohol or a monocarboxylic acid having in the molecule thereof at least one long-chain $C_{(3-20)}$ alkyl or at least one long-chain $C_{(2-20)}$ fluoroalkyl group or in the presence of an ester derived from the monohydric alcohol or monocarboxylic acid.

Preferable examples of the structural unit are given below by way of general formulas.

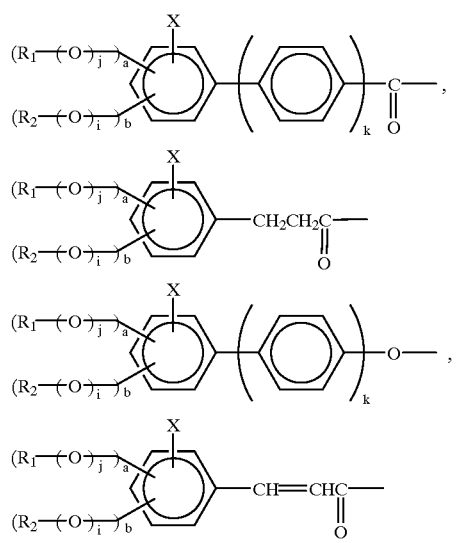

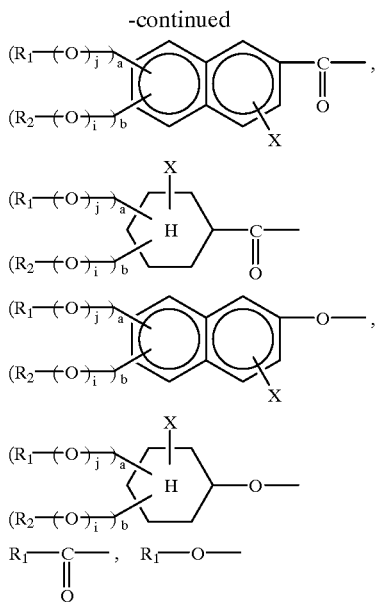

In the general formulas described above, $R_1$ and $R_2$ may be the same or different; $R_1$ and $R_2$ each represent a long-chain $C_{(3-20)}$ alkyl or a long-chain $C_{(2-20)}$ fluoroalkyl group; X represents hydrogen or halogen such as fluorine and chlorine; i is 0 or 1; j is 0 or 1; k is 0 or 1; a is 0 or 1, b is 0 or 1, provided $a+b \neq 0$.

Preferable examples of $R_1$ and $R_2$ include the following groups.

$CH_3CH_2CH_2-$, $CH_3CH(CH_3)CH_2-$, $C(CH_3)_3-$, $(CH_3)_2CH-$, $CH_3(CH_2)_3-$,
$C_5H_{11}-$, $C_9H_{19}-$, $C_6H_{13}-$, $C_8H_{17}-$, $C_7H_{15}-$, $C_{10}H_{21}-$
$C_{12}H_{25}-$, $C_{14}H_{29}-$, $C_{18}H_{37}-$, $C_{16}H_{33}-$, $C_{20}H_{41}-$,
$CF_3CH_2-$, $CF_3CF_2-$, $(CF_3)_2CF-$, $(CF_3)_2CF(CF_2)_2-$,
$C_6F_{13}-$, $C_8F_{17}-$,
$CF_3(CF_2)_3CH_2CH_2-$, $(CF_3)_2CF(CF_2)_8-$, $CHF_2CF_2CH_2-$,
$CF_3CH_2CH_2-$,
$(CF_3)_2CF(CF_2)_8CH_2CH_2-$, $CF_3(CF_2)_7CH_2CH_2-$,
$H(CF_2)_4CH_2-$,
$CF_3(CF_2)_9CH_2CH_2-$, $CF_3(CF_2)_3(CH_2)_6-$, $CF_3CF_2(CH_2)_6-$, $CHF_2CF_2CH_2-$
$CF_3(CF_2)_5CH_2CH_2-$, $H(CF_2)_6CH_2-$, $H(CF_2)_4CH_2-$, $H(CF_2)_8CH_2-$,

Preferable examples of the monofunctional structural unit of the present invention produced from the monohydric alcohol, monocarboxylic acid and a functional derivative of these compounds include the following units.

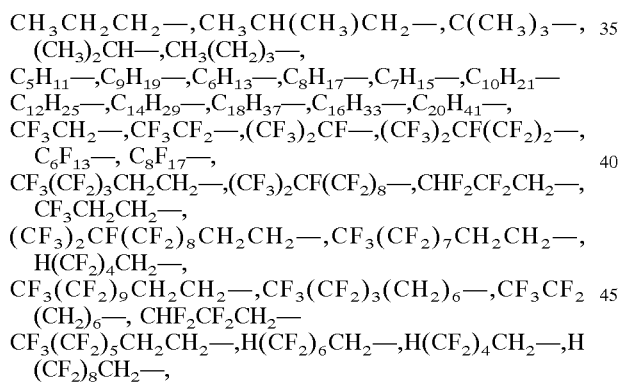

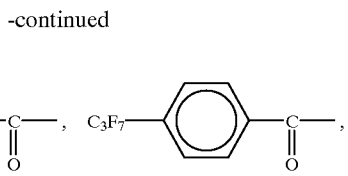

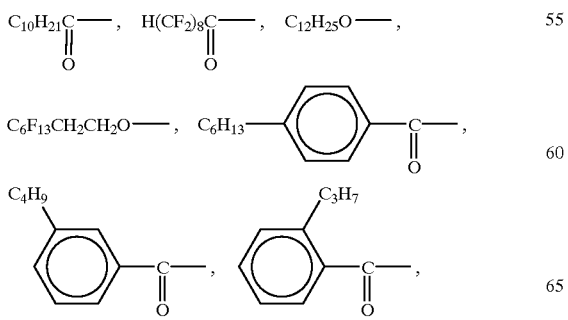

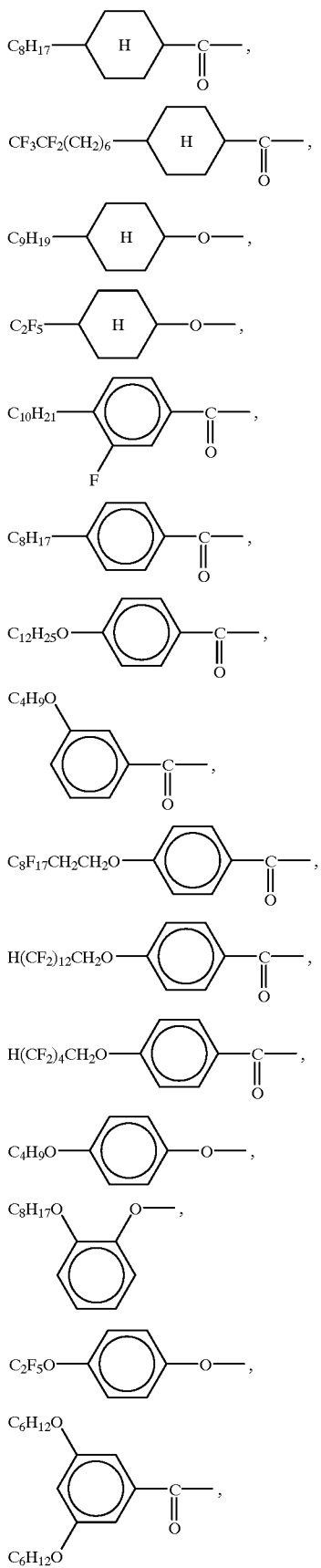
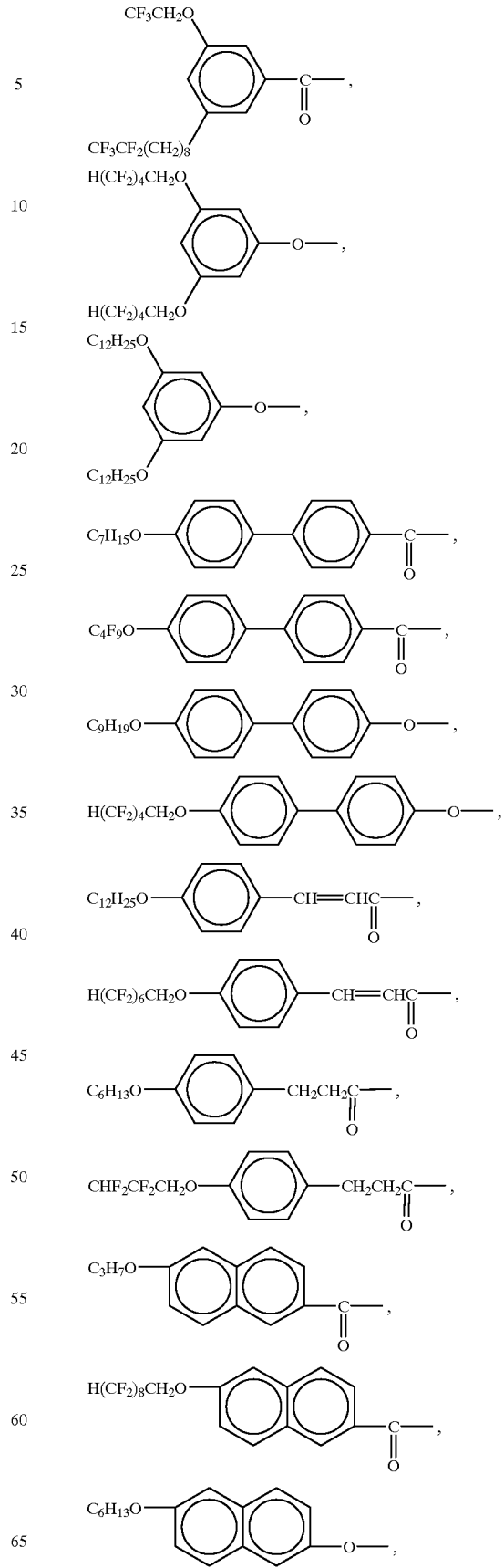

-continued

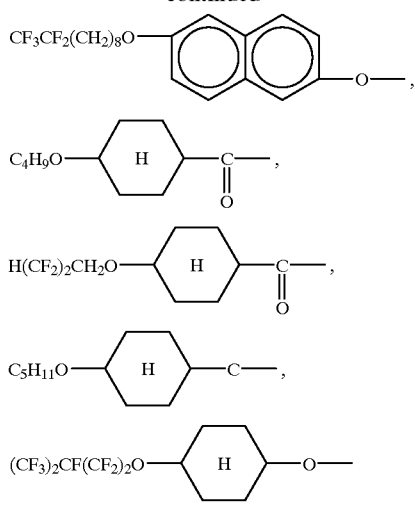

One or two units selected from the above-described monofunctional structural units constitute one end or both ends of a polymer chain. In the case where the polymer chain has the structural units at both ends of the chain, the structural units do not need to be the same.

The monofunctional structural unit is important for the optically compensating film of the present invention. It is important for an optically compensating film to have its optical parameters set to any desirable values. And, the optical parameters of the optically compensating film of the present invention can be set to desirable values by selecting, for example, the kind and combination of the structural units. Owing to this feature, the optically compensating film of the present invention provides a compensation effect unobtainable by a conventional technique to angles of visual field of a TN-LCD.

It is important that the end unit modified liquid crystalline polymer to be used in the present invention exhibit a homeotropic orientation. The term "homeotropic orientation" means a state of orientation in which directors are nearly perpendicular to the plane of substrate. An essential element for the realization of the nematic hybrid orientation of the present invention is the end-unit-modified liquid crystalline polymer which is homeotropically oriented.

Generally, the judgment as to whether or not a liquid crystalline polymer is in a state of a homeotropic orientation is made by examining the state of orientation of the layer of the liquid crystalline polymer formed on a substrate. Some illustrative nonlimiting examples of the substrate which can be used for this judgment include glass substrates such as soda glass, potash glass, borosilicate glass and optical glass, for example, crown glass and flint glass, films and sheets such as those made from polyethylene terephthalate, polyethylene naphthalate, polyphenylene oxide, polyimide, polyamideimide, polyetherimide, polyamide, polyetherketone, polyetheretherketone, polyketonesulfide and polyethersulfone.

Prior to the use, the surface of the above-mentioned substrates is cleaned with an acid, alcohol, a detergent or the like. Besides, the judgment of the homeotropic orientation needs to be conducted on a substrate which is not surface-treated by such method as a silicone treatment, a rubbing treatment, a uniaxially drawing treatment or the like.

When the end unit modified liquid crystalline polymer to be used in the present invention is coated at a film thickness of 10 to 1000 μm on suitable substrates without surface treatment as described above, and thereafter the coatings are heat-treated at a temperature at which the liquid crystalline polymer exhibits a state of liquid crystal, it is desired that the liquid crystalline polymer be in a state of the homeotropic orientation on at least one of the substrates. However, it should be noted that some liquid crystalline polymers are converted into a homeotropic orientation specifically at a temperature in the vicinity of a liquid crystal-isotropic phase transition point. Accordingly, the heat treatment is performed preferably at a temperature 15° C. lower, and more preferably 20° C. lower, than the liquid crystal-isotropic phase transition point.

Further detail of the end-unit-modified crystalline polymer is given below. The end unit modified crystalline polymers to be used in the present invention are not particularly limited in so far as the end-unit-modified liquid crystalline polymers have the above-mentioned properties. In order for a liquid crystalline polymer of the present invention to exhibit the homeotropic orientation, it is important that the liquid crystalline polymer has the above-mentioned monofunctional structural unit and the molecular weight of the liquid crystalline polymer is within an appropriate range. More detail in this regard is given below.

Examples of the end-unit-modified liquid crystalline polymers include polyesters, polyimides, polyamides, polycarbonates and polyesterimides each having a main polymer chain whose ends are modified with the above-mentioned monofunctional structural units. Among these polymers, an end-unit-modified liquid crystalline polyester is preferable in terms of, for example, ease in synthesis, ease in making films and stability of the physical properties of the films obtained. The components which constitute the main chain of the liquid crystalline polyester are not particularly limited and include bifunctional structural units, such as dicarboxylic acid units, diol units and oxycarboxylic acid units, and also polyfunctional structural units other than the bifunctional structural units. However, the optically compensating film for a liquid crystal display element as in the present invention preferably comprises a liquid crystalline polyester having in the main molecular chain thereof an ortho-substituted aromatic unit as a structural unit. Examples of these structural units include a catechol unit, a salicylic acid unit, a phthalic acid unit, a 2,3-naphthalenediol unit, a 2,3-naphthalenedicarboxylic acid unit and any of the foregoing units having a substituent on the benzene ring.

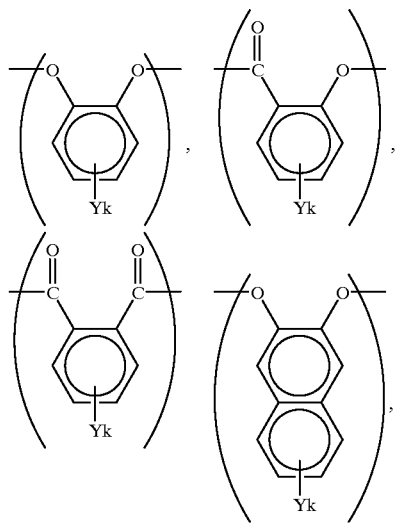

-continued

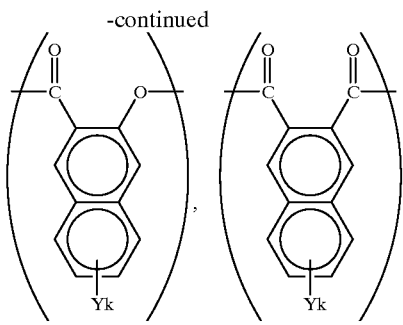

where Y is selected from the group consisting of hydrogen, halogen such as Cl and Br, methyl, ethyl, methoxy, ethoxy and phenyl groups; and k is 0 to 2.

Examples of the structure of the end unit modified liquid crystalline polymer to be used in the present invention are given below.

structural formula 1

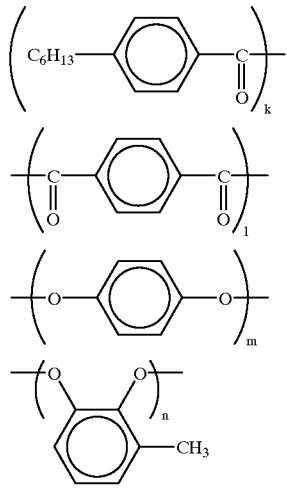

where m+n=k/2+l; k/l=80/60 to 2/99, preferably 40/80 to 10/95; m/n=100/0 to 0/100, preferably 95/5 to 5/95; and k, l, m and n represent, respectively, a molar fraction of component.

structural formula 2

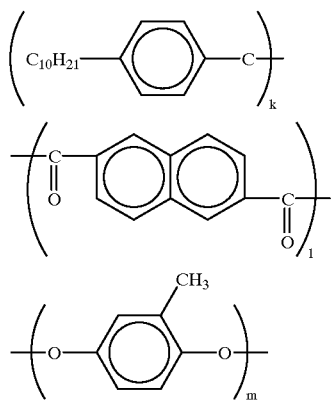

-continued

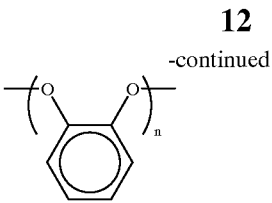

where l=k/2+m+n; k/(m+n)=80/60 to 2/99, preferably 40/80 to 10/95; m/n=100/0 to 0/100, preferably 95/5 to 5/95; and k, l, m and n represent, respectively, a molar fraction of component.

structural formula 3

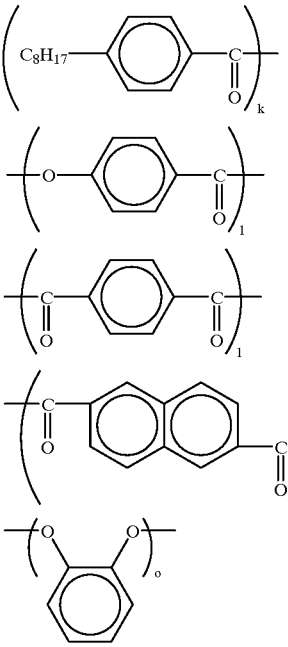

where o=k/2+m+n; k/(m+n)=80/60 to 2/99, preferably 40/80 to 10/95; m/n=100/0 to 0/100, preferably 95/5 to 5/95; l/o=20/10 to 0/10, preferably 15/10 to 5/10; and k, l, m, n and o represent, respectively, a molar fraction of component.

structural formula 4

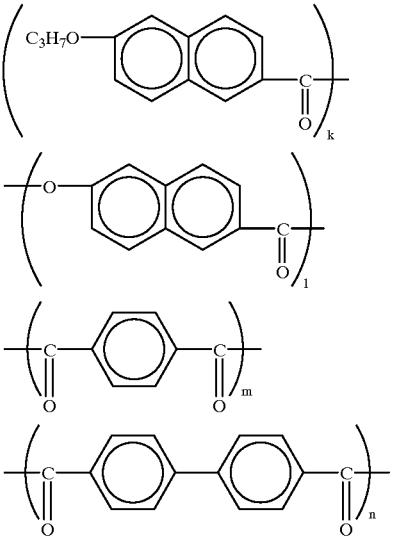

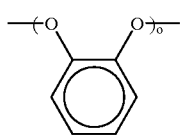

where o=k/2+m+n; k/(m+n)=80/60 to 2/99, preferably 40/80 to 10/95; m/n=100/0 to 0/100, preferably 95/5 to 5/95; l/o=20/10 to 0/10, preferably 15/10 to 5/10; and k, l, m, n and o represent, respectively, a molar fraction of component.

structural formula 5

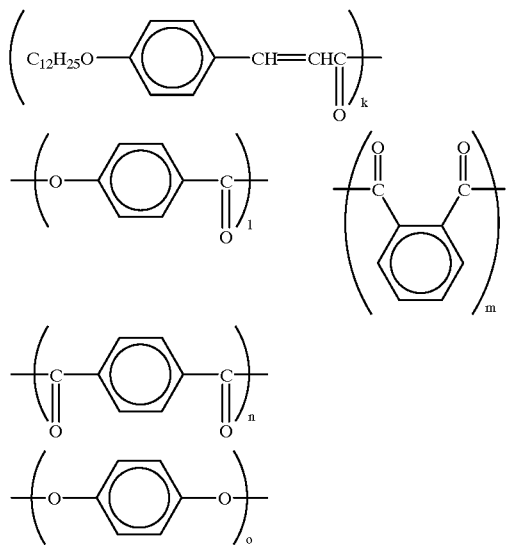

where o=k/2+m+n; k/(m+n)=80/60 to 2/99, preferably 40/80 to 10/95; m/n=100/0 to 0/100, preferably 95/5 to 5/95; l/o=20/10 to 0/10, preferably 15/10 to 5/10; and k, l, m, n and o represent, respectively, a molar fraction of component.

structural formula 6

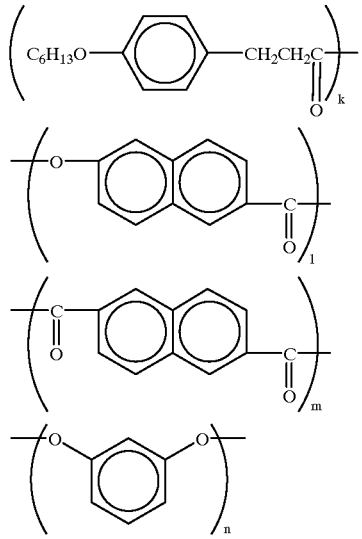

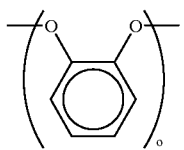

where n+o=k/2+m; k/m=80/60 to 2/99, preferably 40/80 to 10/95; n/o=100/0 to 0/100, preferably 95/5 to 5/95; l/(n+o)= 20/10 to 0/10, preferably 15/10 to 5/10; and k, l, m, n and o represent, respectively, a molar fraction of component.

structural formula 7

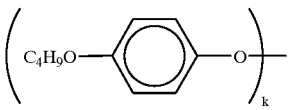

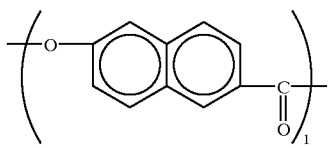

where m+n=k/2+l; k/l=80/60 to 2/99, preferably 40/80 to 10/95; m/n=100/0 to 0/100, preferably 95/5 to 5/95; and k, l, m and n represent, respectively, a molar fraction of component.

structural formula 8

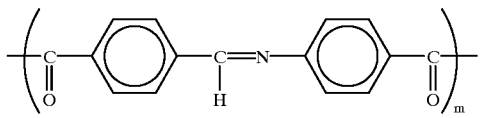

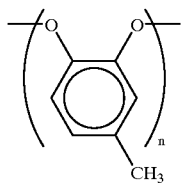

where m=k/2+n; k/n=80/60 to 2/99, preferably 40/80 to 10/95; l/m=20/10 to 0/10, preferably 15/10 to 5/10; and k, l, m and n represent, respectively, a molar fraction of component.

structural formula 9

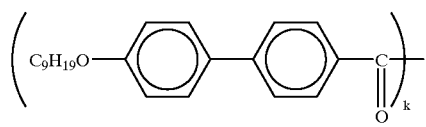

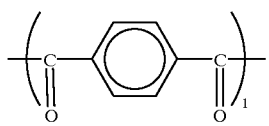

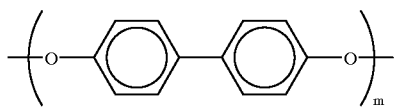

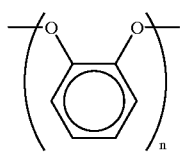

where l=k/2+m+n; k/(m+n)=80/60 to 2/99, preferably 40/80 to 10/95; m/n=100/0 to 0/100, preferably 95/5 to 5/95; and k, l, m and n represent, respectively, a molar fraction of component.

structural formula 10

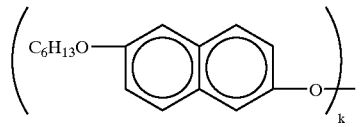

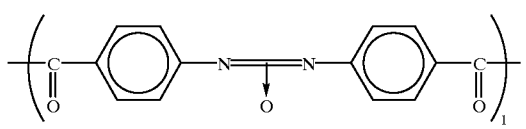

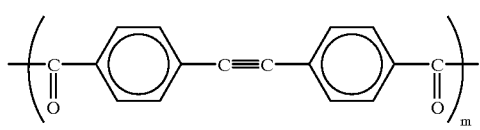

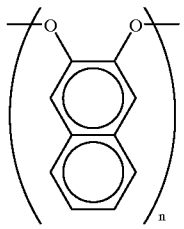

where l+m=k/2+n; k/n=80/60 to 2/99, preferably 40/80 to 10/95; l/m=100/0 to 0/100, preferably 95/5 to 5/95; and k, l, m and n represent, respectively, a molar fraction of component.

structural formula 11

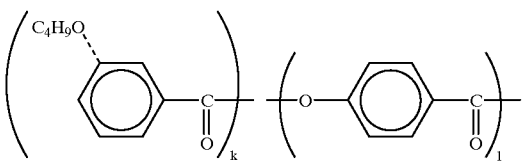

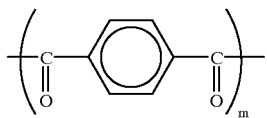

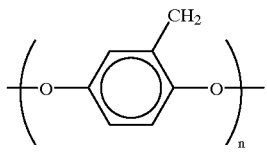
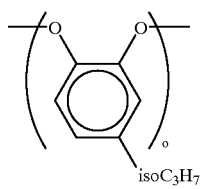

where n+o=k/2+m; k/m=80/60 to 2/99, preferably 40/80 to 10/95; n/o=100/0 to 0/100, preferably 95/5 to 5/95; l/(n+o)= 20/10 to 0/10, preferably 15/10 to 5/10; and k, l, m, n and o represent, respectively, a molar fraction of component.

structural formula 12

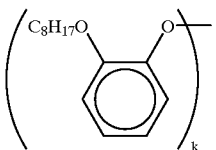

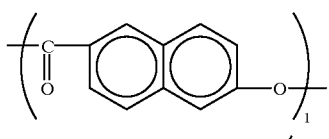

-continued

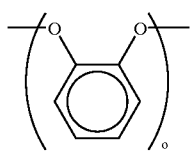

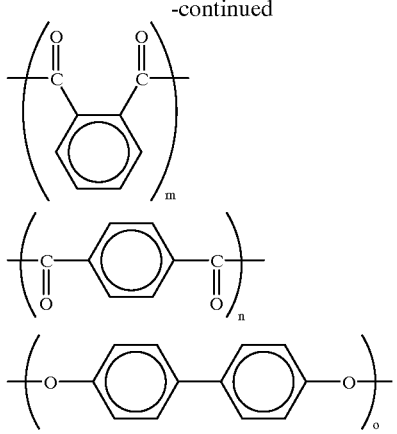

where m+n=k/2+o; k/o=80/60 to 2/99, preferably 40/80 to 10/95; m/n=100/0 to 0/100, preferably 95/5 to 5/95; l/(m+n)=20/10 to 0/10, preferably 15/10 to 5/10; i is an integer of 2 to 12; and k, l, m, n and o represent, respectively, a molar fraction of component.

structural formula 13

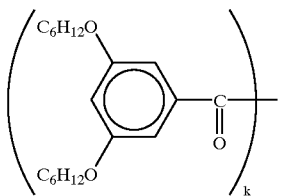

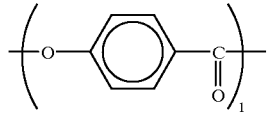

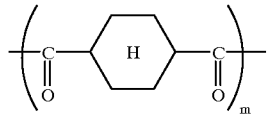

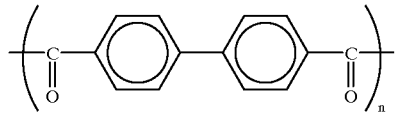

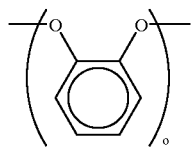

where o=k/2+m+n; k/(m+n)=80/60 to 2/99, preferably 40/80 to 10/95; m/n=100/0 to 0/100, preferably 95/5 to 5/95; l/o=20/10 to 0/10, preferably 15/10 to 5/10; and k, l, m, n and o represent, respectively, a molar fraction of component.

structural formula 14

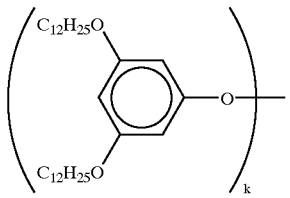

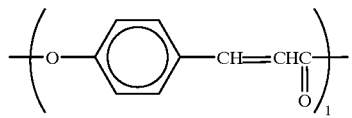

where m+n=k/2+o; k/o=80/60 to 2/99, preferably 40/80 to 10/95; m/n=100/0 to 0/100, preferably 95/5 to 5/95; l/(m+n)=20/10 to 0/10, preferably 15/10 to 5/10; and k, l, m, n and o represent, respectively, a molar fraction of component.

structural formula 15

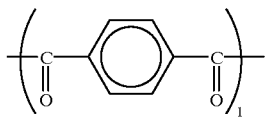

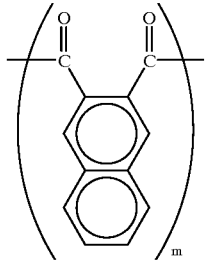

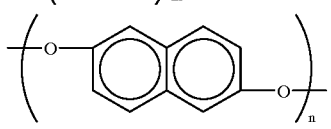

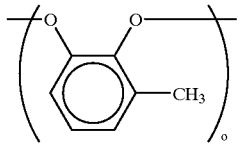

where l+m=k/2+n+o; k/(n+o)=80/60 to 2/99, preferably 40/80 to 10/95; l/m=100/0 to 0/100, preferably 95/5 to 5/95; n/o=100/0 to 0/100, preferably 95/5 to 5/95; and k, l, m, n and o represent, respectively, a molar fraction of component.

structural formula 16

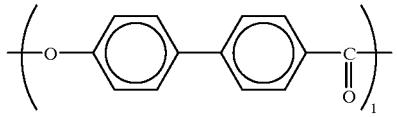

-continued

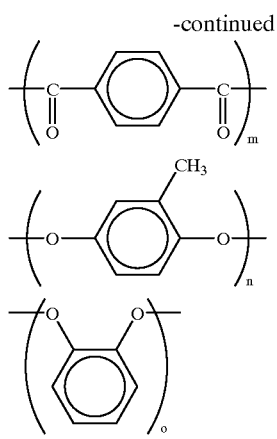

where n+o=k/2+m; k/m=80/60 to 2/99, preferably 40/80 to 10/95; n/o=100/0 to 0/100, preferably 95/5 to 5/95; l/m=20/10 to 0/10, preferably 15/10 to 5/10; and k, l, m, n and o represent, respectively, a molar fraction of component.

structural formula 17

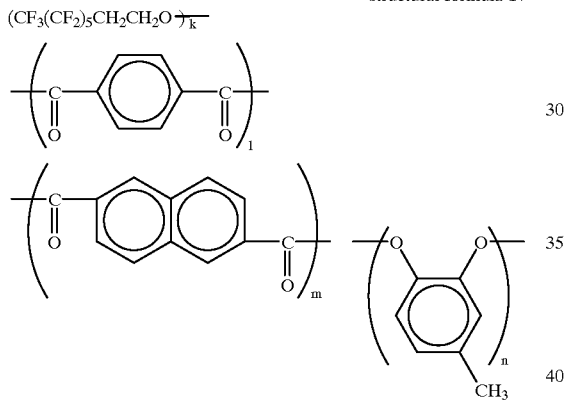

where l+m=k/2+o; k/o=80/60 to 2/99, preferably 40/80 to 10/95; l/m=100/0 to 0/100, preferably 95/5 to 5/95; and k, l, m, n and o represent, respectively, a molar fraction of component.

structural formula 18

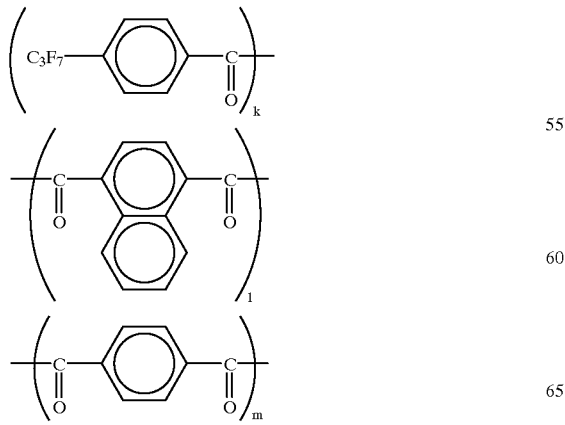

-continued

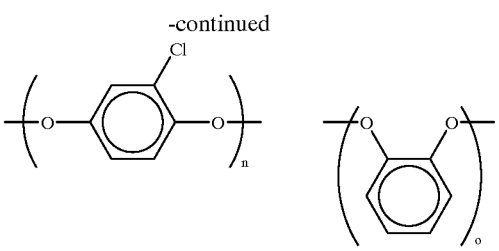

where n+o=k/2+l+m; k/(l+m)=80/60 to 2/99, preferably 40/80 to 10/95; l/m=100/0 to 0/100, preferably 95/5 to 5/95; n/o=100/0 to 0/100, preferably 95/5 to 5/95; and k, l, m, n and o represent, respectively, a molar fraction of component.

structural formula 19

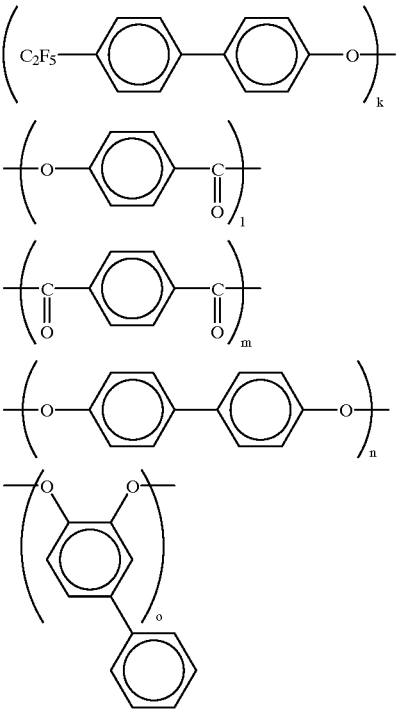

where m=k/2+n+o; k/(n+o)=80/60 to 2/99, preferably 40/80 to 10/95; n/o=100/0 to 0/100, preferably 95/5 to 5/95; l/m=20/10 to 0/10, preferably 15/10 to 5/10; and k, l, m, n and o represent, respectively, a molar fraction of component.

structural formula 20

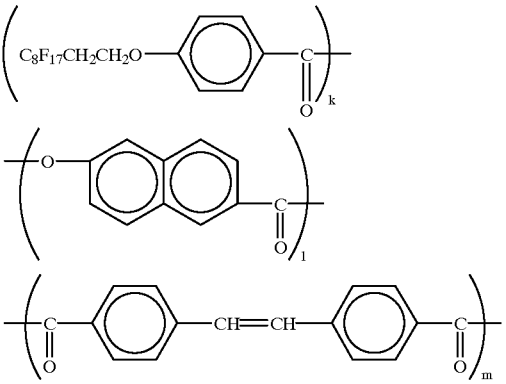

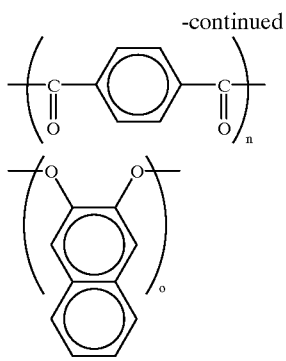

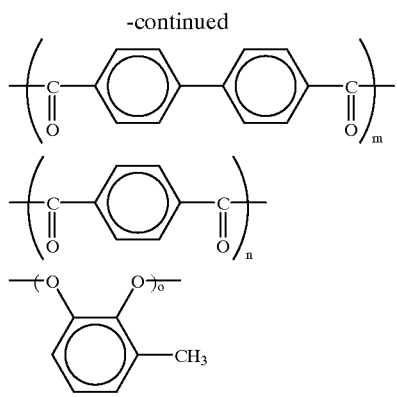

where o=k/2+m+n; k/(m+n)=80/60 to 2/99, preferably 40/80 to 10/95; m/n=100/0 to 0/100, preferably 95/5 to 5/95; l/m=20/10 to 0/10, preferably 15/10 to 5/10; and k, l, m, n and o represent, respectively, a molar fraction of component.

structural formula 21

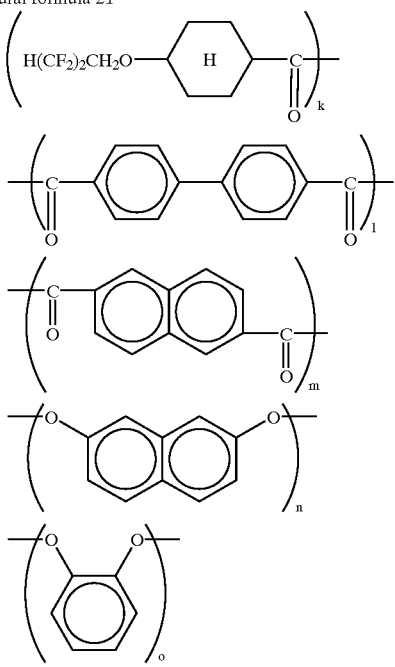

where n+o=k/2+l+m; k/(l+m)=80/60 to 2/99, preferably 40/80 to 10/95; l/m=100/0 to 0/100, preferably 95/5 to 5/95; n/o=100/0 to 0/100, preferably 95/5 to 5/95; and k, l, m, n and o represent, respectively, a molar fraction of component.

structural formula 22

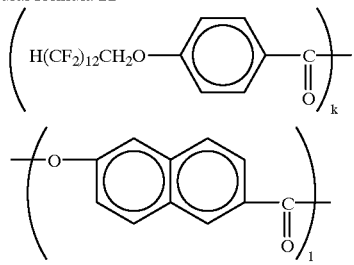

where o=k/2+m+n; k/(m+n)=80/60 to 2/99, preferably 40/80 to 10/95; m/n=100/0 to 0/100, preferably 95/5 to 5/95; l/o=20/10 to 0/10, preferably 15/10 to 5/10; and k, l, m, n and o represent, respectively, a molar fraction of component.

structural formula 23

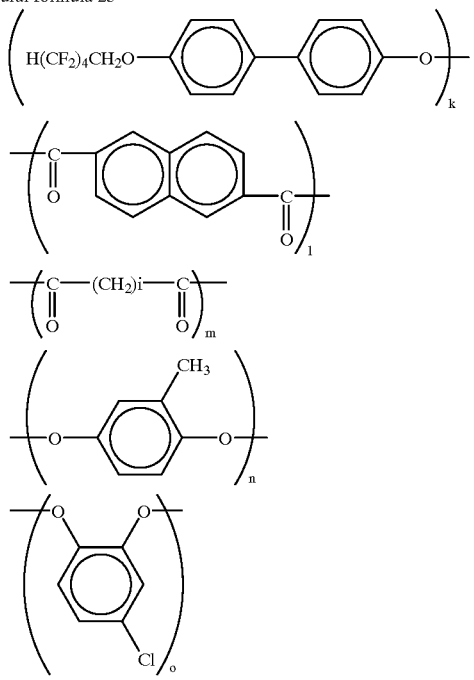

where l+m=k/2+n+o; k/(n+o)=80/60 to 2/99, preferably 40/80 to 10/95; l/m=100/0 to 0/100, preferably 95/5 to 5/95; n/o=100/0 to 0/100, preferably 95/5 to 5/95; i is an integer of 2 to 12; and k, l, m, n and o represent, respectively, a molar fraction of component.

structural formula 24

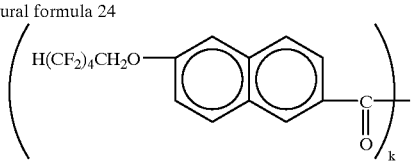

-continued

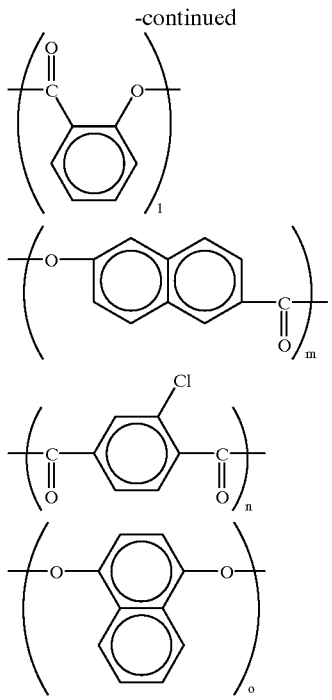

where o=k/2+n; k/n=80/60 to 2/99, preferably 40/80 to 10/95; l/m=100/0 to 0/100, preferably 95/5 to 5/95; (l+m)/o=20/10 to 0/10, preferably 15/10 to 5/10; and k, l, m, n and o represent, respectively, a molar fraction of component.

structural formula 25

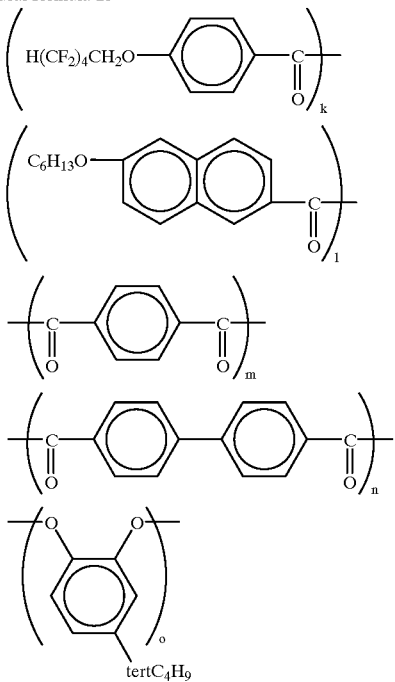

where o=k/2+l/2+m+n; (k+l)/(m+n)=80/60 to 2/99, preferably 40/80 to 10/95; k/l=100/0 to 0/100, preferably 90/10 to 10/90; m/n=100/0 to 0/100, preferably 95/5 to 5/95; and k, l, m, n and o represent, respectively, a molar fraction of component.

structural formula 26

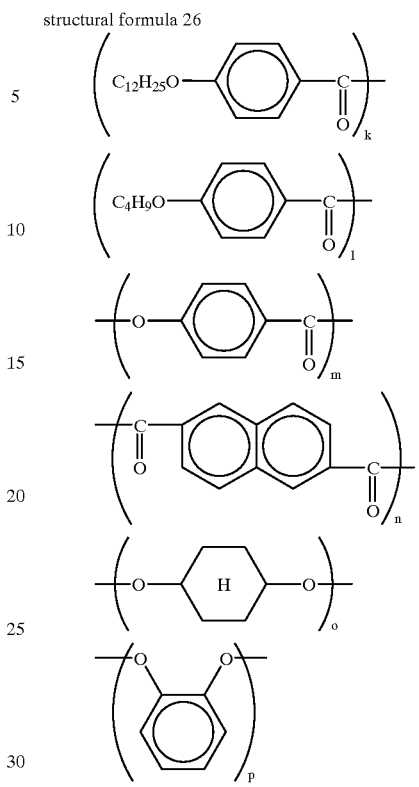

where o+p=k/2+l/2+n; (k+l)/n=80/60 to 2/99, preferably 40/80 to 10/95; k/l=100/0 to 0/100, preferably 90/10 to 10/90; o/p=100/0 to 0/100, preferably 95/5 to 5/95; m/n=20/10 to 0/10, preferably 15/10 to 5/10; and k, l, m, n, o and p represent, respectively, a molar fraction of component.

In the foregoing structural formulas, the end of polymer chain to which no monofunctional structural unit is bonded has a group such as a phenolic hydroxyl group, a free carboxylic acid group and an acetyl group.

Among the end unit modified liquid crystalline polymers enumerated above, preferable are the end unit modified liquid crystalline polyesters having structural formulas 1, 3, 4, 9, 11, 16, 20, 22, 23 and 25.

In order for an end-unit-modified liquid crystalline polymer to exhibit a good homeotropic orientation, the molecular weight of the end-modified-liquid crystalline polymer is also important as stated previously.

As an indication of the molecular weight of the end-unit-modified-liquid crystalline polymer, a logarithmic viscosity, which is measured in a solvent, for example, a phenol/1,1,2,2-tetrachloroethane (60/40 by weight ratio) mixture, at a concentration of 0.5 g/dl and at 30° C., is higher than 0.04 and more preferably in the range of 0.06 to 0.25. If the logarithmic viscosity is less than 0.04, the mechanical strength of the film is undesirably weak. On the other hand, if the logarithmic viscosity is too high, the homeotropic orientation may be lost. Further, the viscosity at a liquid crystalline state may be too high, and the time required for the creation of a homeotropic orientation may be too long even if any homeotropic orientation would take place.

The method for synthesizing an end unit modified liquid crystalline polymer described above is not particularly limited, and polymerization methods known in the art can be used for the synthesis of the end-unit-modified liquid crystalline polymer. In the case of the synthesis of a liquid crystalline polyester, examples of the method of the synthesis include a melt polymerization process and an acid chloride process using an acid chloride which corresponds to a dicarboxylic acid to be used.

When synthesizing an end-unit-modified liquid crystalline polymer in the present invention, the monofunctional structural unit is introduced into the polymerization reaction as a monohydric alcohol, a monocarboxylic acid or a functional derivative of these compounds, more specifically as an acetylated compound or a halide. The proportion of the monofunctional structural unit to the liquid crystalline polymer, and more specifically to the liquid crystalline polyester, calculated with respect to the amount of the polyester constituting components other than hydroxycarboxylic acid structural units, is expressed in a molar fraction ranging from 2/210 to 80/240, and more preferably from 10/205 to 20/220. If the proportion (molar fraction) of the monofunctional structural unit to the liquid crystalline polyester is less than 2/210, the liquid crystalline polyester may not exhibit a homeotropic orientation. On the other hand, if the proportion of the monofunctional structural unit to the liquid crystalline polyester is more than 80/240, the molecular weight liquid crystalline polyester may not attain a desired molecular weight. Further, when a film is prepared from the liquid crystalline polyester, the mechanical strength of the film will be undesirably weak. Besides, the proportion of the monofunctional structural unit can be adjusted by changing the amount of the monomer components used in the reaction.

The end-unit-modified liquid crystalline polymer described above may be used alone or in a combination of two or more of them. Further, one or more of other liquid crystalline polymers or otherwise one or more of non-liquid crystalline polymers may be used together with the end-unit-modified liquid crystalline polymer described above. In these compositions, the end-unit-modified liquid crystalline polymer needs to be present in a proportion of at least 5 wt % based on the weight of the composition.

The other polymer to be used together with the end-unit-modified crystalline polymer is preferably a liquid crystalline polymer and more preferably the one which has a logarithmic viscosity (measured in a solvent mixture of phenol/1,1 2,2-tetrachloroethane (60/40 by weight ratio) at a concentration of 0.5 g/dl and at 30° C. at least 0.01 dl/g higher than that of the end-unit-modified liquid crystalline polymer to be used together and a glass transition point at least 5° C. higher than that of the end-unit-modified liquid crystalline polymer to be used together and which exhibits an optically positive uniaxiality (hereinafter referred to as a component having a high molecular weight). The amount of the end-unit-modified liquid crystalline polymer contained in the composition is preferably 5 to 70 wt %, more preferably 10 to 65 wt %, and most preferably 15 to 60 wt % based on the weight of the composition. If the amount of the end-unit-modified liquid crystalline polymer is less than 5 wt %, the desired optical properties cannot be obtained. In this case, a composition comprising the end-unit-modified liquid crystalline polymer and a liquid crystalline polymer having a high molecular weight which is described later may not easily exhibit a nematic hybrid orientation at a temperature above a liquid crystal transition point. On the other hand, in the case where the amount of the end unit modified liquid crystalline polymer is more than 70 wt %, the reliability of properties such as heat resistance and humidity resistance may undesirably deteriorate.

The advantages of using the component having a high molecular weight are summarized as follows.

(1) An average tilt angle in nematic hybrid orientation can be controlled at will by adjusting the proportion of the component in the composition.
(2) The nematic hybrid orientation can be stabilized.
(3) The reliability of the resistance to high temperature and high humidity can be increased.

A liquid crystalline polymer which is used as a component having a high molecular weight is a liquid crystalline polymer comprising a main chain, examples of which polymer include polyesters, polyimides, polyamides, polycarbonates and polyesterimides. Further, another liquid crystalline polymer which is used as a component having a high molecular weight is a liquid crystalline polymer having a side chain, examples of which polymer include polyacrylates, polymethacrylates, polysiloxanes and polymalonates. Although the kind of the liquid crystalline polymer which is used as a component having a high molecular weight is not particularly limited in so far as this liquid crystalline polymer is compatible with the liquid crystalline polymer having a homeotropic orientation, the most preferable liquid crystalline polymer is a liquid crystalline polyester which has a main chain comprising an ortho-substituted aromatic unit as previously given. This liquid crystalline polymer may exhibit any orientation such as a homogeneous orientation, a tilted orientation or other orientation. For example, this liquid crystalline polymer may be obtained by increasing the molecular weight of the aforementioned liquid crystalline polymer having a homeotropic orientation or may be a polymer exhibiting a homogeneous orientation. The end group which is not modified is required to have no long-chain alkyl or fluoroalkyl group as previously mentioned. However, except for this requirement, the end group is not particularly limited, and the end group can be a phenolic hydroxyl group, a free carboxylic acid group, an acetyl group and the like.

Generally, the judgment as to whether or not a liquid crystalline polymer is in a state of a homogeneous orientation is made by examining the state of orientation of the layer of the liquid crystalline polymer, as in the case of the examination of the homeotropic orientation mentioned previously, formed on a substrate which is free from a treatment such as a silicone treatment, a rubbing treatment and a uniaxially drawing treatment.

Structures given below are some examples of liquid crystalline polymers which exhibit a homogeneous orientation and can be a component having a high molecular weight in the present invention.

structural formula 27

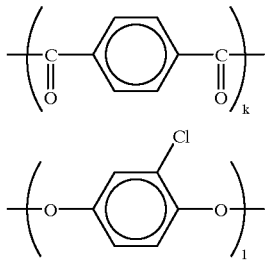

-continued

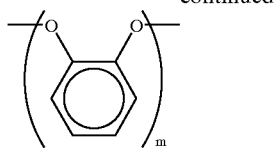

where k=l+m; l/m=80/20 to 20/80, preferably 75/25 to 25/75; and k, l and m represent, respectively, a molar fraction of component.

structural formula 28

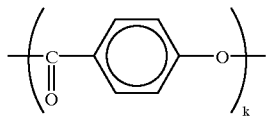

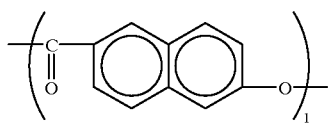

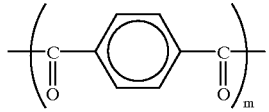

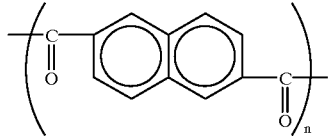

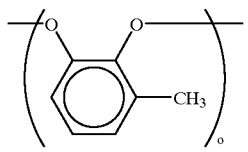

where o=m+n; (k+l)/o=20/10 to 0/10, preferably 15/10 to 0/10; m/n=100/0 to 0/100, preferably 98/2 to 2/98; and k, l, m, n and o represent, respectively, a molar fraction of component.

structural formula 29

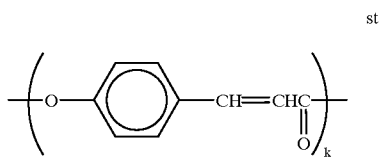

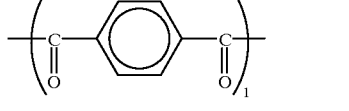

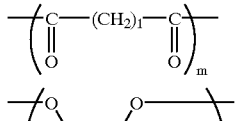

where n=l+m; k/m=20/10 to 0/10, preferably 15/10 to 0/10; and k, l, m and n represent, respectively, a molar fraction of component.

structural formula 30

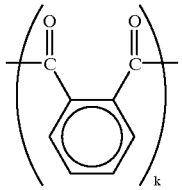

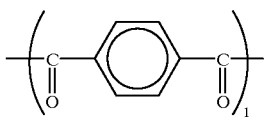

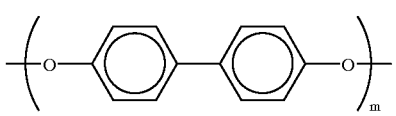

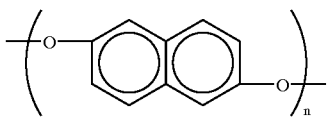

where k+l=m+n; k/l=100/0 to 0/100, preferably 95/5 to 5/95; m/l=100/0 to 0/100, preferably 95/5 to 5/95; and k, l, m and n represent, respectively, a molar fraction of component.

structural formula 31

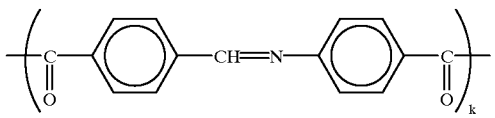

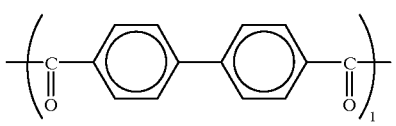

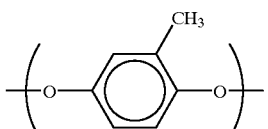

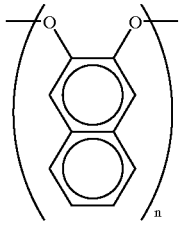

where k+l=m+n; k/l=100/0 to 0/100, preferably 95/5 to 5/95; m/l=100/0 to 0/100, preferably 95/5 to 5/95; and k, l, m and n represent, respectively, a molar fraction of component.

structural formula 32

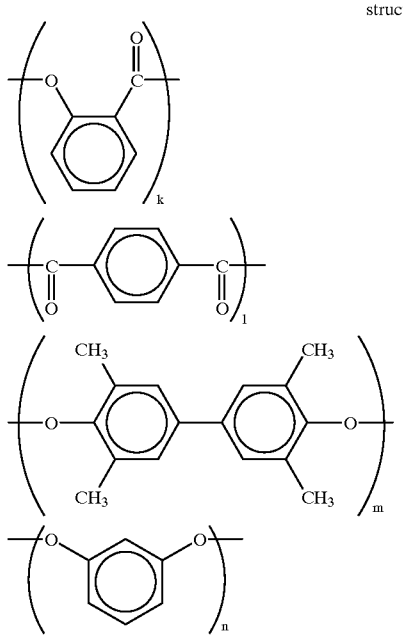

where l=m+n; k/l=15/10 to 0/10, preferably 10/10 to 0/10; m/n=100/0 to 0/100, preferably 95/5 to 5/95; and k, l, m and n represent, respectively, a molar fraction of component.

structural formula 33

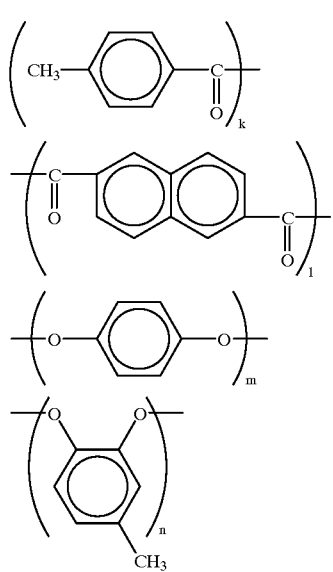

where m+n=k/2+l; k/l=40/80 to 0/100, preferably 20/90 to 0/100; m/n=100/0 to 0/100, preferably 95/5 to 5/95; and k, l, m and n represent, respectively, a molar fraction of component.

structural formula 34

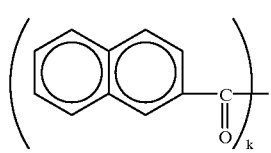

-continued

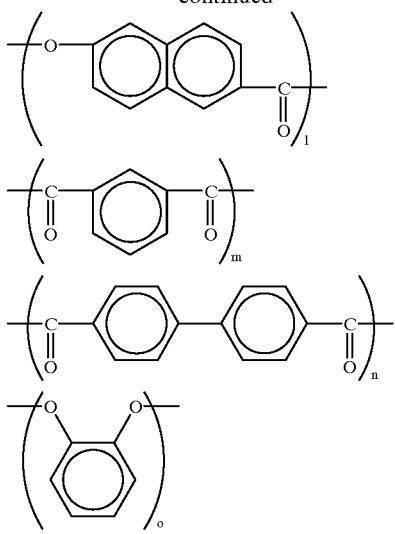

where o=k/2+m+n; k/(m+n)=40/80 to 0/100, preferably 20/90 to 0/100; m/n=100/0 to 0/100, preferably 95/5 to 5/95; l/o=20/10 to 0/10, preferably 15/10 to 5/10; and k, l, m, n and o represent, respectively, a molar fraction of component.

structrual formula 35

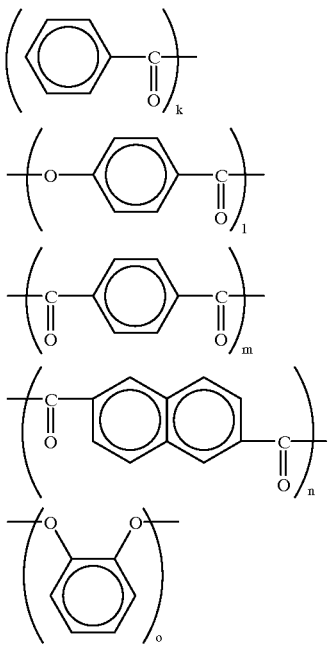

where o=k/2+m+n; k/(m+n)=40/80 to 0/100, preferably 20/90 to 0/100; m/n=100/0 to 0/100, preferably 95/5 to 5/95; l/o=20/10 to 0/10, preferably 15/10 to 5/10; and k, l, m, n and o represent, respectively, a molar fraction of component.

structural formula 36

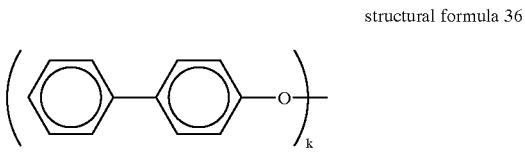

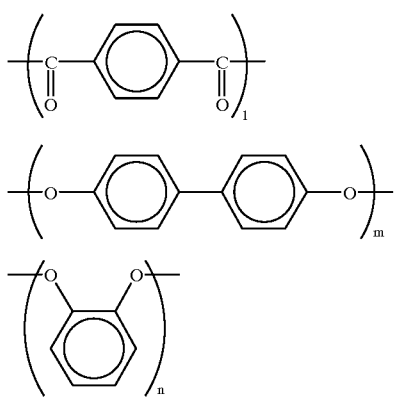

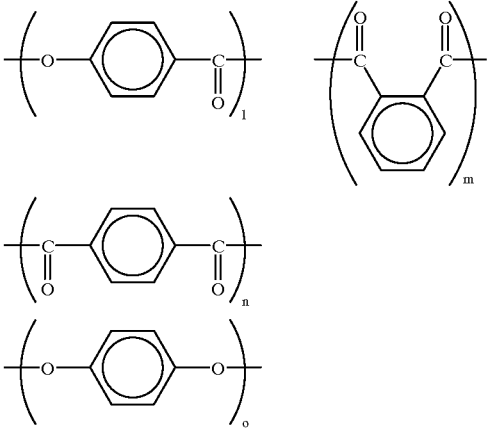

where l=k/2+m+n; k/(m+n)=40/80 to 0/100, preferably 20/90 to 0/100; m/n=100/0 to 0/100, preferably 95/5 to 5/95; and k, l, m and n represent, respectively, a molar fraction of component.

where o=k/2+m+n; k/(m+n)=40/80 to 0/100, preferably 20/90 to 0/100; m/n=100/0 to 0/100, preferably 95/5 to 5/95; l/o=20/10 to 0/10, preferably 15/10 to 5/10; and k, l, m, n and o represent, respectively, a molar fraction of component.

structural formula 37

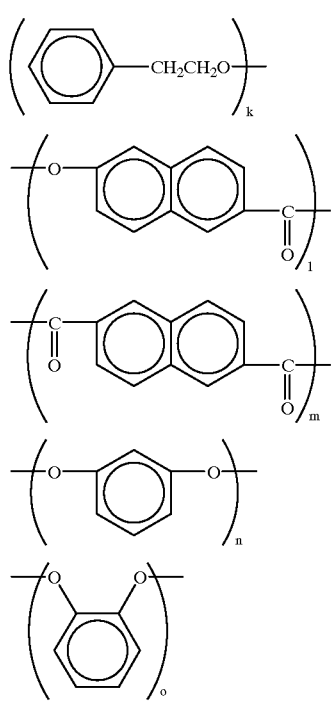

structural formula 38

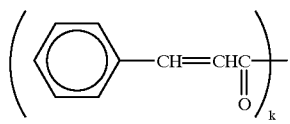

where m=k/2+n+o; k/(n+o)=40/80 to 0/100, preferably 20/90 to 0/100; n/o=100/0 to 0/100, preferably 95/5 to 5/95; l/m=20/10 to 0/10, preferably 15/10 to 5/10; and k, l, m, n and o represent, respectively, a molar fraction of component.

structural formula 39

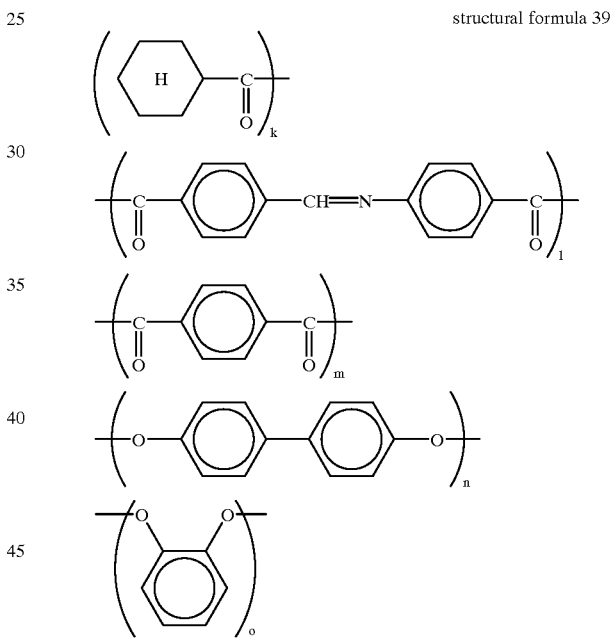

where n+o=k/2+l+m; k/(l+m)=40/80 to 0/100, preferably 20/90 to 0/100; l/m=100/0 to 0/100, preferably 95/5 to 5/95; n/o=100/0 to 0/100, preferably 95/5 to 5/95; and k, l, m, n and o represent, respectively, a molar fraction of component.

The molecular weight of these liquid crystalline polymers as a component having a high molecular weight is such that a logarithmic viscosity (dl/g) of the polymer, which is measured in a phenol/1,1,2,2-tetrachloroethane (60/40 by weight ratio) solvent mixture at a concentration of 0.5 g/dl and at 30° C., is preferably high than about 0.1 and more preferably in the range of 0.015 to 2.0. If the logarithmic viscosity is too low, the mechanical strength of the film may be undesirably weak. In addition, the reliability of the resistance to high temperature and high humidity may decrease. On the other hand, if the logarithmic viscosity is too high, predictable disadvantages include the impairment of the homeotropic orientation of the composition and too long time required for completion of the orientation due to too high viscosity of the polymer when a liquid crystalline state is attained.

It is essential that the molecular weight of these liquid crystalline polymers as a component having a high molecular weight is larger than the molecular weight of the end-unit-modified liquid crystalline polymers. In this case, an indication of the molecular weight is a logarithmic viscosity (dl/g) of the polymer, which is measured in a phenol/1,1,2, 2-tetrachloroethane (60/40 by weight ratio) solvent mixture at a concentration of 0.5 g/dl and at 30° C. The liquid crystalline polymer as a component having a high molecular weight should have a logarithmic viscosity which is at least 0.01 higher, preferably at least 0.03 higher, than that of the end-unit-modified liquid crystalline polymer. If the molecular weight of these liquid crystalline polymers as a component having a high molecular weight is smaller than that of the end-unit-modified liquid crystalline polymer, predictable adverse effects include inferior reliability of resistance to high temperature and difficulty in the formation of a nematic hybrid orientation in a liquid crystalline state.

Meanwhile, it is essential that the glass transition point of these liquid crystalline polymers as a component having a high molecular weight is normally at least 5° C. higher, preferably at least 10° C. higher, and more preferably at least 20° C. higher than that of the end-unit-modified liquid crystalline polymer. If the difference between the glass transition point of the end unit modified liquid crystalline polymer and the glass transition point of the component having a high molecular weight is less than 5° C., the reliability, more specifically heat resistance, of the optically compensating film of the present invention becomes inferior.

The method for synthesizing the above-mentioned component having a high molecular weight is not particularly limited, and polymerization methods known in the art can be used for the synthesis of the component having a high molecular weight which is used in the present invention. In the case of the synthesis of a polyester, examples of the method of the synthesis include a melt polymerization process and an acid chloride process using an acid chloride which corresponds to a dicarboxylic acid to be used.

In order to obtain an optically compensating film of the present invention by a process comprising obtaining a uniform nematic orientation of an end-unit-modified liquid crystalline polymer which contains, as needed, the above-mentioned component having a high molecular weight on an orienting substrate and then immobilizing the orientation obtained, an orienting substrate and processing steps which are described below are preferably employed in the present invention.

First, an orienting substrate for the above-mentioned purpose is described below.

In order to obtain a nematic hybrid orientation in the present invention by use of a liquid crystalline polymer (the term "liquid crystalline polymer" as used hereinafter also include a composition), it is desirable to sandwich the layer of the liquid crystalline polymer with two different boundary surfaces. If the layer of the liquid crystalline polymer is sandwiched with the same boundary surfaces, the same orientation is formed both at the upper and lower boundary faces of the liquid crystalline polymer layer, thereby making it difficult to obtain the nematic hybrid orientation of the present invention.

In an embodiment of the present invention, an orienting substrate and an air boundary surface are used such that the lower boundary face of the liquid crystalline polymer layer is brought into contact with the orienting substrate and the upper boundary face of the liquid crystalline polymer layer is brought into contact with air. Although orienting substrates having different boundary faces may be used for the upper and lower faces of the liquid crystalline polymer layer, the use of one sheet of an orienting substrate and an air boundary surface is desirable for the benefit of the manufacturing process.

The orienting substrate to be used in the present invention is preferably anisotropic so that the direction of tilt (i.e., projection of director on to the substrate) of the liquid crystal molecule is regulated. If the orienting substrate cannot regulate the direction of the tilt of the liquid crystal molecule at all, the oriented state obtainable is only a state tilted in random directions (i.e., vector produced by a projection of director on to the substrate is random).

A substrate to be used in the present invention preferably has an in-plane anisotropy. Examples of the substrate include plastic film substrates and uniaxially drawn plastic film substrates made from plastics, such as polyimide, polyamideimide, polyamide, polyetherimide, polyetheretherketone, polyetherketone, polyketonesulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, acrylic resins, polyvinyl alcohol, polypropylene, cellulose-based plastics, epoxy resins and phenolic resins, metal substrates which have on the surface thereof slit-like grooves and are made from a metal such as aluminum, iron and copper, and glass substrates which have etched surface and are made from glass such as alkali glass, borosilicate glass and flint glass.

Further examples of the substrates to be used in the present invention include a rubbing-treated plastic film substrate obtained by rubbing the above-mentioned plastic film substrate, a substrate having a rubbing-treated plastic thin film such as a rubbed polyimide film and a rubbed polyvinyl alcohol film and also the above-mentioned substrate having a tilt-deposited silicon oxide film.

Among the above-mentioned orienting substrates, examples of the substrates suitable for forming the nematic hybrid orientation of the liquid crystalline polymer of the present invention are those substrates which have a rubbing-treated polyimide film, rubbing-treated polyimide substrates, rubbing-treated polyetheretherketone substrates, rubbing-treated polyetherketone substrates, rubbing-treated polyethersulfone substrates, rubbing-treated polyphenylene sulfide substrates, rubbing-treated polyethylene terephthalate substrates, rubbing-treated polyethylene naphthalate substrates, rubbing-treated polyarylate substrates, and rubbing treated cellulose-based plastic substrates.

In the film for use as an optical element of the present invention, an angle between the director of the liquid crystalline polymer and the plane of the film in an upper face of the film differs from the corresponding angle in a lower face of the film. In the region of the film facing the substrate, the angle between the director of the liquid crystalline polymer and the plane of the film can be controlled either within a range of 0 to 50 degrees or within a range of 60 to 90 degrees by appropriately selecting the method for orienting the liquid crystalline polymer or the kind of the liquid crystalline polymer. Normally, for the benefit of the manufacturing process, it is desirable to control the angle between the director of the liquid crystalline polymer and the plane of the film within a range of 0 to 50 degrees in the region of the film boundary facing the substrate.

The film of the present invention for use as an optical element can be obtained by a process which comprises coating a liquid crystalline polymer uniformly on any of the above-mentioned orienting substrates, orienting the polymer and immobilizing the oriented state. When coating the liquid crystalline polymer on to the orienting substrate, normally the liquid crystalline polymer is dissolved in a solvent or the liquid crystalline polymer is melted, and the resultant solution or melt is coated on the substrate. For the benefit of the process, a solution-coating method in which a solution of the liquid crystalline polymer in a solvent is used is preferable.

A solution-coating method is described below.

A liquid crystalline polymer of the present invention is dissolved in a solvent and a solution having a predetermined concentration is prepared. Since the film thickness (i.e., the thickness of the layer formed from the liquid crystalline polymer) is determined by the step of coating the solution of the liquid crystalline polymer, the concentration and the thickness of the coating layer need to be accurately controlled.

The solvents vary depending on the kinds of the liquid crystalline polymer (e.g., ratio of components), and therefore the solvent is not unconditionally selected. Examples of normally employed solvents include halogenated hydrocarbons such as chloroform, dichloromethane, carbon tetrachloride, dichloroethane, tetrachloroethane, trichloroethylene, tetrachloroethylene, chlorobenzene and o-dichlorobenzene, phenols such as phenol and p-chlorophenol, aromatic hydrocarbons such as benzene, toluene, xylene, methoxybenzene and 1,2-dimethoxybnezene, acetone, ethyl acetate, tert-butyl alcohol, glycerin, ethylene glycol, triethylene glycol, ethylene glycol monomethyl ether, diethylene glycol dimethyl ether, ethyl cellosolve, butyl cellosolve, 2-pyrrolidone, N-methyl-2-pyrrolidone, pyridine, triethylamine, tetrahydrofuran, dimethylformamide, dimethylacetamide, dimethyl sulfoxide, acetonitrile, butylonitrile, carbon disulfide, and a mixture thereof, for example, a mixture of a halogenated hydrocarbon and a phenol.

The concentrations vary depending on the solubility of the liquid crystalline polymer to be used and the final thickness of the optically compensating film aimed at, and therefore the thickness is not unconditionally defined. The concentration is normally in the range of 3 to 50 wt % and preferably in the range of 7 to 30 wt %.

In the case, for example, where a solvent having a high surface tension is used, a surfactant may be added to the solution, if necessary, in order to carry out the coating in a stable manner. Although any surfactant may be used in so far as it lowers the surface tension and stabilizes the coated film, a fluorine-containing surfactant is particularly preferable. Examples of suitable trade names include "Fluorade" (manufactured by 3M Co., Ltd.), "Paintad" (manufactured by Dow Corning Co., Ltd.), "Surfron" (manufactured by Asahi Glass Co., Ltd.), "Unidain" (manufactured by Daikin Industries, Ltd.), "Megafac" (manufactured by Dainippon Ink and Chemicals, Inc.), "Eftop" (manufactured by Shin Akita Chemical Industry Co., Ltd.), "Ftagent" (manufactured by Neos Co., Ltd.), "Aron G" (manufactured by Toagosei Chemical Industry Co., Ltd.) and "Modiper" (manufactured by Nippon Oil & Fats Co., Ltd.). However, any surfactant whose chemical structure is equivalent to those of the above-mentioned surfactants may be used. If an surfactant is used, the amount added is normally in the range of 0.01 to 1 g per kg of the solution. An amount added in excess of the upper limit is not desirable, because the surfactant added may form a foreign matter which will cause a defect or the surfactant may adversely affects the orientation of the liquid crystal in such a way that the formation of a nematic hybrid orientation is difficult.

A liquid crystalline polymer is dissolved in any of the above-mentioned solvents at a desired concentration, and the resultant solution is coated on any of the aforementioned substrates. Examples of coating methods include spin coating, roll coating, die coating, printing, immersion followed by pull-up and curtain coating.

After coating, the solvent is removed and a liquid crystalline polymer layer having a uniform thickness is formed on an orienting substrate. The condition for the removal of solvent is not particularly limited in so far as almost all of the solvent is removed and the liquid crystalline layer does not move or sag. The solvent is normally removed by means of drying at room temperature, drying in an oven or drying by the blow of warm or hot air.

Since the coating/drying stage is only designed for the formation of a uniform layer of liquid crystalline polymer on a substrate, the layer prepared at this stage does not yet exhibit any nematic hybrid orientation. A monodomain nematic hybrid orientation is achieved by a heat treatment step that follows as explained below.

When a nematic hybrid orientation is formed by a heat treatment, it is desirable that the viscosity of the liquid crystalline polymer be low in order to facilitate the orientation by the effect of boundary and therefore the temperature of the heat treatment be high. In the heat treatment, in some kinds of the liquid crystalline polymer, average tilt angles obtained may vary depending on the heat treatment temperatures. In such a case, the heat treatment needs to be carried out at a temperature which brings about a desired average tilt angle. For example, in some case the heat treatment needs to be carried out at a relatively low temperature in order to obtain an orientation having a certain tilt angle, and the heat treatment may face the difficulty that the viscosity of the liquid crystalline polymer at the temperature is high and the time required for forming the orientation becomes longer. In order to avert a conceivable inconvenience, an effective procedure comprises carrying out a heat treatment at a high temperature to obtain a monodomain orientation and then lowering the temperature stepwise or gradually to a desired temperature. Anyway, the heat treatment is carried out preferably at a temperature above the glass transition point of a liquid crystalline resin to be used according to the properties of the liquid crystalline polymer and more preferably at a temperature above the glass transition point of a component having a high molecular weight.

The heat treatment is carried out normally at a temperature in the range of 50 to 300° C. and more preferably at a temperature in the range of 100 to 260° C. It is also possible to carry out the heat treatment consecutively at plural temperatures, for example, to carry out a first part of the heat treatment at a certain temperature and thereafter to carry out a second part of the heat treatment at a temperature below or above that of the first part of the heat treatment.

The time required for allowing the liquid crystalline polymer to orient sufficiently varies depending on the kinds of the liquid crystalline polymer (e.g., ratio of components) and the heat treatment temperatures, and the time is not unconditionally set. However, the time is normally in the range of 10 seconds to 120 minutes and preferably in the range of 30 seconds to 60 minutes. The orientation may be insufficient if the time is shorter than 10 seconds, whereas the productivity may undesirably decrease if the time is longer than 120 minutes.

As described above, a nematic hybrid orientation which is formed uniformly on the entire surface of an orienting substrate can be obtained.

In the present invention, a magnetic or electric field may be used in order to orient a liquid crystalline polymer in a nematic hybrid state in the above-mentioned heat treatment stage. However, if the magnetic or electric field which is applied to the liquid crystalline polymer in the heat treatment stage is too strong, the directors of the liquid crystalline polymer may orient in the same direction because of the uniform force of the magnetic or electric field to be applied to the molecules of the liquid crystalline polymer. In this condition, it is difficult to achieve the formation of the nematic hybrid orientation of the present invention in which the angles between the directors and the direction of the plane of the film vary depending on the positions in the direction of the thickness of the film.

The nematic hybrid orientation formed in the liquid crystalline state of the liquid crystalline polymer can be immobilized without any impairment of the uniformity of the orientation by cooling down the liquid crystalline polymer to a temperature below the transition point of the liquid crystalline polymer. Contrary to the apprehension that the nematic orientation in a liquid state of a liquid crystalline polymer which has a smectic or crystalline phase at a temperature lower than that for the nematic phase is generally liable to be destroyed if the liquid crystalline polymer exhibiting the nematic orientation at the liquid crystalline state is cooled down, a perfect monodomain nematic hybrid orientation can be immobilized in the present invention without the destruction of the monodomain nematic hybrid orientation, because no phase transition to a smectic or crystalline phase takes place. This is because the liquid crystalline polymer of the present invention has the following properties:

(1) The liquid crystalline polymer does not have any smectic or crystalline phase at all at a temperature lower than a temperature at which the liquid crystalline polymer exhibits a nematic phase;

(2) even if the liquid crystalline polymer has a potential for exhibiting a crystalline or smectic phase, the smectic phase or crystalline phase does not actually appear in the process of cooling; and (3) the liquid crystalline polymer has no fluidity in a range of temperature at which an optically compensating film is used and therefore the oriented state of the liquid crystalline polymer does not change even if an external field or force is applied to it.

The temperature at which the film is cooled after the heat treatment and the monodomain hybrid nematic orientation is immobilized is not particularly limited in so far as the temperature is below the liquid crystal transition temperature. For example, a uniform nematic hybrid orientation can be immobilized by carrying out the cooling of the liquid crystalline polymer at a temperature 10° C. lower than the liquid crystal transition point. The means for the cooling is not particularly limited, and the nematic hybrid orientation can be immobilized by merely transferring the liquid crystalline polymer from the hot atmosphere of a heat treatment stage into an atmosphere of a temperature below than that of the liquid crystal transition point, for example, into an atmosphere of room temperature. Besides, in order to enhance the productivity, the cooling or heat removal of the liquid crystalline polymer may be performed forcibly by air cooling or water cooling. However, it should be noted that, in some liquid crystalline polymers, the average tilt angle obtained may vary somewhat depending on the cooling rate. Therefore, if a liquid crystalline polymer has such a property and yet a strict control of tilt angle is required, it is preferable to take cooling conditions into consideration when carrying out the cooling operation.

Angle control of the nematic hybrid orientation in the direction of the thickness of the film is explained below. According to an optically compensating film of the present invention, in the vicinity of the boundary faces of the film, the absolute value of an angle between the director of the liquid crystalline polymer and the plane of the film is within a range of 0 to 50 degrees in a region either in the vicinity of the upper or lower face of the film or within a range of 60 to 90 degrees in an opposite region of the film. The angle can be controlled to a desired value by selecting appropriately the kinds of the liquid crystalline polymer (e.g., ratio of components), orienting substrate, heat-treating condition and the like. It is also possible to control the angle to a desired value even after the immobilization of the nematic hybrid orientation by, for example, uniformly shaving the surface of the film or uniformly dissolving the surface of the film by immersing the film in a solvent. The solvent to be used is selected appropriately depending on the kinds of the liquid crystalline polymer (e.g., ratio of components) and the orienting substrate.

An optically compensating film of the present invention obtained according to the above-mentioned steps has a nematic hybrid orientation which is in a uniform and immobilized state. Due to this orientation, an upper region and a lower region are not equal to each other, and an in-plane anisotropy is also present. Therefore, if the film is set to a TN-LCD, a variety of properties can be created. As to the application of the optically compensating film of the present invention, a variety of optical applications can be expected in addition to the use as an optically compensating film which acts effectively for the compensation of angles of visual field and colors of a liquid crystal cell.

Details of a method in which an optically compensating film of the present invention is used as a film for the compensation of angles of visual field of a twisted nematic liquid crystal cell are given below.

In the case where the optically compensating film of the present invention is actually used in a twisted nematic liquid crystal cell, the possible modes of use of the film are as follows:

(1) The optically compensating film is used as a single body after removing the orienting substrate from the film;

(2) the optically compensating film is used on the substrate still adhered to the film; and (3) the optically compensating film is laminated to a substrate other than the orienting substrate.

In the case where the film in the form of a single body is used, it can be prepared by removing the orienting substrate from the optically compensating film at the boundary surface between the substrate and the film by any one of the following methods: a method in which the orienting substrate is removed mechanically by use of a roll or the like, a method in which the optically compensating film together with the substrate are immersed in a solvent having a poor solvency to all of the constituting materials and thereafter the substrate is removed mechanically, a method in which the substrate is removed while applying ultrasonic wave to a set of the optically compensating film in a poor solvent, a method in which the substrate is removed by taking advantage of the difference of the coefficient of thermal expansion between the orienting substrate and the optically compensating film in the course of changing the surrounding temperatures, and a method in which the orienting substrate itself or an orienting layer on the orienting substrate is dissolved away. Since the removability varies depending on the kinds of the liquid crystalline polymer (e.g., ratio of components) and adhesion of the polymer to the orienting substrate, a method most suitable to an individual system of the optically compensating film and the substrate should be employed. If the optically compensating film cannot be used as a single body because the film lacks enough strength to be free-standing due to, for example, the thinness of the film, it is desirable from the viewpoint of the strength and reliability of the optically compensating film to fix the film by use of a bonding agent or an adhesive to an optically acceptable substrate, for example, a plastic substrate made from a material such as polymethacrylate, polycarbonate, polyvinyl alcohol, polyethersulfone, polysulfone, polyarylate, polyimide, amorphous polyolefin and triacetylcellulose.

The following description relates to the case where the optically compensating film is formed on an orienting substrate and used without being separated from the substrate. If the orienting substrate is transparent and optically isotropic or if the substrate is a component necessary for a TN-LCD, the TN-LCD can contain the whole of the optically compensating film and the substrate as a desired optically compensating element.

Further, it is also possible to remove the optically compensating film of the present invention which is obtained by orienting and immobilizing a liquid crystalline polymer on an orienting substrate from the substrate, and to thereafter laminate the film to other substrate which is more suitable to an optical application. That is, an optically compensating element which is in the form of a laminated body composed of at least the optically compensating film and a substrate other than an orienting substrate can be incorporated into a TN-LCD.

For example, if the orienting substrate is necessary for imparting a nematic hybrid orientation to the liquid crystalline polymer but affects adversely a TN-LCD, the orienting substrate can be removed from the optically compensating film after the orientation is immobilized. More concrete examples of procedure are given below.

The procedure comprises the steps of laminating a substrate (hereinafter referred to as "a second substrate") which is suitable as a liquid crystal display element to be incorporated into a TN-LCD aimed at to an optically compensating film on an orienting substrate by means of a bonding agent or an adhesive, removing the orienting substrate from the optically compensating film of the present invention at the boundary between the orienting substrate and the optically compensating film, and transferring the optically compensating film to the second substrate which is suitable for use in the liquid crystal display to thereby obtain an optically compensating element.

The second substrate to be used for the transfer is not particularly limited in so far as the substrate is appropriately flat. Glass substrates and transparent optically isotropic plastic films are preferably used. These plastic films are made of, for example, polymethyl methacrylate, polystyrene, polycarbonate, polyethersulfone, polyphenylene sulfide, polyarylate, amorphous polyolefin, triacetylcellulose or epoxy resins. Among these plastics, polymethyl methacrylate, polycarbonate, polyarylate, polyethersulfone and triacetylcellulose are preferable. Further, an optically anisotropic film can also be used, if the optically anisotropic film is a component necessary for a TN-LCD. Examples of the optically anisotropic film include a retarder and a polarizing film obtained by stretching a plastic film such as a polycarbonate or polystyrene film.

An example of the second substrate to be used is a liquid crystal cell itself. Since a liquid crystal cell uses an upper glass or plastic substrate and a lower glass or plastic substrate each having an electrode attached thereto, the incorporation of the optically compensating film of the present invention is completed if the optically compensating film of the present invention is transferred to any one or both of the upper and lower substrates. Alternatively, it is naturally possible to produce the optically compensating film of the present invention by using the glass or plastic substrates themselves which constitute the liquid crystal cell as an orienting substrate.

The second substrate described above is not required to be substantially capable of controlling the orientation of the liquid crystalline polymer. Further, the presence of a film such as an orienting film is not necessary between the second substrate and the optically compensating film.

The bonding agent or adhesive to be used in laminating the second substrate for use in the transfer with the optically compensating film of the present invention is not particularly limited in so-far as the bonding agent or adhesive is of an optical grade. Examples of the bonding agent or adhesive include acrylic compounds, epoxy compounds, ethylene/vinyl acetate copolymers, rubber, urethane and mixtures thereof. Bonding agents, such as heat-curable, photo-curable and electron beam-curable types, may be used without problem only if these bonding agent are optically isotropic.

The transfer of the optically compensating film of the present invention to the second substrate suitable as a liquid crystal display element is performed by laminating the optically compensating film with the second substrate and thereafter removing the orienting substrate from the film at the boundary between the orienting substrate and the film. As stated previously, examples of methods for removing the substrate include the following methods: a method in which the orienting substrate is removed mechanically by use of a roll or the like; a method in which a set of the optically compensating film and the substrate is immersed in a solvent having a poor solvency to all of the constituting materials and thereafter the substrate is removed mechanically; a method in which the substrate is removed while applying ultrasonic wave to a set of the optically compensating film in a poor solvent; a method in which the substrate is removed by taking advantage of the difference of the coefficient of thermal expansion between the orienting substrate and the optically compensating film in the course of changing the surrounding temperature; and a method in which the orienting substrate itself or an orienting layer on the orienting substrate is dissolved away. Since the removability varies depending on the kinds of the liquid crystalline polymer (e.g., ratio of components) and adhesion of the polymer to the orienting substrate, a method most suitable to an individual system of the optically compensating film and the substrate should be employed.

For the purpose of, for example, surface protection, enhancement in strength and in the reliability of resistance to environments, a protective layer such as a transparent plastic film can be formed on the optically compensating film of the present invention.

The optically compensating film obtained in the above-described way exhibits an excellent effect in compensating the angles of visual field for a TN-LCD in particular. The film thickness necessary for the optically compensating film to exhibit a superior compensation effect in TN-LCDs varies depending on the system and optical parameters of a TN-LCD in question, and therefore the thickness is not unconditionally defined. The thickness is normally in the range of 0.1 to 20 $\mu$m, preferably in the range of 0.2 to 10 $\mu$m, and most preferably in the range of 0.3 to 5 $\mu$m. If the film thickness is less than 0.1 $\mu$m, a sufficient compensation effect may not be obtained. If the film thickness is more than 20 $\mu$m, the display may be unnecessarily colored.

In order for the optically compensating film of the present invention to better function, it is desirable to scrutinize the more detail of the optical parameters and arrangement of axes of the optically compensating film as explained below.

An apparent in-plane retardation value when viewed from a direction normal to the film is described first of all. In a film in a state of nematic hybrid orientation, a refractive index in a direction parallel to the director (hereinafter referred to as "ne") differs from a refractive index in a direction perpendicular to the director (hereinafter referred to as "no"). If a value obtained by subtracting no from ne is defined as an apparent index of birefrigence, the apparent retardation value is a product of the apparent index of birefrigence and an absolute film thickness. The abovementioned apparent retardation value can be easily obtained by an optical measurement with polarized light such as ellipsometry. An apparent retardation value of the optically compensating film of the present invention at the single-color light of 550 nm is normally in the range of 5 to 500 nm, preferably in the range of 10 to 300 nm, and most preferably in the range of 15 to 150 nm. If the apparent retardation value is smaller than 5 nm, the orientation is substantially the same as a homeotropic orientation and therefore a sufficient effect in the enlargement of angle of visual field may not be obtained. If the apparent retardation value is greater than 500 nm, the liquid crystal display may exhibit an unnecessary color when the display is viewed from an oblique direction.

Angles of directors are described below.

As for angles of directors in the direction of thickness of the film of a nematic hybrid orientation, an acute angle between the director of the liquid crystalline polymer and the projected component of the director on to the boundary face of the film is within a range 60 to 90 degrees either in the upper or lower face of the film or within a range of 0 to 50 degrees in an opposite face of the film. More preferably, the absolute value of one of the foregoing two angles is 80 to 90 degrees and the absolute value of the other angle is 0 to 30 degrees.

Average tilt angles are explained below.

In the present invention, an average, which is calculated in the direction of film thickness, of angles between directors of the liquid crystalline polymer and the projected components of the directors on the plane of the substrate is defined as an average tilt angle. The average tilt angle can be obtained by the application of a crystal rotation method. The average tilt angle of the optically compensating film of the present invention is in the range of 10 to 60 degrees and preferably in the range of 20 to 50 degrees. If the average tilt angle is smaller than 10 degrees or greater than 60 degrees, a satisfactory effect in the enlargement of angle of visual field may not be obtained, although a certain effect in the enlargement of angle of visual field is found.

The disposition of the optically compensating film of the present invention for use in the enlargement of angle of visual field of a TN-LCD is explained below. The position of the optically compensating film is not particularly limited if it is disposed between a polarizer and a liquid crystal cell. Further, one or a plurality of optically compensating films may be used. From a practical viewpoint, it is preferable to use one or two of the optically compensating films of the present invention for the purpose of compensating the angle of visual field. Although 3 or more optically compensating films may be used for the purpose of compensating the angle of visual field, the resultant effect will not be proportionate to the cost-up. The following example is given to illustrate the disposition of the optically compensating film. It should be noted that the following example is an illustrative non-limiting example of the present invention.

The upper face and lower face of the optically compensating film are defined as follows.

In a film, a face which makes an acute angle with the director of a liquid crystalline polymer exhibiting an optically positive uniaxiality such that the angle is within a range of 60 to 90 degrees is defined as b face, while a face which makes an acute angle with the director of the liquid crystalline polymer such that the angle is within a range of 0 to 50 degrees is defined as c face.

The tilt direction of the optically compensating film is defined as follows.

When the c face is viewed from the b face of the optically compensating film through the layer of liquid crystal polymer, a direction in which an angle between the director and the projected component of the director on the c face makes an acute angle and which is parallel to the projected component of the director is defined as a tilt direction of the optically compensating film.

The pre-tilt direction of a liquid crystal cell is defined as follows.

In the boundary between liquid crystalline layer and an electrode of a liquid crystal cell, liquid crystalline molecules which have a low molecular weight are generally not parallel to the boundary face of the cell but tilted at a certain angle. This angle is defined as a pre-tilt angle. A direction in which an angle between the director of the liquid crystal in the boundary face of the cell and the projected component of the director on to the boundary face is an acute angle and which is parallel to the projected component of the director is defined as a pre-tilt direction of the liquid crystal cell.

Based on the definitions given above, the case where one sheet of the optically compensating film is used in a TN-LCD is explained below. The optically compensating film is disposed between a polarizer and a liquid crystal cell, while the optically compensating film may be on the upper or lower side of the cell. In this case, it is preferable that the tilt direction of the optically compensating film nearly coincides with the pre-tilt direction of the liquid crystal in the boundary face of the cell on the side which does not adjoin to the optically compensating film. The angle between the tilt direction and the pre-tilt direction is preferably in the range of 0 to 15 degrees, more preferably in the range of 0 to 10 degrees, and most preferably in the range of 0 to 5 degrees. If the angle is greater than 15 degrees, a satisfactory effect in the compensation of angle of visual field may not be obtained.

Next, the case where two sheets of the optically compensating film are used in a TN-LCD is explained below. The two optically compensating films are disposed on upper or lower face of a liquid crystal cell which is sandwiched between a pair of the upper and the lower polarizers. The two optically compensating films may be on the same side of the liquid crystal cell, or it is also possible that one of the optically compensating films is on the upper side of the liquid crystal cell and the other of the optically compensating films is on the lower side of the liquid crystal cell. Further, the two optically compensating films may have the same or different parameters.

In the present invention, if two optically compensating films are disposed such that one of the optically compensating films is on the upper side of the liquid crystal cell and the other of the optically compensating films is on the lower side of the liquid crystal cell, each of the optically compensating films is preferably placed as in the case where a single optically compensating film is used. That is, it is preferable that the tilt direction of the liquid crystalline polymer in each of the optically compensating films nearly coincides with the pre-tilt direction of the liquid crystal in the boundary face of the cell on the side which does not adjoin to the optically compensating film. The angle between the tilt direction and the pre-tilt direction is preferably in the range of 0 to 15 degrees, more preferably in the range of 0 to 10 degrees, and most preferably in the range of 0 to 5 degrees.

In the present invention, if both of the two optically compensating films are disposed either on the upper or lower side of the liquid crystal cell, a first optically compensating film which is nearer to the liquid crystal cell is placed as in the case where a single optically compensating film is used. That is, it is preferable that the tilt direction of the first optically compensating film nearly coincides with the pre-tilt direction of the nematic liquid crystal in the boundary face of the liquid crystal cell on the side which does not adjoin to the optically compensating film. The angle between the tilt direction and the pre-tilt direction is preferably in the range of 0 to 15 degrees, more preferably in the range of 0 to 10 degrees, and most preferably in the range of 0 to 5 degrees. Although a second optically compensating film is present between the first optically compensating film and the polarizer, it is preferable that the pre-tilt direction of the nematic liquid crystalline polymer in the boundary face of the liquid crystal cell adjacent to the first optically compensating film nearly coincides with the tilt direction of the second optically compensating film.

Since the optically compensating film of the present invention has a nematic hybrid orientation, the upper face and lower face of the optically compensating film are not equivalent to each other. Accordingly, when the optically compensating film is attached to a liquid crystal cell, the effect in compensation will differ somewhat depending on the selection, that is, which of the above-mentioned two faces comes nearer to the liquid crystal cell. When the optically compensating film of the present invention is incorporated in a TN-LCD, it is preferable that the face in which the angle between the director of the liquid crystalline polymer and the plane of film is larger (i.e., the face in which the angle is 60 to 90 degrees) be present nearer to the liquid crystal cell and farther from the polarizer.

Lastly, the disposition of the polarizers is explained. Generally, there are two cases of disposition for a TN-LCD, i.e., the case where the light transmission axes of the upper and lower polarizers cross each other and the case where these axes are parallel to each other. Further, if the light transmission axes of the upper and lower polarizers cross each other, there are additional cases, that is, the light transmission axis of the polarizer and the rubbing direction of the liquid crystal cell on the side nearer to the polarizer are parallel, normal or at an angle of 45 degrees to each other. Although each of the above-mentioned dispositions of the polarizer on the optically compensating film of the prevent invention is capable of enlarging the angle of the visual field, the most preferable is the case where the light transmission axes of the upper and lower polarizer cross each other. The relationship between the light transmission axis and the rubbing direction of the liquid crystal cell on the side nearer to the polarizer may be parallel or normal to each other, although the compensation effect may differ somewhat.

The optically compensating film of the present invention remarkably improves the angle of visual field in a TN-LCD utilizing a TFT or MIM element. In addition, the optically compensating film of the present invention is also effective in the color compensation and improvement of the charac- teristics of angle of visual field of other modes of LCD such as STN (Super Twisted Nematic)-LCD, ECB (Electrically Controlled Birefringence)-LCD, OMI (Optical Mode Interference)-LCD, OCB (Optically Compensated Birefringencey-LCD, HAN (Hybrid Aligned Nematic)-LCD, and IPS (In Plane Switching)-LCD. Furthermore, the optically compensating film of the present invention is industrially very valuable because of the advantages that the raw materials for the liquid crystalline compound are easily obtainable, that the preparation procedure of the liquid crystalline compound from which the film is prepared and also the preparation procedure of the film itself are simple, and that the film obtained is superior in reliability and particularly in heat resistance.

EXAMPLES

Following examples are given by way of illustration and not by way of limitation. The measurements in the examples were conducted in accordance with the following methods.
(1) Determination of the Composition of Liquid Crystalline Polymers A polymer was dissolved in deuterated chloroform or trifluoroacetic acid and the composition was determined by means of $^1$H-NMR at 400 MHz (JNM-GX400 manufactured by Nippon Electronics Co., Ltd.)
(2) Determination of Logarithmic Viscosity A polymer was dissolved in a phenol/1,1,2,2-tetrachloroethane (60/40 by weight ratio) mixture at a concentration of 0.5 dl/g, and the measurement was conducted at 30° C. by means of an Ubbelohde viscometer. A logarithmic viscosity $[\eta_{inh}]$ was calculated according to the following equation:

$$[\eta_{inh}]=1/0.5\ln \tau/\tau_o$$

where $\tau$ and $\tau_o$ represent, respectively, time required for a sample solution and solvent to flow down through the capillary of the viscometer.
(3) Determination of the Phase of a Liquid Crystalline Polymer The determination was made by means of DSC (DSC-7 manufactured by Perkin Elmer Corporation) and by means of an optical microscope (BH2 polarizing microscope manufactured by Olympus Optical Co., Ltd.)
(4) Measurement of Refractive Index Measurement was conducted by means of Abbe's refractometer (Type-4 manufactured by Atago Co., Ltd.).
(5) Ellipsometry Observation was conducted by means of Ellipsometer DVA-36VWLD manufacture by Yokomizo Optical Industry Co., Ltd.
(6) Measurement of Film Thickness SURFACE TEXTURE ANALYSYS SYSTEM Dektak 3030ST manufactured by SLOAN Corporation was used. In addition, a method, in which the film thicknesses were obtained from data of measurement by means of interference wave (Ultraviolet/Visible/Near-infrared Spectrophotometer V-570 manufactured by Nippon Bunko Co., Ltd.) and data of refractive index, was also employed.

Example 1

A mixture of 10 mmol of 4-n-hexylbenzoic acid, 95 mmol of terephthalic acid, 50 mmol of hydroquinone diacetate, 50 mmol of 3-methylcatecol diacetate and 100 mg of sodium acetate was polymerized for 12 hours at 270° C. in a nitrogen atmosphere. The reaction product obtained was dissolved in tetrachloroethane and the resulting solution was combined with methanol to purify the product by way of precipitation. In this way, 22.0 g of a liquid crystalline polyester (formula (1)) was obtained. This liquid crystalline polyester had a logarithmic viscosity of 0.15, a nematic phase as a liquid crystal phase, an isotropic-liquid crystal phase transition temperature of 240° C. and a glass transition temperature of 75° C.

A 10 wt % solution of this liquid crystalline polymer in a solvent mixture of phenol/tetrachloroethane (6/4 by weight) was then prepared. The solution was bar-coated on a sheet of soda glass. After being dried, the coating was heat-treated at 190° C. for 30 minutes, and cooled at room temperature to be immobilized. In this way, a uniformly oriented liquid crystalline polymer having a film thickness of 15 μm was obtained. When the liquid crystalline polymer was observed under a conoscope, the liquid crystalline polymer was found to have a positive uniaxiality and to have a homeotropic orientation.

Then, an 8 wt % solution of the liquid crystalline polymer having the formula (1) in tetrachloroethane was prepared. The solution was spin-coated on a rubbing-treated polyimide film overlying a sheet of glass. After being dried, the coating was heat-treated at 190° C. for 20 minutes, and cooled at room temperature to be immobilized. In this way, a film for use as an optical element was obtained. The film on the substrate was transparent, free from defect in orientation and uniform, and had a film thickness of 1.55 μm.

Utilizing the optical measuring systems as shown in FIGS. 1 and 2, a retardation value was then measured by tilting the film in the rubbing direction of the substrate. The result is shown in FIG. 3 which indicates that the curve obtained is asymmetric in terms of right and left and has no angle at which the retardation value is 0. This result elucidates that the directors of the liquid crystalline polyester are tilted in relation to the substrate and are not in a uniformly tilted orientation (i.e., an orientation in which the angles between the directors and the substrate are constant in the direction of the film thickness).

Next, the film on the substrate was cut into 5 pieces, each of which was immersed in methanol containing 3 wt % of chloroform for a certain period of time to dissolve away the liquid crystalline polymer from the uppermost layer. The periods of immersion were 15 seconds, 30 seconds, 1 minute, 2 minutes and 5 minutes, respectively, and the corresponding thicknesses of the liquid crystalline layer which remained undissolved were 1.35 μm, 1.10 μm, 0.88 μm, 0.56 μm and 0.37 μm. Utilizing the optical measuring systems as shown in FIGS. 1 and 2, a retardation value at θ=0 (retardation value at front) was then measured. The relationship between the film thickness and the retardation value thus obtained is shown in FIG. 4. As is apparent from FIG. 4, the relationship is nonlinear, which indicates that the orientation obtained is not in a uniformly tilted orientation. The dotted line in FIG. 4 indicates a linear line which should be observed in a film in a state of a uniformly tilted orientation.

By employing the same procedure as described above, the liquid crystalline polymer having the formula (1) was coated on a rubbing-treated polyimide film overlying a sheet of glass having a high refractive index (refractive index: 1.84), and the coating was oriented and immobilized to obtain an optically compensating film. The film obtained was subjected to the measurement of refractive index. In the measurement of refractive index, when the glass substrate was placed in contact with the prism face of the refractometer and the boundary face of the optically compensating film facing the substrate was on the lower side of the boundary face of the optically compensating film facing air, the refractive indices in the planes of the film were found to be anisotropic such that the refractive index in a plane normal to the rubbing direction was 1.55, the refractive index in a plane parallel to the rubbing direction was 1.70, and the refractive index in the direction of film thickness was constant at 1.55 irrespective of the directions of the specimen. Based on this fact, it was found that the orientation of rod-like liquid crystalline molecules constituting the liquid crystalline polyester was planar in the direction parallel to the substrate in the boundary face of the optically compensating film facing the substrate. Conversely, when the measurement was conducted by bringing the boundary face of the optically compensating film facing air into contact with the prism surface of the refractometer, the refractive indices in the planes of the film were found to have no anisotropy and to be constant at 1.55, and the refractive index in the direction of film thickness was constant at 1.70 irrespective of the directions of the specimen. Based on this fact, it was found that rod-like liquid crystalline molecules constituting the liquid crystalline polyester were oriented in the direction normal to the plane of the substrate in the boundary face of the optically compensating film facing air.

Based on these results, it was found that a film for use as an optical element, which was composed of a positive uniaxial crystalline polymer, had a nematic hybrid orientation and exhibited an orientation as illustrated in FIG. 5 owing to the force of the rubbing-induced constraint of the boundary of substrate and also owing to the force of constraint of the boundary of air.

In order to measure the angle of the direction of director more precisely in the boundary of the film facing the substrate, the following operations were performed.

Another rubbing-treated polyimide film overlying a glass substrate was closely adhered to the above-described film for use as an optical element formed on a rubbing-treated polyimide film overlying a sheet of glass having a high refractive index. That is, the optically compensating film was sandwiched between the two rubbing-treated polyimide films. In this case, the rubbing directions in the upper and lower rubbing-treated films were disposed at 180 degrees to each other. In this state, the specimen was heat-treated at 190° C. for 30 minutes. The specimen thus obtained was subjected to the measurement of refractive index and ellipsometry. The refractive index obtained did not vary between the upper and lower regions within the film for use as an optical element. The refractive indices were found to be such that the refractive index in a plane normal to the rubbing direction was 1.55, the refractive index in a plane parallel to the rubbing direction was 1.70, and the refractive index in the direction of film thickness was at 1.55. Based on this fact, it was found that the directors of the crystalline polyester were oriented in the direction nearly parallel to the substrate in the vicinity of the boundary of the optically compensating film facing substrates both in the upper and lower regions of the film. Further, based on the results of ellipsometry, it was found that the structure of refractive index was approximately of a positive uniaxiality. Furthermore, based on close analysis by means of crystal rotation, it was found that the director was slightly tilted in the vicinity of the boundary of the film facing the substrate and the angle between the director and the plane of the substrate was about 3 degrees. The direction in which the director tilted coincided with the rubbing direction (the tilt direction of the film for use as an optical element coincided with the rubbing direction). Accordingly, based on the understanding that the direction of directors in the boundary of the crystalline polymer facing the substrate is almost determined by the interaction between the liquid crystalline polymer and the boundary of the orienting substrate, it is presumed that the direction of the directors in the boundary of the polymer facing the substrate is 3 degrees in the above-described film for use as an optical element in a state of a nematic hybrid orientation formed on the orienting substrate.

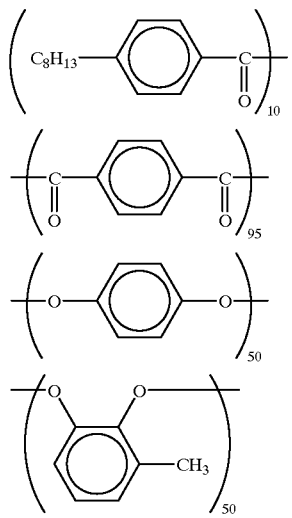

formula (1)

In the arrangement of FIG. 6, a voltage which divided the difference in transmittance between the white display and black display evenly into 8 regions was applied to the liquid crystal cell, and the lateral (0 to 180 degrees) gradation characteristics were measured by means of a Color Brightness Meter BM-5 manufactured by Topcon Co., Ltd. The results are shown in FIG. 8.

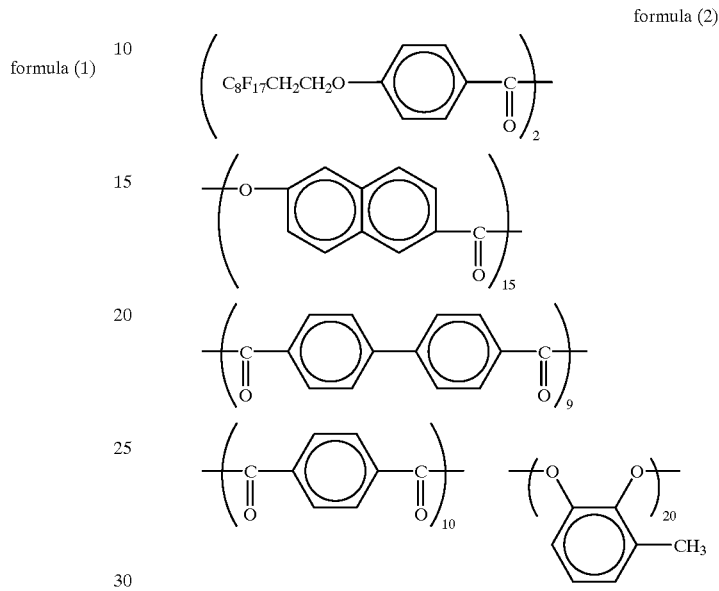

formula (2)

Example 2

As in Example 1, a liquid crystalline polyester having the formula (2) was synthesized. The liquid crystalline polyester obtained had a logarithmic viscosity of 0.16, a nematic phase as a liquid crystal phase, an isotropic-liquid crystal phase transition temperature of 220° C. and a glass transition temperature of 100° C. After the same examination of orientation as in Example, 1 the liquid crystalline polyester was found to have a homeotropic orientation and to have a positive uniaxiality and to have a homeotropic orientation.

Then, a 7 wt % solution of the liquid crystalline polymer having the formula (2) in chloroform was prepared. The solution was spin-coated on a rubbing-treated polyimide film overlying a sheet of glass. After being dried, the coating was heat-treated at 250° C. for 30 minutes, and cooled to be immobilized. The film on the substrate was transparent, free from defect in orientation and uniform, and had a film thickness of 0.40 μm and an average tilt angle in the direction of film thickness of 45 degrees. According to the arrangement of axes of the optical elements as shown in FIG. 6, one of the liquid crystalline, optically compensating films was positioned on the upper side and the other was positioned on the lower side of a liquid crystalline cell such that the boundary of the optically compensating film facing air was positioned nearer to the liquid crystal cell. The liquid crystal cell used ZLI-4792 as a liquid crystal material. As to the cell parameters, the cell gap was 4.8 μm, the twist angle was 90 degrees (left twist), and the pre-tilt angle was 4 degrees. A rectangular-wave voltage of 300 Hz was applied to the liquid crystal cell. Using the ratio of transmittance at white display (0V) to black display (6V) as a contrast ratio, the contrast ratios were measured from all directions by means of FFP Optical System DVS-3000 manufactured by Hamamatsu Photonics Co., Ltd., and equi-contrast curves were depicted. The results are shown in FIG. 7.

Comparative Example 1

Utilizing the same TN-type liquid crystal cell as in Example 2 and the same arrangement as in FIG. 6 excepting that no optically compensating film was used, the contrast ratios were measured from all directions, and the lateral (0 to 180 degrees) gradation characteristics were measured. The results are shown in FIGS. 9 and 10, respectively.

Example 3

Liquid crystalline polyesters having, respectively, the structure of formula (3) and the structure of formula (4) were synthesized. The liquid crystalline polyester of formula (3) had a logarithmic viscosity of 0.12, a nematic phase as a liquid crystal phase, an isotropic-liquid crystal phase transition temperature of 200° C. and a glass transition temperature of 90° C. The orientation was examined as in Example 1, and the liquid crystalline polyester of formula (3) was found to have a homeotropic orientation and to have a positive uniaxiality.

The liquid crystalline polyester of formula (4) had a logarithmic viscosity of 0.15, a nematic phase as a liquid crystal phase and an isotropic-liquid crystal phase transition temperature of 300° C. or higher. 10 wt % solution of this liquid crystalline polymer in a solvent mixture of phenol/tetrachloroethane (6/4 by weight) was then prepared. The solution was coated by screen printing on each of the orienting substrates enumerated below. After being dried, the coating was heat-treated at 230° C. for 10 minutes. The substrates employed were soda glass, borosilicate glass, polyethylene terephthalate, polyimide, polyetherimide, polyetheretherketone and polyethersulfone. According to the observation by means of a microscope, a schlieren texture was found in the liquid crystal phase on each of the substrates, and the polymer was found to be homogeneously oriented.

Then, a mixture of the liquid crystalline polyesters of the formulas (3) and (4) in the weight ratio of 20:80 was dissolved in tetrachloroethane to prepare a 5 wt % solution. As in Example 2, the solution was coated, and the coating was dried, heat-treated to obtain an optically compensating film. The optically compensating film had a film thickness of 0.50 μm and an average tilt angle in the direction of film thickness of 30 degrees. As in Example 2, the contrast ratios were measured from all directions. The results are shown in FIG. 11.

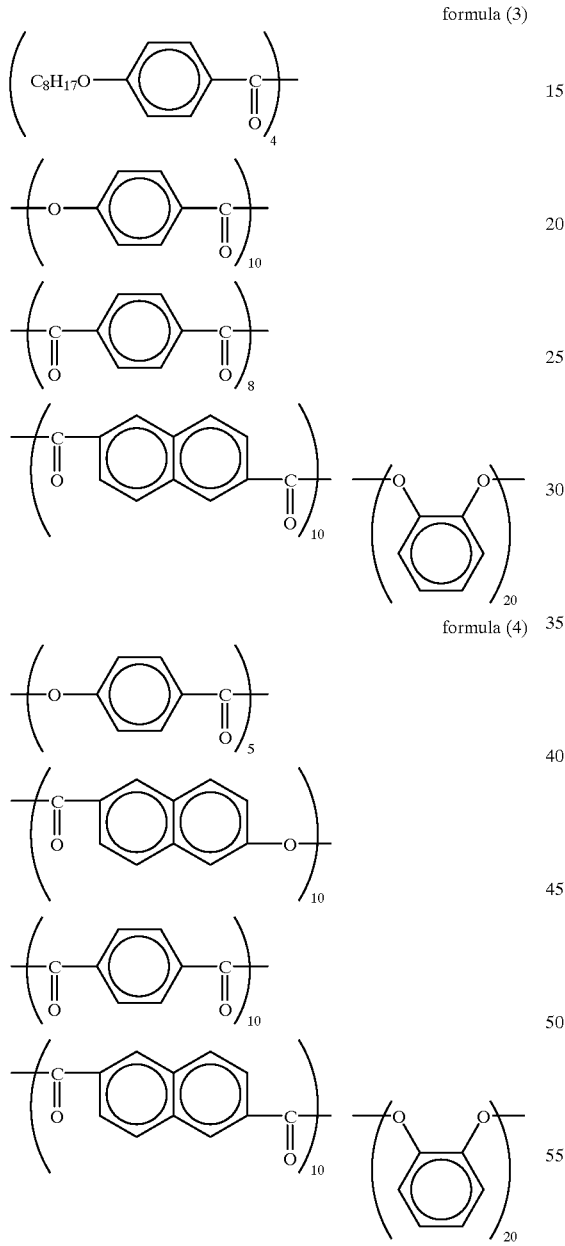

Example 4

Liquid crystalline polyesters having, respectively, the structure of formula (5) and the structure of formula (6) were synthesized. The liquid crystalline polyester of formula (5) had a logarithmic viscosity of 0.15, a nematic phase as a liquid crystal phase, an isotropic-liquid crystal phase transition temperature of 220° C. and a glass transition temperature of 100° C. The orientation was examined as in Example 1, and the liquid crystalline polyester of formula (5) was found to have a homeotropic orientation and to have a positive uniaxiality.

The liquid crystalline polyester of formula (6) had a logarithmic viscosity of 0.18, a nematic phase as a liquid crystal phase and an isotropic-liquid crystal phase transition temperature of 200° C. or higher. The orientation was examined as in Example 3, and the liquid crystalline polyester of formula (6) was found to be homogeneously oriented.

Then, a mixture of the liquid crystalline polyesters of the formulas (5) and (6) in the weight ratio of 25:75 was dissolved in tetrachloroethane to prepare a 5 wt % solution. As in Example 2, the solution was coated, and the coating was dried, heat-treated to obtain an optically compensating film. The optically compensating film had a film thickness of 0.48 μm and an average tilt angle in the direction of film thickness of 28 degrees. As in Example 2, the contrast ratios were measured from all directions. The results obtained were the same as in Example 3.

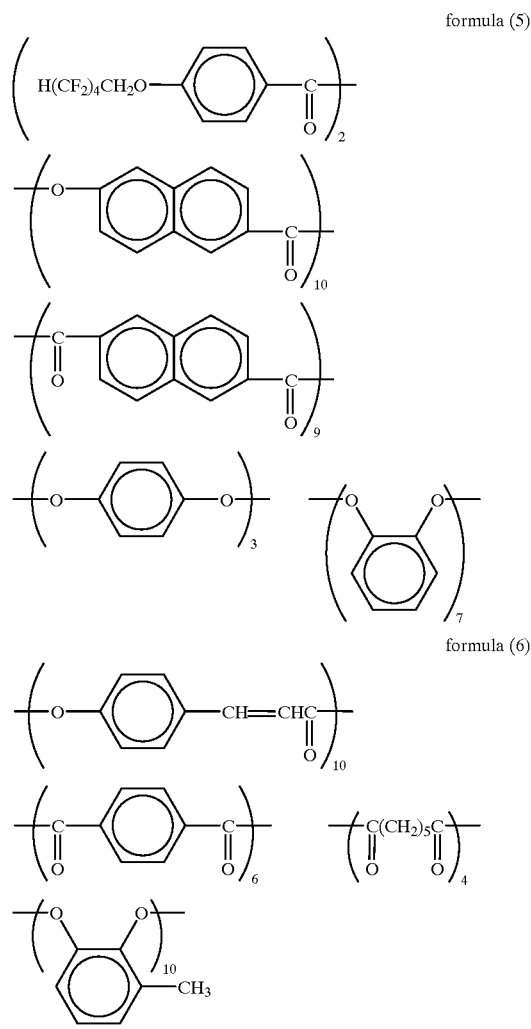

Example 5

Liquid crystalline polyesters having, respectively, the structure of formula (7) and the structure of formula (8) were synthesized. The liquid crystalline polyester of formula (7) had a logarithmic viscosity of 0.20, a nematic phase as a liquid crystal phase and an isotropic-liquid crystal phase transition temperature of 220° C. The liquid crystalline polyester of formula (8) had a logarithmic viscosity of 0.21, a nematic phase as a liquid crystal phase and an isotropic-liquid crystal phase transition temperature of 190° C. The orientation was examined as in Example 1, and the liquid crystalline polyester of the formula (7) and the liquid crystalline polyester of the formula (8) were both found to have a homeotropic orientation and to have an optically positive uniaxiality. Then, a mixture of the liquid crystalline polyesters of the formulas (7) and (8) in the weight ratio of 90:10 was dissolved in a phenol/tetrachloroethane mixture (6/4 by weight ratio) to prepare a 4 wt % solution. The solution was roll-coated for a length of 10 m on a rubbing-treated polyethylene terephthalate film having a width of 40 cm, and the coating was dried by means of hot air blow at 120° C., heat-treated at 180° C. for 20 minutes and thereafter cooled to be immobilized. The optically compensating film obtained was transferred to a triacetylcellulose film by a procedure comprising laminating the optically compensating film to an adhesive layer overlying the triacetylcellulose film and removing the polyethylene terephthalate film. The thus obtained optically compensating film had a film thickness of 0.60 μm and an average tilt angle in the direction of film thickness of 35 degrees. According to the arrangement of axes of the optical elements as shown in FIG. 6, one of the crystalline, optically compensating films was positioned on the upper side and the other was positioned on the lower side of a liquid crystal cell such that the triacetylcellulose film of the liquid crystalline, optically compensating film was positioned nearer to the liquid crystal cell. As in Example 2, the contrast ratios were measured from all directions. The results obtained are shown in FIG. 12.

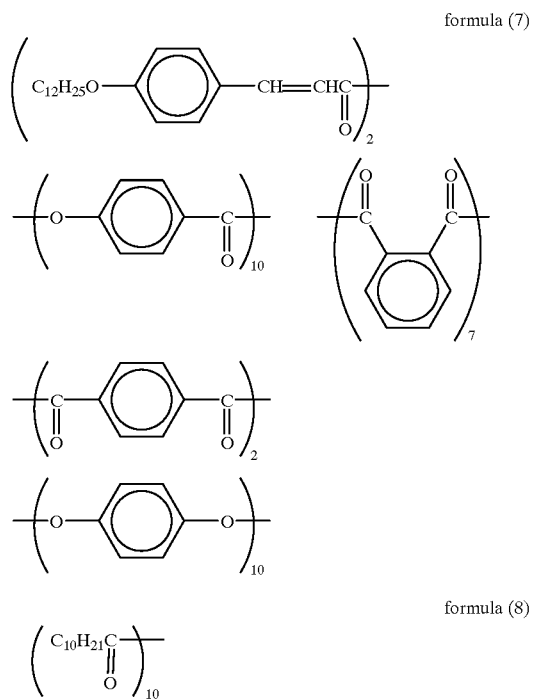

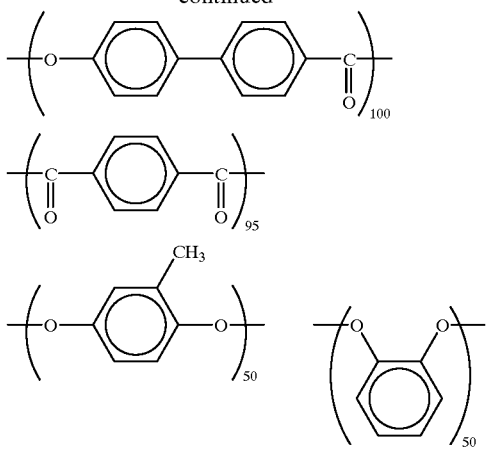

Example 6

Liquid crystalline polyesters having, respectively, the structure of formula (9) and the structure of formula (10) were synthesized. The liquid crystalline polyester of formula (9) had a logarithmic viscosity of 0.10, a nematic phase as a liquid crystal phase and an isotropic-liquid crystal phase transition temperature of 180° C. The orientation was examined as in Example 1, and the liquid crystalline polyester of formula (9) was found to have a homeotropic orientation and to have an optically positive uniaxiality.

The liquid crystalline polyester of formula (10) had a logarithmic viscosity of 0.18, a nematic phase as a liquid crystal phase and an isotropic-liquid crystal phase transition temperature of 300° C. or higher. The orientation was examined as in Example 3, and the liquid crystalline polyester of formula (10) was found to be homogeneously oriented.

Then, a mixture of the liquid crystalline polyesters of the formulas (9) and (10) in the weight ratio of 50:50 was dissolved in N-methyl-2-pyrrolidone to prepare a 8 wt % solution. The solution was die-coated for a length of 10 m on a rubbing-treated polyetheretherketone film having a width of 40 cm, and the coating was dried by means of hot air blow at 120° C., heat-treated at 220° C. for 10 minutes and thereafter cooled to be immobilized. The optically compensating film obtained was transferred to a triacetylcellulose film by a procedure comprising laminating the optically compensating film to an adhesive layer overlying the triacetylcellulose film and removing the polyetheretherketone film. The thus obtained optically compensating film had a film thickness of 0.62 μm and an average tilt angle in the direction of film thickness of 37 degrees. According to the arrangement of axes of the optical elements as shown in FIG. 6, one of the liquid crystalline, optically compensating films was positioned on the upper side and the other was positioned on the lower side of a liquid crystal cell such that the triacetylcellulose film of the liquid crystalline, optically compensating film was positioned nearer to the liquid crystal cell. As in Example 2, the contrast ratios were measured from all directions. The results obtained were the same as in Example 5.

formula (9)

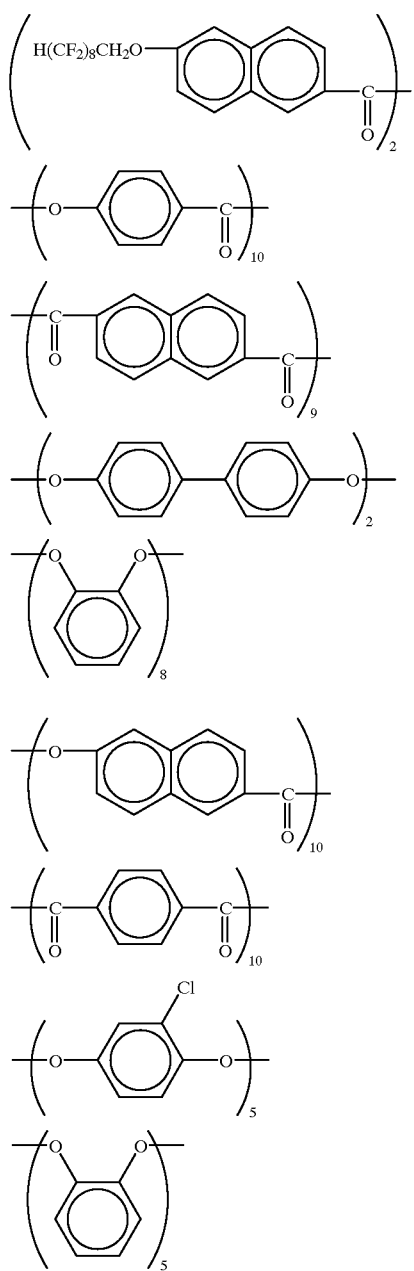

formula (10)

formula (11)

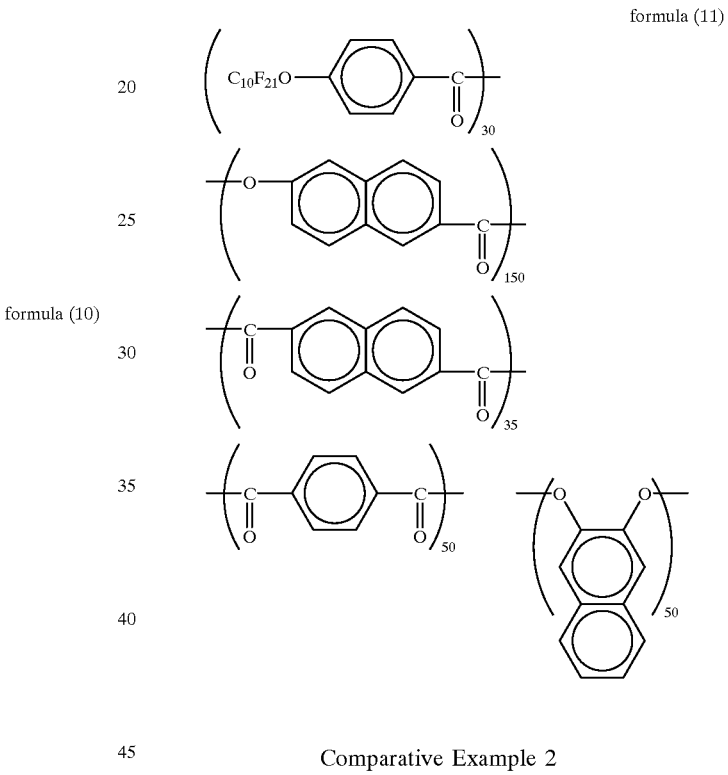

optically compensating film had a film thickness of 0.62 μm and an average tilt angle in the direction of film thickness of 35 degrees.

A polarizer was removed from a liquid crystal color television XTL-610 manufactured by Sony Corp., and one of the optically compensating films was laminated to the upper side and the other was laminated to the lower side of the liquid crystal cell such that the boundary of the optically compensating film facing air was positioned nearer to the liquid crystal cell. Then, one of the polarizers was laminated to the upper polyarylate film and the other was laminated to the lower polyarylate film. In this way, the same arrangement of axes as in FIG. 6 was made. As in Example 2, the contrast ratios were measured from all directions. The results are shown in Example 13.

Comparative Example 2

In the same liquid crystal color television XTL-610 manufactured by Sony Corp. as in Example 7 excepting that no optically compensating film was used, the contrast ratios were measured from all directions. The results are shown in FIG. 14.

Example 7

A liquid crystalline polyester of the formula (11) was synthesized. The liquid crystalline polyester had a logarithmic viscosity of 0.25, a nematic phase as a liquid crystal phase and an isotropic-liquid crystal phase transition temperature of 190° C. The orientation was examined as in Example 1, and the liquid crystalline polyester was found to have a homeotropic orientation and to have an optically positive uniaxiality. The liquid crystalline polyester was then dissolved in chloroform to prepare a 15 wt % solution. The solution was die-coated for a length of 10 m on a rubbing-treated polyimide film overlying a polyarylate film having a width of 40 cm, and the coating was dried by means of hot air blow at 100° C., heat-treated at 200° C. for 5 minutes and thereafter cooled to be immobilized. The thus obtained Example 8

A liquid crystalline polyester of the formula (12) was synthesized. The liquid crystalline polyester had a logarithmic viscosity of 0.21, a nematic phase as a liquid crystal phase and an isotropic-liquid crystal phase transition temperature of 180° C. The orientation was examined as in Example 1, and the liquid crystalline polyester was found to have a homeotropic orientation and to have an optically positive uniaxiality. The liquid crystalline polyester was then dissolved in a phenol/tetrachloroethane mixture (6/4 by weight ratio) to prepare a 10 wt % solution. The solution was roll-coated for a length of 10 m on a rubbing-treated polyimide film having a width of 40 cm, and the coating was dried by means of hot air blow at 120° C., heat-treated at 220° C. for 5 minutes and thereafter cooled to obtain an optically compensating film. Then, an ultraviolet-curable bonding agent was coated on the surface of the optically compensating film, and a film of polyvinyl alcohol was laminated to the optically compensating film via the bonding agent. After the bonding agent was cured by the irradiation of ultraviolet rays, the optically compensating film was transferred to the film of polyvinyl alcohol by removing the polyimide film. The thus obtained optically compensating film had a film thickness of 0.58 μm and an average tilt angle in the direction of film thickness of 35 degrees.

A polarizer was removed from a liquid crystal color television VM-101 manufactured by Casio Corp., and one of the optically compensating films was laminated to the upper side and the other was laminated to the lower side of the liquid crystal cell such that the boundary of the optically compensating film facing air was positioned nearer to the liquid crystal cell. Then, one of the polarizers was laminated to the upper polyvinyl alcohol film and the other was laminated to the lower polyvinyl alcohol film. In this way, the same arrangement of axes as in FIG. 6 was made. As in Example 2, the contrast ratios were measured from all directions. The results are shown in Example 15.

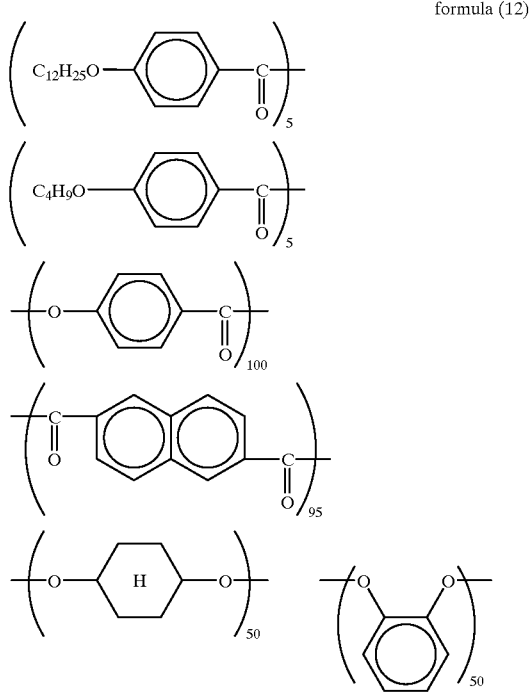

formula (12)

Comparative Example 3

In the same liquid crystal color television VM-101 manufactured by Casio Corp. as in Example 7 excepting that no optically compensating film was used, the contrast ratios were measured from all directions. The results are shown in FIG. 16.

Example 9

A mixture of 10 mmol of 4-n-hexylbenzoic acid, 95 mmol of terephthalic acid, 50 mmol of hydroquinone diacetate, 50 mmol of 3-methylcatechol diacetate and 100 mg of sodium acetate was polymerized for 12 hours at 270° C. in a nitrogen atmosphere. Further, the reaction mixture was subjected to an acetic acid eliminating polymerization at the same temperature for 2 hours under a nitrogen gas stream at a flow rate of 30 ml/min. The reaction product obtained was dissolved in tetrachloroethane, and the resulting solution was combined with methanol to purify the product by way of precipitation. In this way, 22.0 g of an end unit modified liquid crystalline polyester (formula (13)) was obtained. This liquid crystalline polyester had a logarithmic viscosity of 0.10, a nematic phase as a liquid crystal phase, an isotropic-liquid crystal phase transition temperature of 240° C. and a glass transition temperature of 75° C.

On the other hand, a mixture of 40 mmol of terephthalic acid, 40 mmol of 2,6-naphthalene dicarboxylic acid, 85 mmol of catechol diacetate and 80 mg of acetoxybenzoic acid was polymerized for 4 hours at 260° C. and thereafter at 290° C. for 2 hours in a nitrogen atmosphere. Further, the reaction mixture was polymerized for 4 hours at 290° C. under a nitrogen gas stream at a flow rate of 100 ml/min. In this way, 26 g of a liquid crystalline polyester (formula (14)) was obtained. This liquid crystalline polyester had a logarithmic viscosity of 0.16, a nematic phase as a liquid crystal phase, an isotropic-liquid crystal phase transition temperature of 300° C. or higher and a glass transition temperature of 120° C.

A 10 wt % solution of the liquid crystalline polymer (13) in a solvent mixture of phenol/tetrachloroethane (6/4 by weight) was then prepared. The solution was bar-coated on a sheet of soda glass. After being dried, the coating was heat-treated at 190° C. for 30 minutes, and cooled at room temperature to be immobilized. In this way, a uniformly oriented liquid crystalline polymer having a film thickness of 15 μm was obtained. When the liquid crystalline polymer was observed under a conoscope, the liquid crystalline polymer was found to have a positive uniaxial structure and to have a homeotropic orientation.

Then, a mixture of the liquid crystalline polyesters of the formulas (13) and (14) in the weight ratio of 1:1 was dissolved in tetrachloroethane to prepare an 8 wt % solution. The solution was spin-coated on a rubbing-treated polyimide film overlying a sheet of glass. After being dried, the coating was heat-treated at 190° C. for 20 minutes, and cooled at room temperature to be immobilized. In this way, an optically compensating film was obtained. The film on the substrate was transparent, free from defect in orientation and uniform, and had a film thickness of 1.55 μm.

Utilizing the optical measuring systems as shown in FIGS. 1 and 2, a retardation value was then measured by tilting the film in the rubbing direction of the substrate. The result is shown in FIG. 17, indicating that the curve obtained is asymmetric in terms of right and left and has no angle at which the retardation value is 0. This result elucidates that the directors of the liquid crystalline polyester are tilted in relation to the substrate and are not in a uniformly tilted orientation (i.e., an orientation in which the angles between the directors and the substrate are constant in the direction of the film thickness).

Next, the film on the substrate was cut into 5 pieces, each of which was immersed in methanol containing 3 wt % of chloroform for a certain period of time to dissolve away the liquid crystalline polymer from the uppermost layer. The periods of immersion were 15 seconds, 30 seconds, 1 minute, 2 minutes and 5 minutes, respectively, and the thicknesses of the liquid crystalline layer which remained undissolved were 1.35 μm, 1.10 μm, 0.88 μm, 0.56 μm and 0.37 μm. Utilizing the optical measuring systems as shown in FIGS. 1 and 2, a retardation value at θ=0 (retardation value at front) was then measured. The relationship between the film thickness and the retardation value thus obtained is shown in FIG. 18. As is apparent from FIG. 18, the relationship is nonlinear, which indicates that the orientation obtained is not in a uniformly tilted orientation. The dotted line in FIG. 4 indicates a linear line which should be observed in a film in a state of a uniformly tilted orientation.

By employing the same procedure as described above, the end unit modified liquid crystalline polymer having the formula (13) was coated on a rubbing-treated polyimide film overlying a sheet of glass having a high refractive index (refractive index:1.84), and the coating was oriented and immobilized to obtain an optically compensating film. The film obtained was subjected to the measurement of refractive index. In the measurement of refractive index, when the glass substrate was placed in contact with the prism face of the refractometer and the position of the boundary of the optically compensating film facing the substrate was lower than the position of the boundary of the optically compensating film facing air, the refractive indices were found to be anisotropic such that the refractive index in a plane normal to the rubbing direction was 1.55, the refractive index in a plane parallel to the rubbing direction was 1.70, and the refractive index in the direction of film thickness was constant at 1.55 irrespective of the directions of the specimen. Based on this fact, it was found that rod-like liquid crystalline molecules constituting the liquid crystalline polyester were oriented in a direction parallel to the substrate in the boundary of the optically compensating film facing the glass substrate. Conversely, when the measurement was conducted by bringing the boundary of the optically compensating film facing air into contact with the prism face of the refractometer, the refractive indices in the planes of the film were found to have no anisotropy and to be constant at 1.55, and the refractive index in the direction of film thickness was constant at 1.70 irrespective of the directions of the specimen. Based on this fact, it was found that rod-like liquid crystalline molecules constituting the liquid crystalline polyester were oriented in a direction normal to the plane of the substrate in the boundary of the optically compensating film facing air.

Based on these results, it was found that an optically compensating film, which was composed of a positive uniaxial crystalline polymer, had a nematic hybrid orientation and exhibited an orientation as illustrated in FIG. 5 owing to the force of the rubbing-induced constraint of the boundary of substrate and also owing to the force of constraint of the boundary of air.

In order to measure the angle of the direction of director more precisely in the boundary of the film facing the substrate, the following operations were performed.

Another rubbing-treated polyimide film overlying a glass substrate was closely adhered to the above-described optically compensating film formed on a rubbing-treated polyimide film overlying a sheet of glass having a high refractive index. That is, the optically compensating film was sandwiched between the two rubbing-treated polyimide films. In this case, the rubbing directions of the upper and lower rubbing-treated films were disposed at 180 degrees to each other. In this state, the specimen was heat-treated at 190° C. for 30 minutes. The specimen thus obtained was subjected to the measurement of refractive index and ellipsometry. The refractive index obtained did not vary between the upper and lower regions of the film. The refractive indices were found to be such that the refractive index in a plane normal to the rubbing direction was 1.55, the refractive index in a plane parallel to the rubbing direction was 1.70, and the refractive index in the direction of film thickness was 1.55. Based on this fact, it was found that the directors of the crystalline polyester were oriented in a direction nearly parallel to the substrate in the vicinity of the boundary of the optically compensating film facing substrates both in the upper and lower regions of the film. Further, based on the results of ellipsometry, it was found that the structure of refractive index was approximately of a positive uniaxiality. Furthermore, based on close analysis by means of crystal rotation, it was found that the director was slightly tilted in the vicinity of the boundary of the film facing the substrate and the angle between the director and the plane of the substrate was about 3 degrees. The direction in which the director tilted coincided with the rubbing direction (i.e., the tilt direction of the film coincided with the rubbing direction). Accordingly, based on the understanding that the direction of directors in the boundary of the crystalline polymer facing the substrate is almost determined by the interaction between the liquid crystalline polymer and the boundary face of the orienting substrate, it is presumed that the direction of the directors in the boundary of the polymer facing the substrate is 3 degrees in the above-described optically compensating film in a state of a nematic hybrid orientation formed on the orienting substrate.

After the optically compensating film was stored at 80° C. for 2 days, the orientation of the film in a state sandwiched between polarizers was examined, and the orientation was found to be in order.

formula (13)

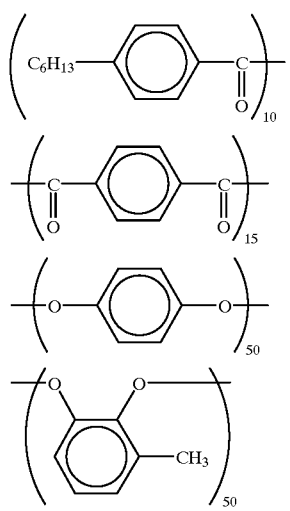

formula (14)

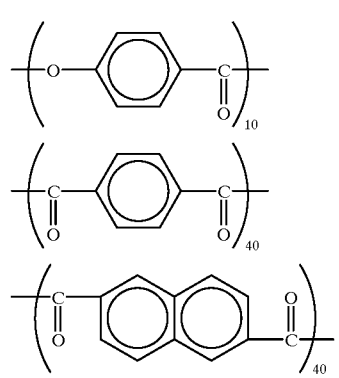

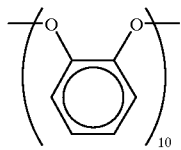

where the numbers as subscripts to the brackets indicate a molar fraction of component.

Example 10

As in the synthesis of the polymer having the formula (13) in Example 9, an end unit modified liquid crystalline polyester having the formula (15) was synthesized. The liquid crystalline polyester obtained had a logarithmic viscosity of 0.090, a nematic phase as a liquid crystal phase, an isotropic-liquid crystal phase transition temperature of 225° C. and a glass transition temperature of 78° C. The orientation was examined as in Example 9, and the liquid crystalline polyester was found to have a homeotropic orientation and to have a positive uniaxiality.

On the other hand, as in the synthesis of the polymer having the formula (14) in Example 9, a liquid crystalline polyester having the formula (16) was synthesized. The liquid crystalline polyester obtained had a logarithmic viscosity of 0.17, a nematic phase as a liquid crystal phase, an isotropic-liquid crystal phase transition temperature of 290° C. or higher and a glass transition temperature of 110° C.

Then, a mixture of the two liquid crystalline polyesters of the formulas (15) and (16) in the weight ratio of 4:6 was dissolved in tetrachloroethane to prepare an 8 wt % solution. The solution was spin-coated on a rubbing-treated polyimide film overlying a sheet of glass. After being dried, the coating was heat-treated at 250° C. for 30 minutes, and cooled at room temperature to be immobilized. In this way, an optically compensating film was obtained. The film on the substrate was transparent, free from defect in orientation and uniform, and had a film thickness of 0.42 $\mu$m and an average tilt angle in the direction of film thickness of 40 degrees. According to the arrangement of axes of the optical elements as shown in FIG. 19, one of the optically compensating films was positioned on the upper side and the other was positioned on the lower side of a liquid crystalline cell such that the boundary of the optically compensating film facing air was positioned nearer to the liquid crystal cell. The liquid crystal cell used ZLI-4792 as a liquid crystal material. As to the cell parameters, the cell gap was 4.8 $\mu$m, the twist angel was 90 degrees (left twist), and the pre-tilt angle was 4 degrees. A rectangular-wave voltage of 300 Hz was applied to the liquid crystal cell. Using the ratio of transmittance at white display (0V) to black display (6V) as a contrast ratio, the contrast ratios were measured from all directions by means of FFP Optical System DVS-3000 manufactured by Hamamatsu Photonics Co., Ltd., and equi-contrast curves were depicted. The results are shown in FIG. 20.

In the arrangement of FIG. 19, a voltage which divided the difference in transmittance between the white display and black display evenly into 8 regions was applied to the liquid crystal cell, and the lateral (0 to 180 degrees) gradation characteristics were measured by means of a Color Brightness Meter BM-5 manufactured by Topcon Co., Ltd. The results are shown in FIG. 21.

After the optically compensating film was stored at 80° C. for 2 days, the orientation of the film in a state sandwiched between polarizers was examined, and the orientation was found to be in order.

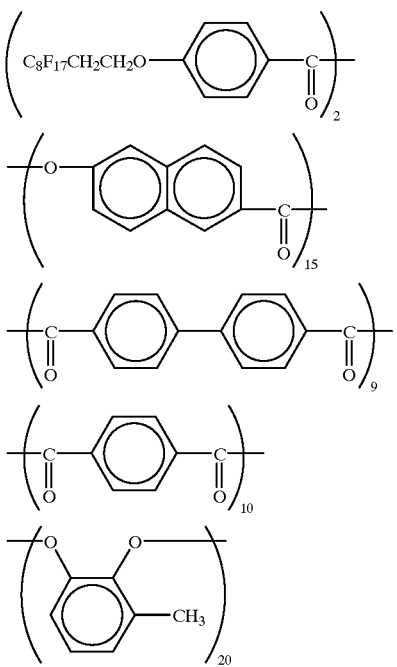

formula (15)

where the numbers as subscripts to the brackets indicate a molar fraction of component

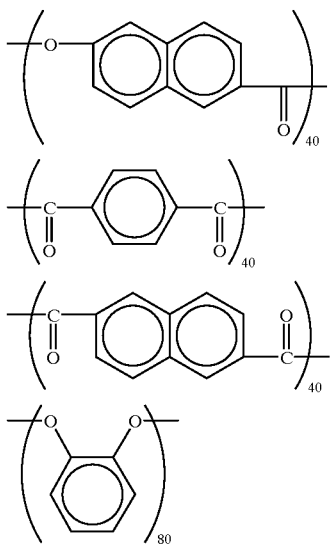

formula (16)

where the numbers as subscripts to the brackets indicate a molar fraction of component.

Comparative Example 4

Utilizing the same TN-type liquid crystal cell as in Example 10 and the same arrangement as in FIG. 19 excepting that no optically compensating film of Example 10 was used, the contrast ratios were measured from all directions, and the lateral (0 to 180 degrees) gradation characteristics were also measured. The results are shown in FIGS. 22 and 23, respectively.

Comparative Example 5

An 8 wt % solution of the liquid crystalline polyesters of the formula (14) in tetrachloroethane was prepared. The solution was spin-coated on a rubbing-treated polyimide film overlying a sheet of glass. After being dried, the coating was heat-treated at 190° C. for 20 minutes, and cooled to be immobilized. The film on the substrate was transparent, free from defect in orientation and uniform, and had a film thickness of 0.60 μm and an average tilt angle of 0 degree. That is, the orientation was homogeneous. As in Example 20, the optically compensating film was attached to the same liquid crystal cell of Example 20 in the same way as in Example 20, and the contrast ratios were measured from all directions. The results are shown in FIG. 24.

Example 11

Liquid crystalline polyesters having, respectively, the structure of formula (17) and the structure of formula (18) were synthesized. The end unit modified liquid crystalline polyester of formula (17) had a logarithmic viscosity of 0.11, a nematic phase as a liquid crystal phase, an isotropic-liquid crystal phase transition temperature of 205° C. and a glass transition temperature of 92° C. The orientation was examined as in Example 19, and the end unit modified liquid crystalline polyester of formula (17) was found to have a homeotropic orientation and to have a positive uniaxiality.

The liquid crystalline polyester of formula (18) had a logarithmic viscosity of 0.16, a nematic phase as a liquid crystal phase and an isotropic-liquid crystal phase transition temperature of 300° C. or higher. A 10 wt % solution of this liquid crystalline polyester in a solvent mixture of phenol/tetrachloroethane (6/4 by weight) was then prepared. The solution was coated by screen printing on each of the orienting substrates enumerated below. After being dried, the coating was heat-treated at 230° C. for 10 minutes. The substrates employed were soda glass, borosilicate glass, polyethylene terephthalate, polyimide, polyetherimide, polyetheretherketone and polyethersulfone. According to the observation by means of a microscope, a schlieren texture was found in the liquid crystal phase on each of the substrates, and the polymer was found to be homogeneously oriented.

Then, a mixture of the liquid crystalline polyesters of the formulas (17) and (18) in the weight ratio of 20:80 was dissolved in tetrachloroethane to prepare a 5 wt % solution. As in Example 2, the solution was coated, and the coating was dried, heat-treated to obtain an optically compensating film. The optically compensating film had a film thickness of 0.50 μm and an average tilt angle in the direction of film thickness of 30 degrees. As in Example 10, the contrast ratios were measured from all directions. The results are shown in FIG. 25.

After the optically compensating film was stored at 80° C. for 2 days, the contrast ratios were measured and the same results as in FIG. 25 were obtained.

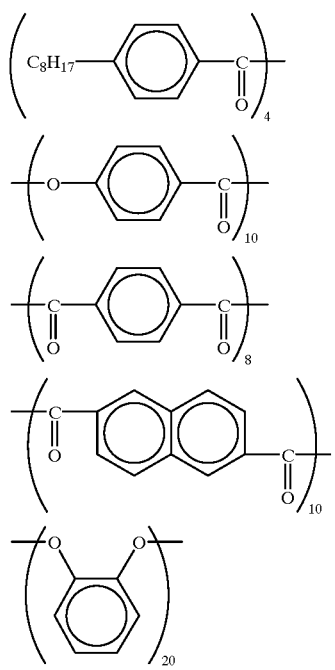

formula (17)

where the numbers as subscripts to the brackets indicate a molar fraction of component.

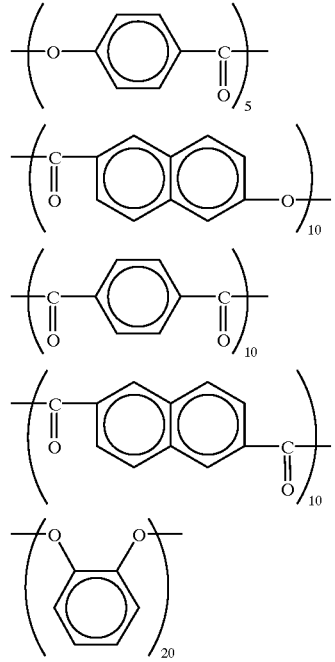

formula (18)

where the numbers as subscripts to the brackets indicate a molar fraction of component.

Example 12

Liquid crystalline polyesters having, respectively, the structure of formula (19) and the structure of formula (20) were synthesized. The end unit modified liquid crystalline polyester of formula (19) had a logarithmic viscosity of 0.07, a nematic phase as a liquid crystal phase, an isotropic-liquid crystal phase transition temperature of 220° C. and a glass transition temperature of 100° C. The orientation was examined as in Example 1, and the liquid crystalline polyester of the formula (19) was found to have a homeotropic orientation and to have a positive uniaxiality.

The liquid crystalline polyester of the formula (20) had a logarithmic viscosity of 0.18, a glass transition temperature of 115° C., a nematic phase as a liquid crystal phase and an isotropic-liquid crystal phase transition temperature of 200° C. The orientation was examined as in Example 11, and the liquid crystalline polyester of the formula (20) was found to be homogeneously oriented.

Then, a mixture of the liquid crystalline polyesters of the formulas (19) and (20) in the weight ratio of 25:75 was dissolved in tetrachloroethane to prepare a 5 wt % solution. As in Example 10, the solution was coated, and the coating was dried, heat-treated to obtain an optically compensating film. The optically compensating film had a film thickness of 0.48 μm and an average tilt angle in the direction of film thickness of 28 degrees. As in Example 10, the contrast ratios were measured from all directions. The results obtained were the same as in Example 11.

After the optically compensating film was stored at 80° C. for 2 days, the orientation of the film in a state sandwiched between polarizers was examined, and the orientation was found to be in order.

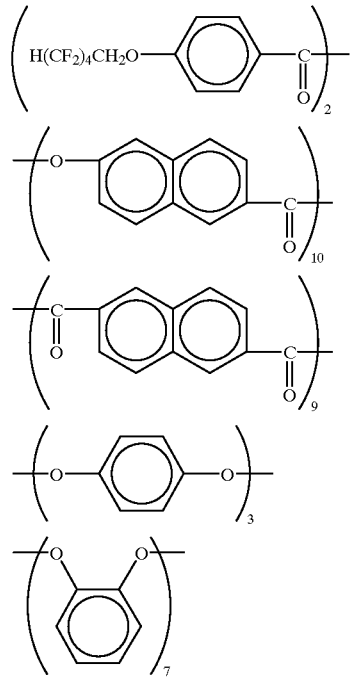

formula (19)

where the numbers as subscripts to the brackets indicate a molar fraction of component.

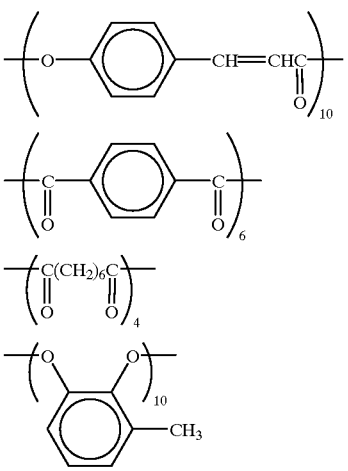

formula 20 where the numbers as subscripts to the brackets indicate a molar fraction of component.

Example 13

Liquid crystalline polyesters having, respectively, the structure of formula (21) and the structure of formula (22) were synthesized. The end unit modified liquid crystalline polyester of the formula (21) had a logarithmic viscosity of 0.12, a glass transition temperature of 83° C., a nematic phase as a liquid crystal phase and an isotropic-liquid crystal phase transition temperature of 220° C. The liquid crystalline polyester of the formula (22) had a logarithmic viscosity of 0.18, a glass transition temperature of 123° C., a nematic phase as a liquid crystal phase and an isotropic-liquid crystal phase transition temperature of 190° C. The orientation was examined as in Example 1, and the liquid crystalline polyester of the formula (21) and the liquid crystalline polyester of the formula (22) were both found to have a homeotropic orientation and to have an optically positive uniaxiality. Then, a mixture of the liquid crystalline polyesters of the formulas (21) and (22) in the weight ratio of 90:10 was dissolved in a phenol/tetrachloroethane mixture (6/4 by weight ratio) to prepare a 4 wt % solution. The solution was roll-coated for a length of 10 m on a rubbing-treated polyethylene terephthalate film having a width of 40 cm, and the coating was dried by means of hot air blow at 120° C., heat-treated at 180° C. for 20 minutes and thereafter cooled to be immobilized. The optically compensating film obtained was transferred to a triacetylcellulose film by a procedure comprising laminating the optically compensating film to an adhesive layer overlying the triacetylcellulose film and removing the polyethylene terephthalate film. The thus obtained optically compensating film had a film thickness of 0.60 μm and an average tilt angle in the direction of film thickness of 21 degrees. According to the arrangement of axes of the optical elements as shown in FIG. 19, one of the optically compensating films was positioned on the upper side and the other was positioned on the lower side of a liquid crystalline cell such that the triacetylcellulose film was positioned nearer to the liquid crystal cell. As in Example 10, the contrast ratios were measured from all directions. The results obtained are shown in FIG. 26.

After the optically compensating film was stored at 80° C. for 2 days, the contrast ratios were measured again in accordance with the arrangement of FIG. 19 and the same results as in FIG. 26 were obtained.

formula (21)

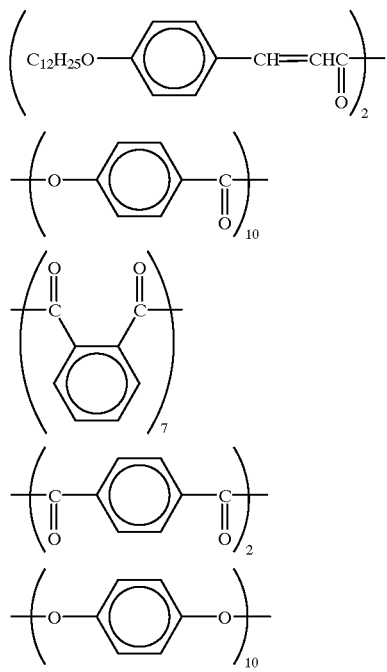

where the numbers as subscripts to the brackets indicate a molar fraction of component.

formula (22)

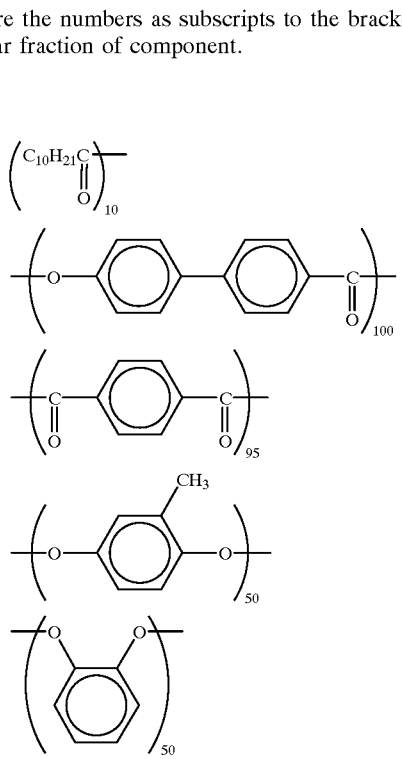

where the numbers as subscripts to the brackets indicate a molar fraction of component.

Example 14

Liquid crystalline polyesters having, respectively, the structure of formula (23) and the structure of formula (24) were synthesized. The end unit modified liquid crystalline polyester of the formula (23) had a logarithmic viscosity of 0.10, a glass transition temperature of 78° C., a nematic phase as a liquid crystal phase and an isotropic-liquid crystal phase transition temperature of 180° C. The orientation was examined as in Example 9, and the liquid crystalline polyester of the formula (23) was found to have a homeotropic orientation and to have an optically positive uniaxiality.

The liquid crystalline polyester of the formula (24) had a logarithmic viscosity of 0.18, a glass transition temperature of 116° C., a nematic phase as a liquid crystal phase and an isotropic-liquid crystal phase transition temperature of 300° C. or higher. The orientation was examined as in Example 9, and the liquid crystalline polyester of the formula (24) was found to be homogeneously oriented.

Then, a mixture of the liquid crystalline polyesters of the formulas (23) and (24) in the weight ratio of 50:50 was dissolved in N-methyl-2-pyrrolidone to prepare an 8 wt % solution. The solution was die-coated for a length of 10 m on a rubbing-treated polyetheretherketone film having a width of 40 cm, and the coating was dried by means of hot air blow at 120° C., heat-treated at 220° C. for 10 minutes and thereafter cooled to be immobilized. The optically compensating film obtained was transferred to a triacetylcellulose film by a procedure comprising laminating the optically compensating film to an adhesive layer overlying the triacetylcellulose film and removing the polyetheretherketone film. The thus obtained optically compensating film had a film thickness of 0.58 μm and an average tilt angle in the direction of film thickness of 34 degrees. According to the arrangement of axes of the optical elements as shown in FIG. 19, one of the optically compensating films was positioned on the upper side and the other was positioned on the lower side of a liquid crystalline cell such that the triacetylcellulose film was positioned nearer to the liquid crystal cell. As in Example 10, the contrast ratios were measured from all directions. The results obtained were the same as in Example 13.

After the optically compensating film was stored at 80° C. for 2 days, the orientation of the film in a state sandwiched between polarizers was examined, and the orientation was found to be in order.

formula (23)

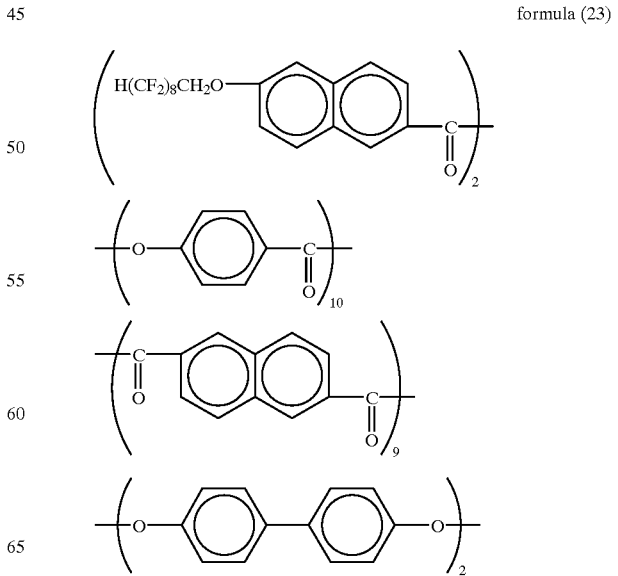

-continued

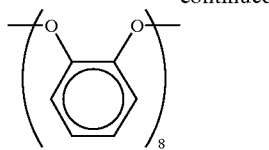

where the numbers as subscripts to the brackets indicate a molar fraction of component.

formula (24)

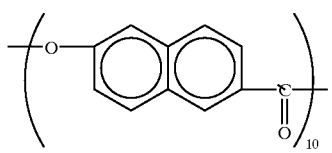

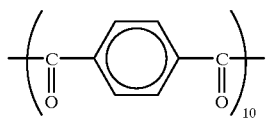

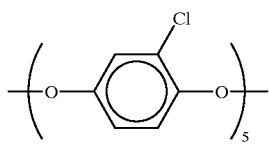

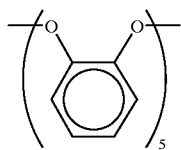

where the numbers as subscripts to the brackets indicate a molar fraction of component.

Example 15

A mixture of polymers of the formulas (23) and (24) of Example 14 in the weight ratio of 10:90 was dissolved in N-methyl-2-pyrrolidone to prepare a 20 wt % solution. The solution was die-coated for a length of 10 m on a rubbing-treated polyetheretherketone film having a width of 40 cm, and the coating was dried by means of hot air blow at 120° C., heat-treated at 220° C. for 10 minutes and thereafter cooled to be immobilized. The optically compensating film obtained was transferred to a triacetylcellulose film by a procedure comprising laminating the optically compensating film to an adhesive layer overlying the triacetylcellulose film and removing the polyethylene terephthalate film. The thus obtained optically compensating film had a film thickness of 1.50 μm and an average tilt angle in the direction of film thickness of 15 degrees. As in Example 14, the optically compensating film was attached to a liquid crystal cell, and the contrast ratios were measured from all directions. The results are shown in FIG. 24.

After the optically compensating films were stored at 80° C. for 2 days, the contrast ratios were measured again and the same results as in FIG. 27 were obtained.

Example 16

An end unit modified liquid crystalline polyester of the formula(25) was synthesized. The liquid crystalline polyester had a logarithmic viscosity of 0.11, a glass transition temperature of 81° C., a nematic phase as a liquid crystal phase and an isotropic-liquid crystal phase transition temperature of 190° C. The orientation was examined as in Example 9, and the liquid crystalline polyester was found to have a homeotropic orientation and to have an optically positive uniaxiality.

A mixture of polymers of the formulas (25) and (14) in the weight ratio of 3:7 was dissolved in chloroform to prepare a 15 wt % solution. The solution was die-coated for a length of 10 m on a rubbing-treated polyimide film overlying a polyarylate film having a width of 40 cm, and the coating was dried by means of hot air blow at 100° C., heat-treated at 200° C. for 5 minutes and thereafter cooled to obtain an optically compensating film. The thus obtained optically compensating film had a film thickness of 0.63 μm and an average tilt angle in the direction of film thickness of 33 degrees.

A polarizer was removed from a liquid crystal color television XTL-610 manufactured by Sony Corp., and one of the optically compensating films was laminated to the upper side and the other was laminated to the lower side of the liquid crystal cell such that the boundary of the optically compensating film facing air was positioned nearer to the liquid crystal cell. Then, one of the polarizers was laminated to the upper polyarylate film and the other was laminated to the lower polyarylate film. In this way, the same arrangement of axes as in FIG. 19 was made. As in Example 10, the contrast ratios were measured from all directions. The results are shown in FIG. 25.

After the optically compensating films were stored at 80° C. for 2 days, the contrast ratios were again measured in accordance with the arrangement of FIG. 19, and the same results as in FIG. 28 were obtained.

formula (25)

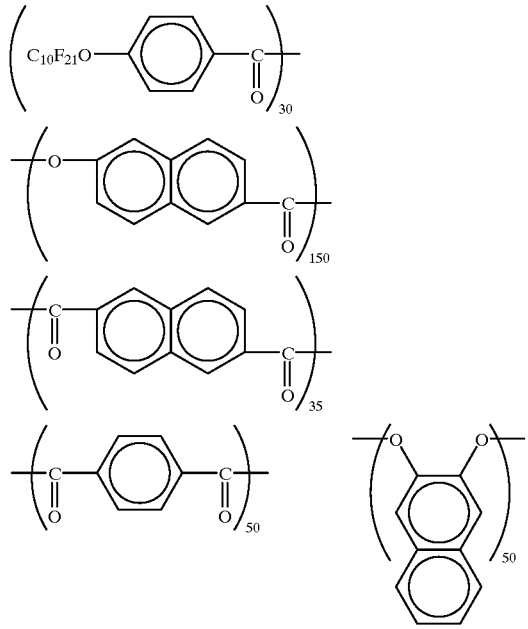

where the numbers as subscripts to the brackets indicate a molar fraction of component.

Comparative Example 6

In the same liquid crystal color television XTL-610 manufactured by Sony Corp. as in Example 16 excepting that no optically compensating film of Example 16 was used, the contrast ratios were measured from all directions. The results are shown in FIG. 29.

Example 17

An end unit modified liquid crystalline polyester of the formula (26) was synthesized. The liquid crystalline polyester had a logarithmic viscosity of 0.06, a glass transition temperature of 84° C., a nematic phase as a liquid crystal phase and an isotropic-liquid crystal phase transition temperature of 170° C. The orientation was examined as in Example 9, and the liquid crystalline polyester was found to have a homeotropic orientation and to have an optically positive uniaxiality. A mixture of polymers of the formulas (26) and (16) in the weight ratio of 4:6 was dissolved in a phenol/tetrachloroethane mixture (6/4 by weight ratio) to prepare a 10 wt % solution. The solution was roll-coated for a length of 10 m on a rubbing-treated polyimide film having a width of 40 cm, and the coating was dried by means of hot air blow at 120° C., heat-treated at 190° C. for 5 minutes and thereafter cooled to obtain an optically compensating film. Then, an ultraviolet-curable bonding agent was coated on the surface of optically compensating film, and a polyvinyl alcohol film was laminated to the optically compensating film via the bonding agent. After the bonding agent was cured by the irradiation of ultraviolet rays, the optically compensating film was transferred to the polyvinyl alcohol film by removing the polyimide film. The thus obtained optically compensating film had a film thickness of 0.58 μm and an average tilt angle in the direction of film thickness of 38 degrees.

A polarizer was removed from a liquid crystal color television VM-101 manufactured by Casio Corp., and one of the optically compensating films was laminated to the upper side and the other was laminated to the lower side of the liquid crystal cell such that the boundary of the optically compensating film facing air was positioned nearer to the liquid crystal cell. Then, one of the polarizers was laminated to the upper polyvinyl alcohol film and the other was laminated to the lower polyvinyl alcohol film. In this way, the same arrangement of axes of optical elements as in FIG. 19 was made. As in Example 10, the contrast ratios were measured from all directions. The results are shown in FIG. 30.

After the optically compensating films were stored at 80° C. for 2 days, the contrast ratios were again measured in accordance with the arrangement of FIG. 19, and the same results as in FIG. 30 were obtained.

formula (26)

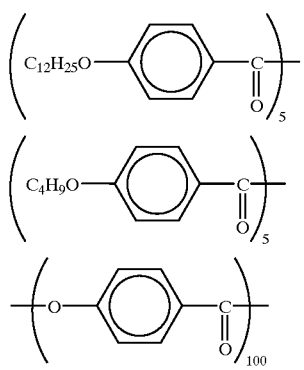

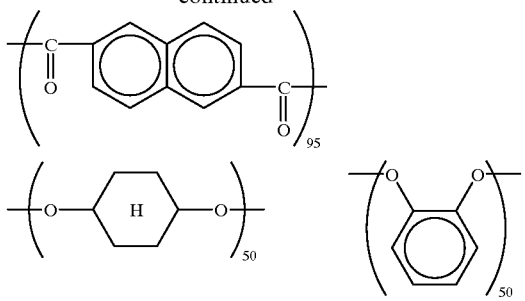

where the numbers as subscripts to the brackets indicate a molar fraction of component.

Comparative Example 7

In the same liquid crystal color television VM-101 manufactured by Casio Corp. as in Example 17 excepting that no optically compensating film of Example 17 was used, the contrast ratios were measured from all directions. The results are shown in FIG. 31.

Examples 18 to 25 and

Comparative Examples 8 to 18

The polymers shown in Table 1 were dissolved respectively in chloroform to prepare 7 wt % solutions. Each of the solutions was die-coated for a length of 10 m on a rubbing-treated polyetheretherketone film having a width of 40 cm, and the coating was dried by means of hot air blow at 120° C., heat-treated at 220° C. for 10 minutes and thereafter cooled to be immobilized. A photo-curable bonding agent containing N-vinylpyrrolidone was coated on each of the optically compensating films, and a triacetylcellulose film was laminated to the layer of the bonding agent by means of a laminator. Then, the layer of the bonding agent was cured by the irradiation of ultraviolet rays for 30 seconds. The optically compensating film obtained was transferred to the triacetylcellulose film by removing the polyetheretherketone film. Next, a layer of the same photo-curable bonding agent overlying a polyethylene film was laminated by means of a laminator to the surface of each of the optically compensating films which was stripped of the polyetheretherketone film. Then, the layer of the bonding agent was cured by the irradiation of ultraviolet rays for 30 seconds. After the polyethylene film was carefully removed, a sheet of glass having a thickness of 1 mm was laminated to the surface of the optically compensating film via the bonding agent. The laminated products obtained in the above-described procedure were each sandwiched between polarizers and the orientation was examined. None of the laminated products exhibited unevenness. After these laminated products were stored at 80° C. for 2 days, they were each sandwiched between polarizers and the state of orientation was again examined. The results are shown in Table 1. As is apparent from Table 1, the disorder in orientation can be prevented by the addition of a component having a high molecular weight.

TABLE 1

|  | Composition | | Film thickness (μm) | Average tilt angle (degrees) | State of orientation |
|---|---|---|---|---|---|
|  | Polymer 1 (%) | Polymer 2 (%) | | | |
| Example 18 | (1) 40 | (2) 60 | 0.45 | 34 | Even |
| Example 19 | (3) 30 | (4) 70 | 0.65 | 29 | Even |
| Example 20 | (5) 30 | (6) 70 | 0.83 | 32 | Even |
| Example 21 | (7) 20 | (8) 80 | 0.60 | 37 | Even |
| Example 22 | (9) 40 | (10) 60 | 0.55 | 36 | Even |
| Example 23 | (11) 50 | (12) 50 | 0.47 | 26 | Even |
| Example 24 | (13) 40 | (2) 60 | 0.66 | 31 | Even |
| Example 25 | (14) 30 | (4) 70 | 0.59 | 38 | Even |
| Comparative Example 8 | (1) 100 | — | 0.56 | 33 | Uneven |
| Comparative Example 9 | (3) 100 | — | 0.70 | 39 | Uneven |
| Comparative Example 10 | (5) 100 | — | 0.85 | 36 | Uneven |
| Comparative Example 11 | (7) 100 | — | 0.57 | 40 | Uneven |
| Comparative Example 12 | (9) 100 | — | 0.48 | 42 | Uneven |
| Comparative Example 13 | (11) 100 | — | 0.61 | 36 | Uneven |
| Comparative Example 14 | (13) 100 | — | 0.42 | 36 | Uneven |
| Comparative Example 15 | (14) 100 | — | 0.69 | 35 | Uneven |
| Comparative Example 16 | (1) 80 | (2) 20 | 0.89 | 41 | Uneven |
| Comparative Example 17 | (3) 90 | (8) 10 | 1.02 | 34 | Uneven |
| Comparative Example 18 | (11) 80 | (4) 20 | 0.45 | 35 | Uneven |

Polymer 1: End unit modified liquid crystalline polymer
Polymer 2: Liquid crystalline polymer as a component having a molecular weight higher than that of the end unit modified liquid crystalline polymer.

BRIEF DESCRIPTION OF THE DRAWINGS

FIG. 1
(1) incident light (2)upper polarizer (3)oriented specimen (4)lower polarizer FIG. 2
(1)light transmission axis of upper polarizer (2)rubbing direction of substrate (3)light transmission axis of lower polarizer FIG. 3
(1)apparent retardation (2)tilt angle (degrees)

FIG. 4
(1)apparent retardation at front (2)film thickness

FIG. 5
(1)boundary of film facing air (2)substrate (3)substrate (4)rubbing direction (5)side view of optically compensating film FIG. 6
(1)axis of absorption (2)lower polarizer (3)direction of tilt (rubbing direction) (4)optically compensating film (5)direction of pre-tilt (rubbing direction) (5)lower substrate of liquid crystal cell (6)upper substrate of liquid crystal cell (7) direction of tilt (rubbing direction) (8)optically compensating film (9)axis of absorption (10)upper polarizer FIG. 7
(1)contrast ratio FIG. 8
(1)transmittance (2)angle of visual field FIG. 13
(1)inversion region FIG. 17
(1)apparent retardation (2)tilt angle (degrees)

FIG. 18
(1)apparent retardation at front (2)film thickness

FIG. 19
(1)axis of absorption (2)lower polarizer (3)direction of tilt (rubbing direction) (4)optically compensating film (5)direction of pre-tilt (rubbing direction) (5)lower substrate of liquid crystal cell (6)upper substrate of liquid crystal cell (7) direction of tilt (rubbing direction) (8)optically compensating film (9)axis of absorption (10)upper polarizer

Figure 1:
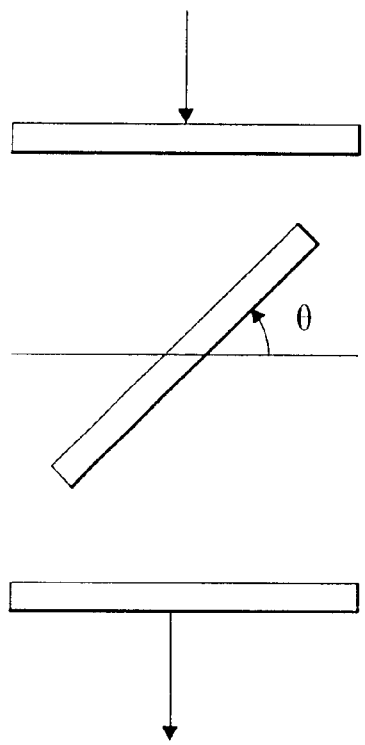
FIG. 1 shows the arrangement of optical elements used for the measurement of the tilt angle of the optically compensating film of the present invention.
Figure 2:
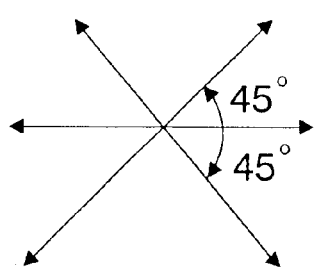
FIG. 2 shows the relationship between the axial directions of specimens and polarizers used for the optical measurement of the tilt angle of the optically compensating film of the present invention.
Figure 3:
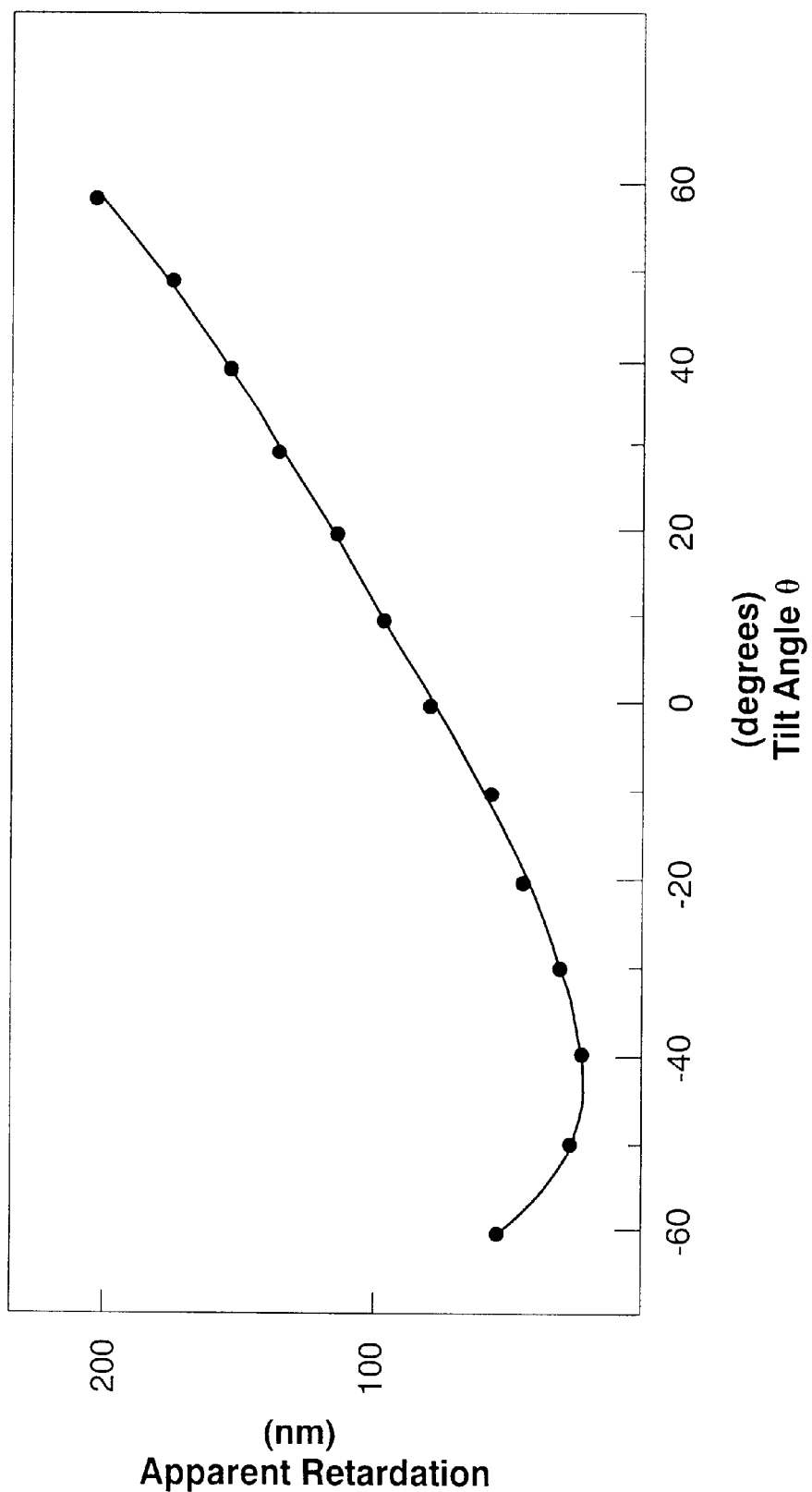
FIG. 3 shows the relationship between the apparent retardation values and tilt angles of the specimen when the measurement was conducted by tilting in the rubbing direction of the substrate in Example 1.
Figure 4:
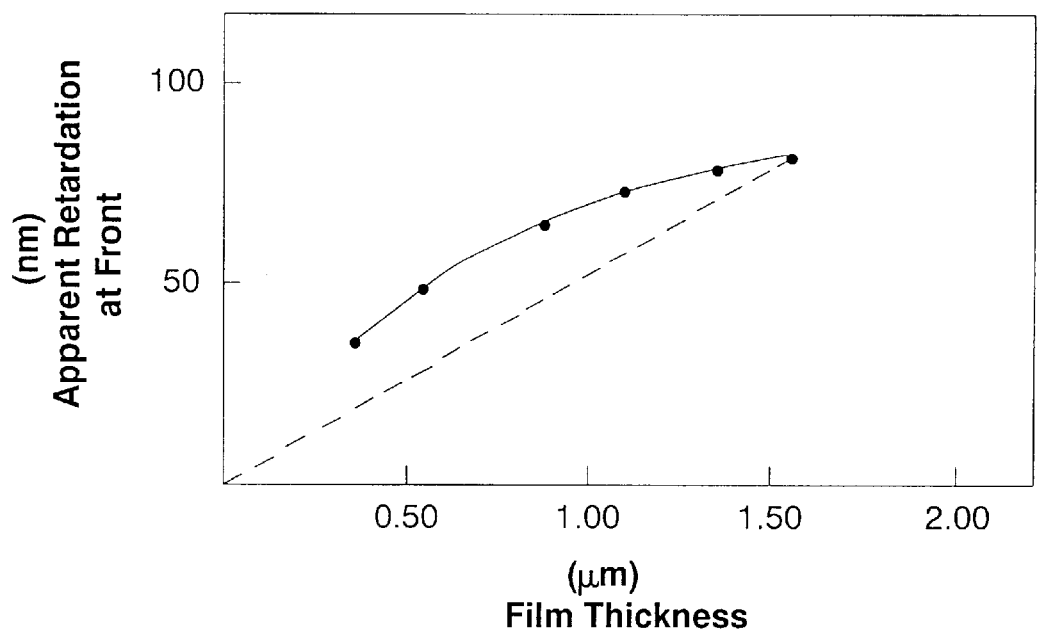
FIG. 4 shows the film thicknesses after the immersion of the optically compensating film and the apparent retardation values observed at the front of specimens in Example 1.
Figure 5:
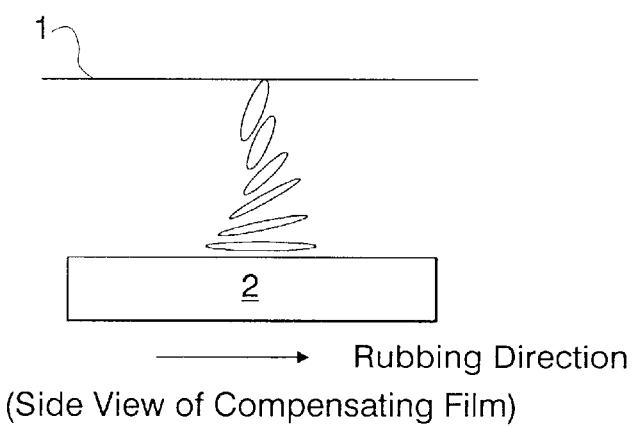
FIG. 5 is a conceptual diagram illustrating the oriented structure of the optically compensating film of the present invention.
Figure 6:
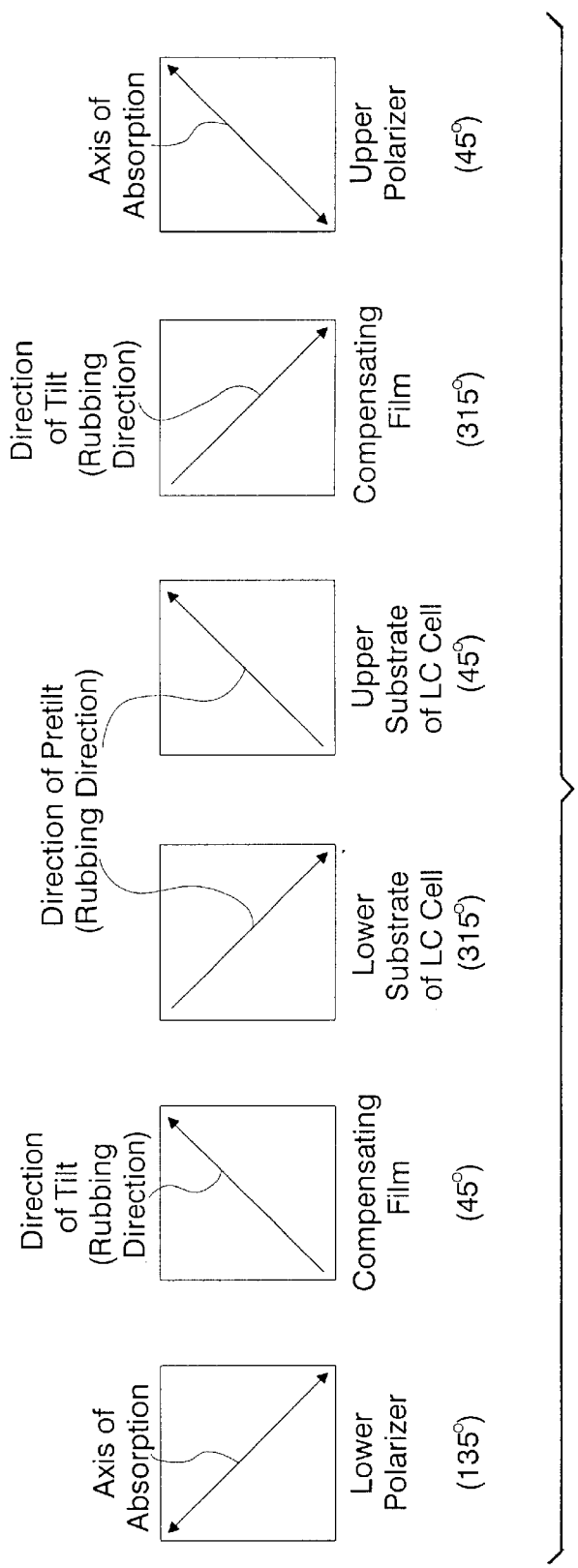
FIG. 6 illustrates the arrangement of axes of optical elements in Example 2.
Figure 7:
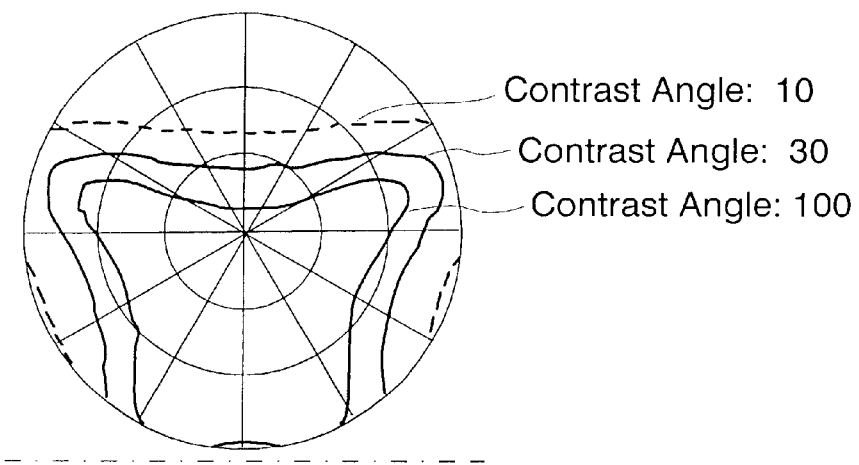
FIG. 7 shows equi-contrast curves of Example 2.
Figure 8:
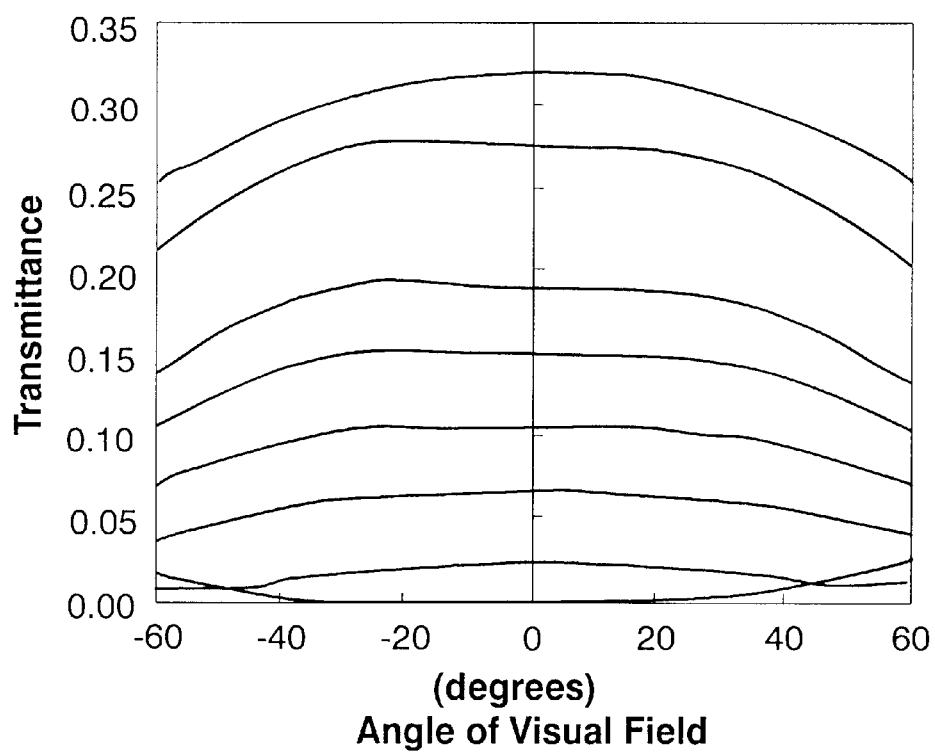
FIG. 8 shows the results of the measurement of lateral gradation characteristics of Example 2.
Figure 9:
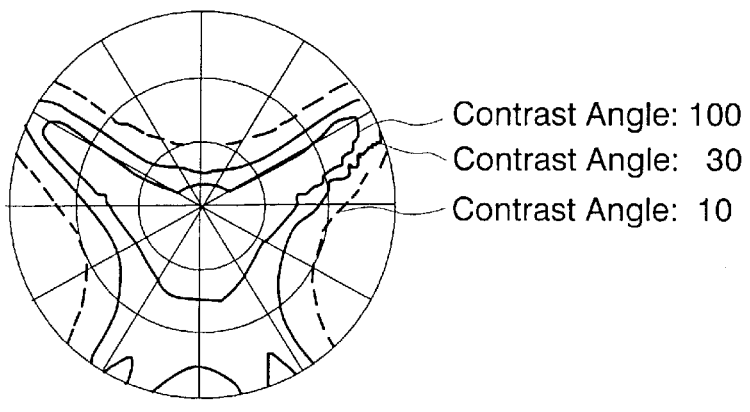
FIG. 9 shows equi-contrast curves of Comparative Example 1.
Figure 10:
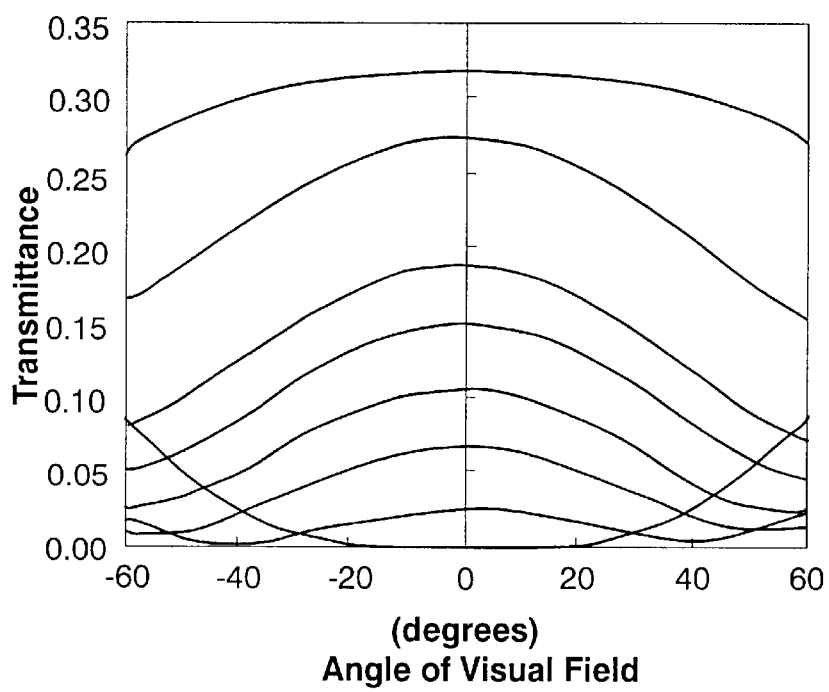
FIG. 10 shows the results of the measurement of lateral gradation characteristics of Comparative Example 1.
Figure 11:
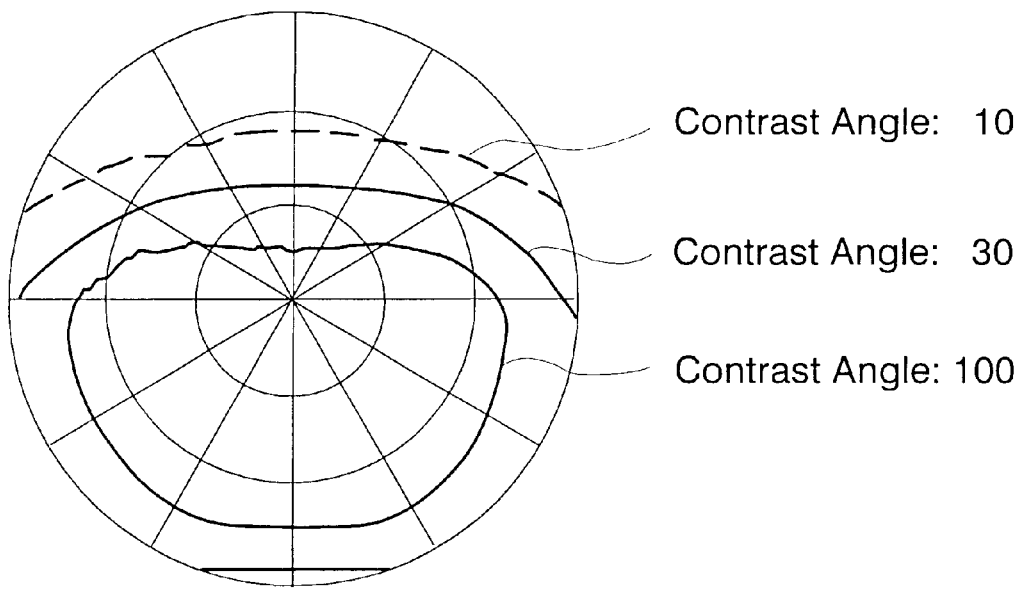
FIG. 11 shows equi-contrast curves of Example 3.
Figure 12:
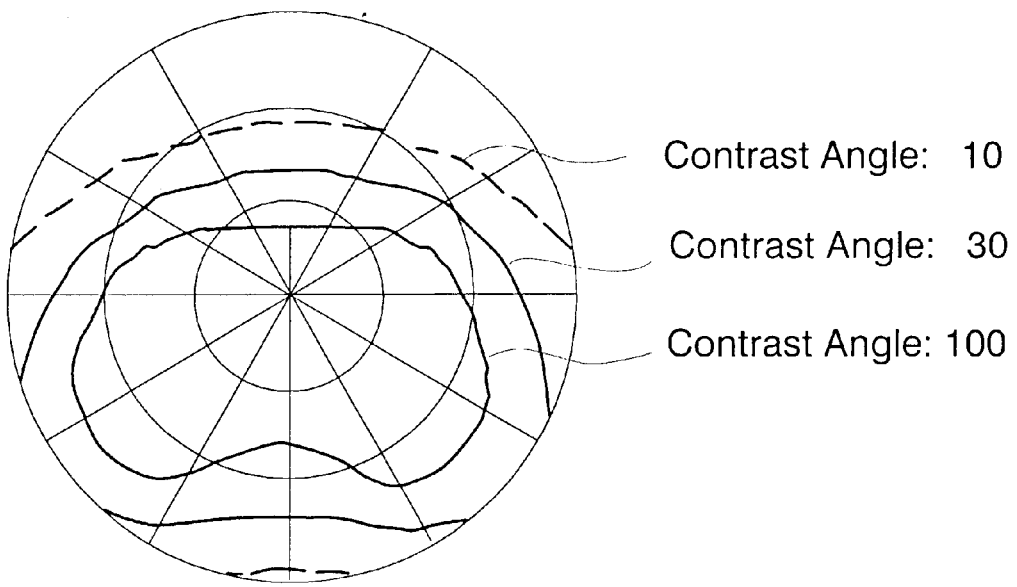
FIG. 12 shows equi-contrast curves of Example 5.
Figure 13:
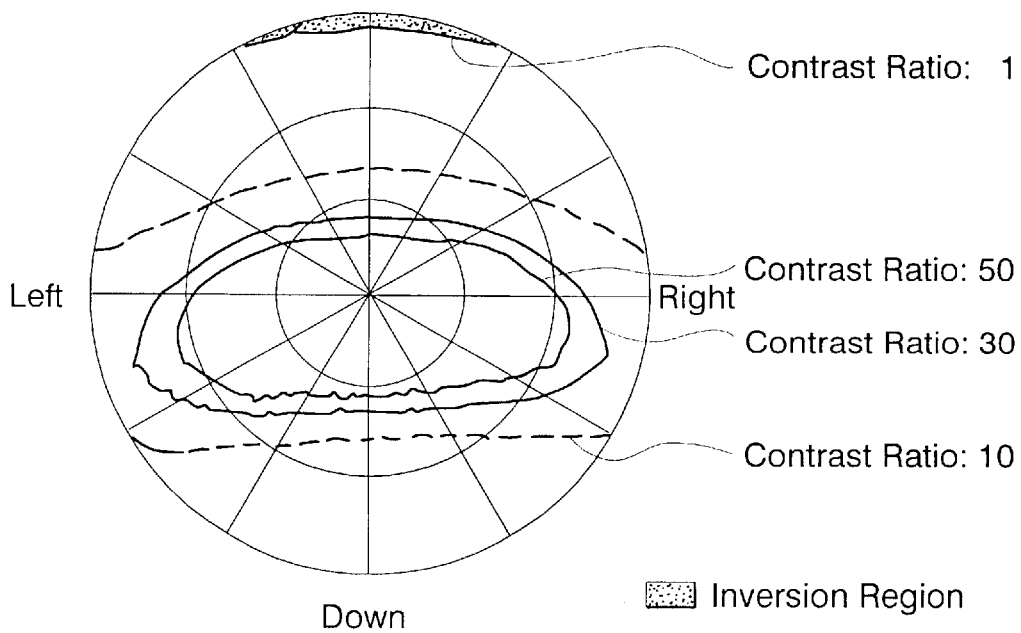
FIG. 13 shows equi-contrast curves of Example 7.
Figure 14:
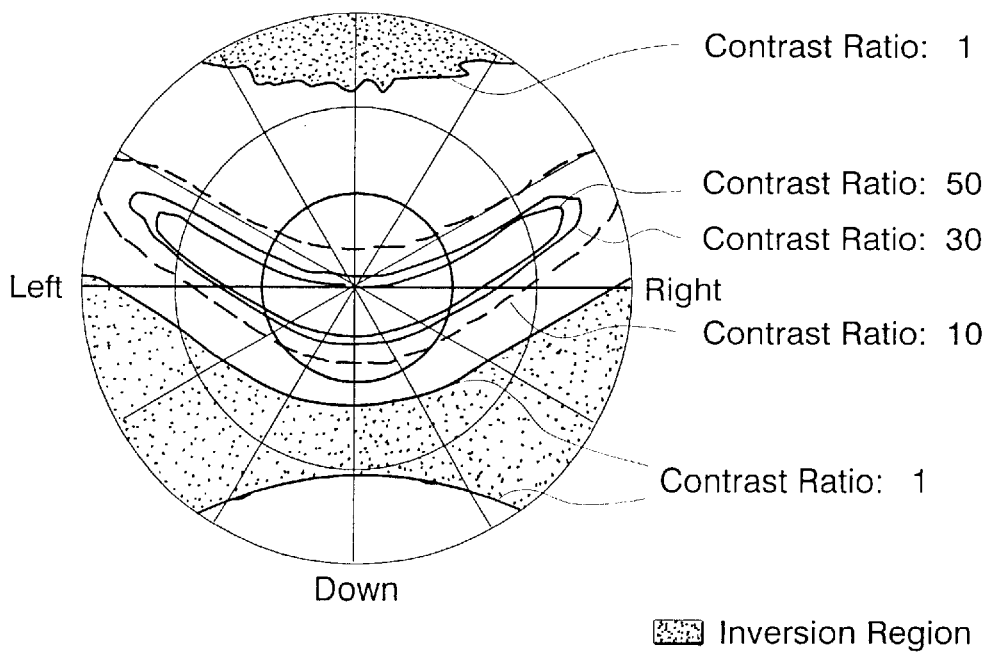
FIG. 14 shows equi-contrast curves of Comparative Example 2.
Figure 15:
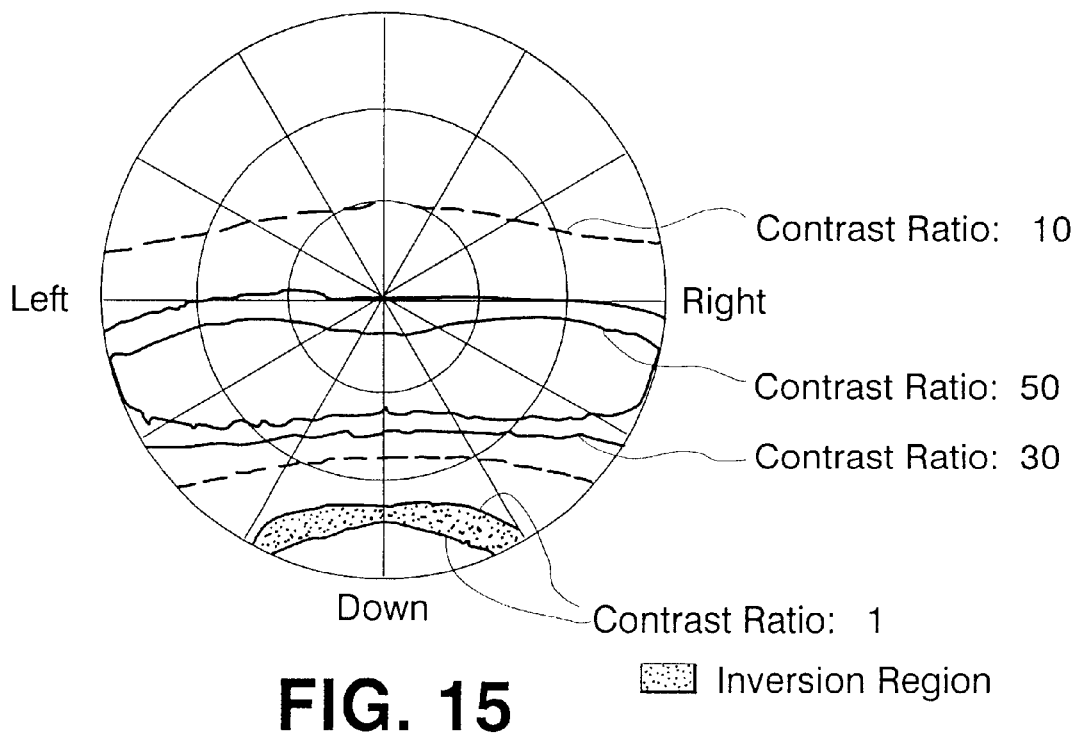
FIG. 15 shows equi-contrast curves of Example 8.
Figure 16:
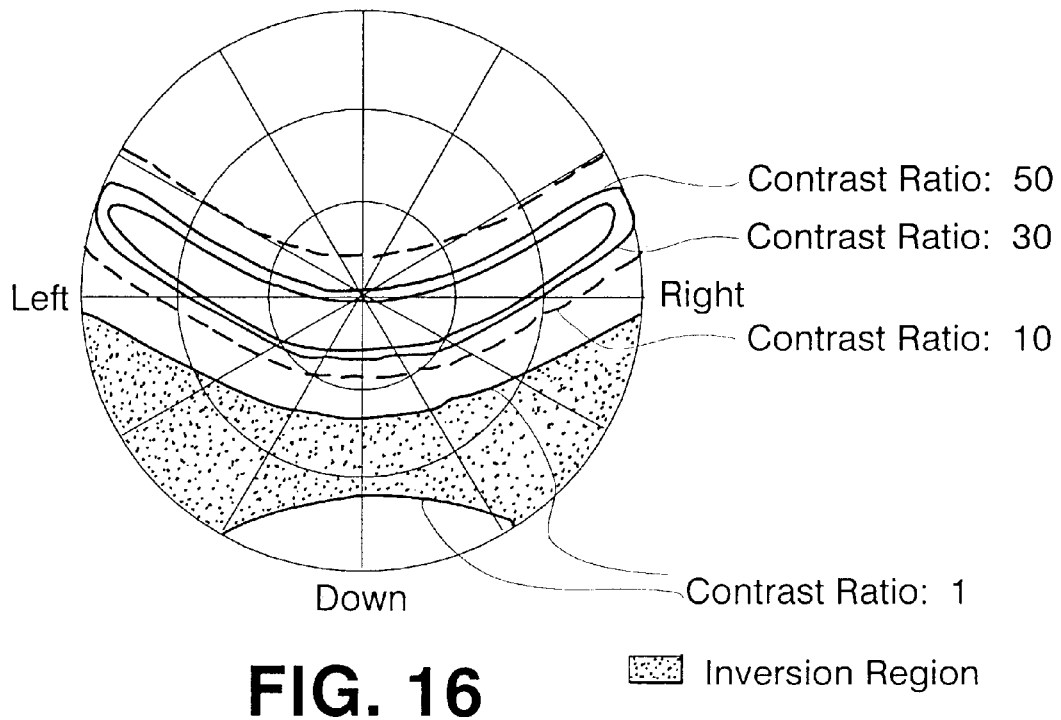
FIG. 16 shows equi-contrast curves of Comparative Example 3.
Figure 17:
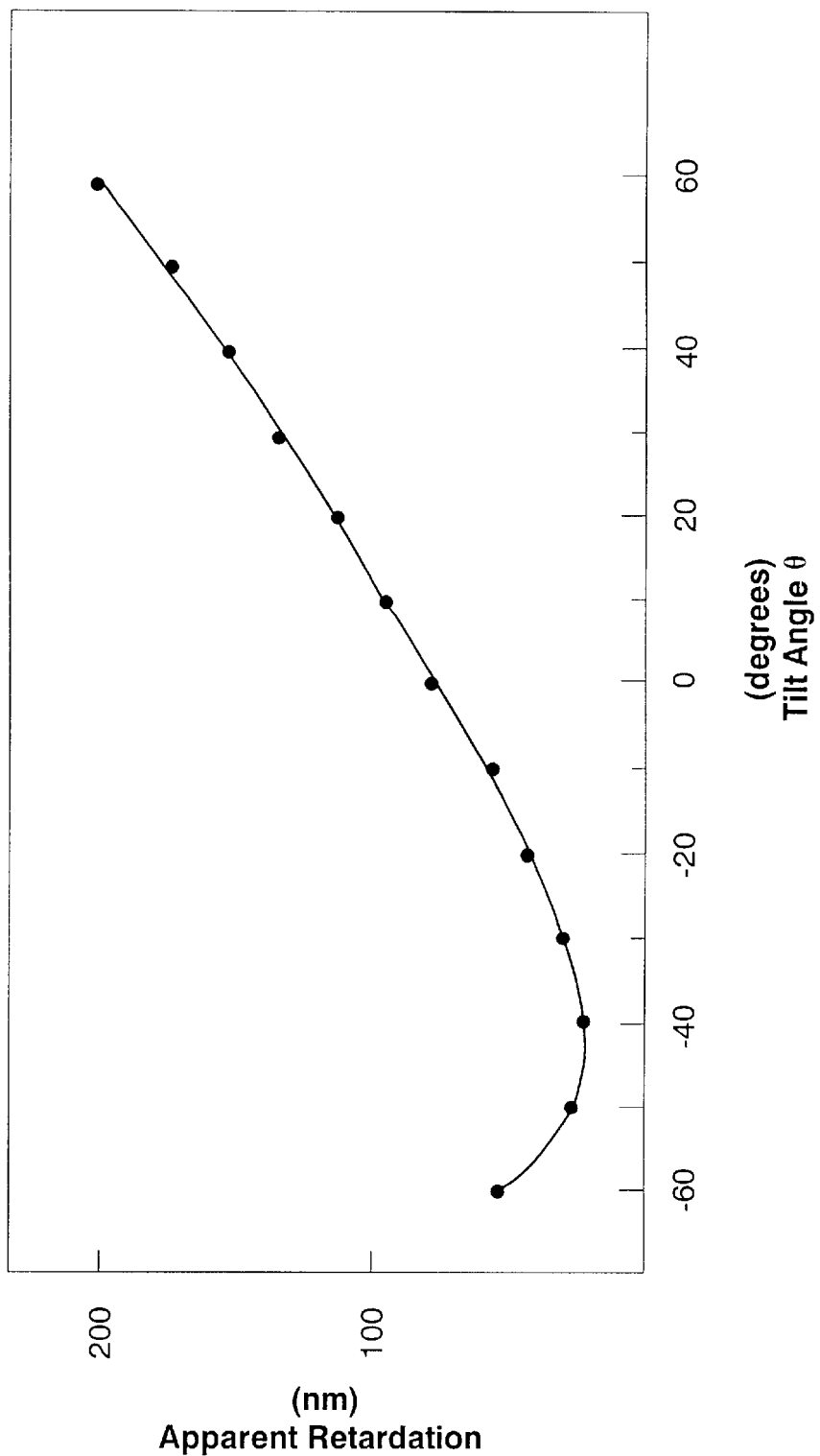
FIG. 17 shows the relationship between the apparent retardation values and tilt angles of the specimen when the measurement was conducted by tilting in the rubbing direction of the substrate in Example 9.
Figure 18:
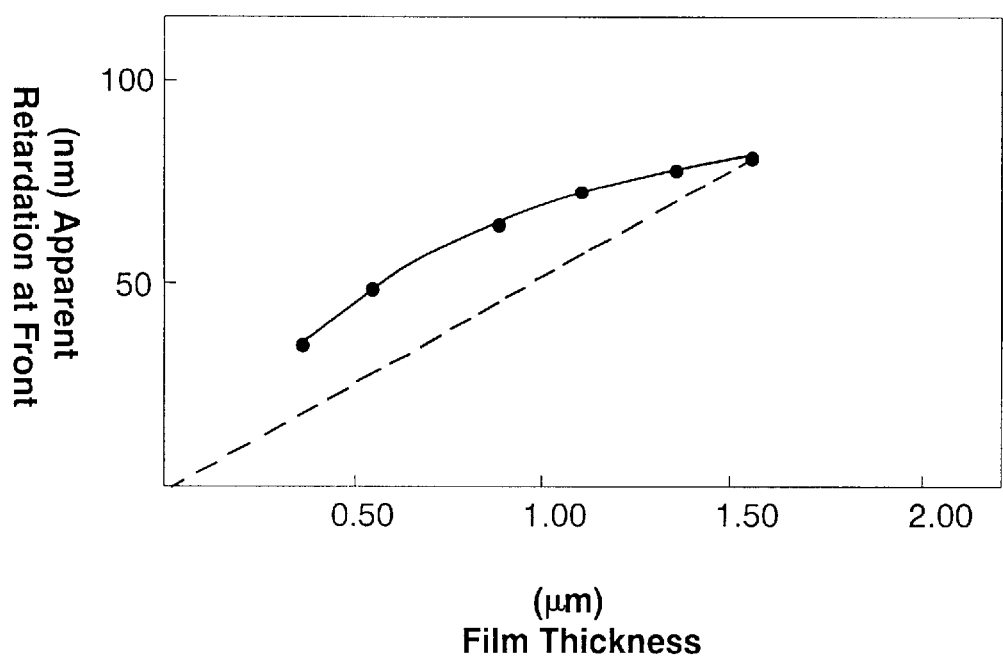
FIG. 18 shows the film thicknesses after the immersion of the optically compensating film and the apparent retardation values observed at the front of specimens in Example 9.
Figure 19:
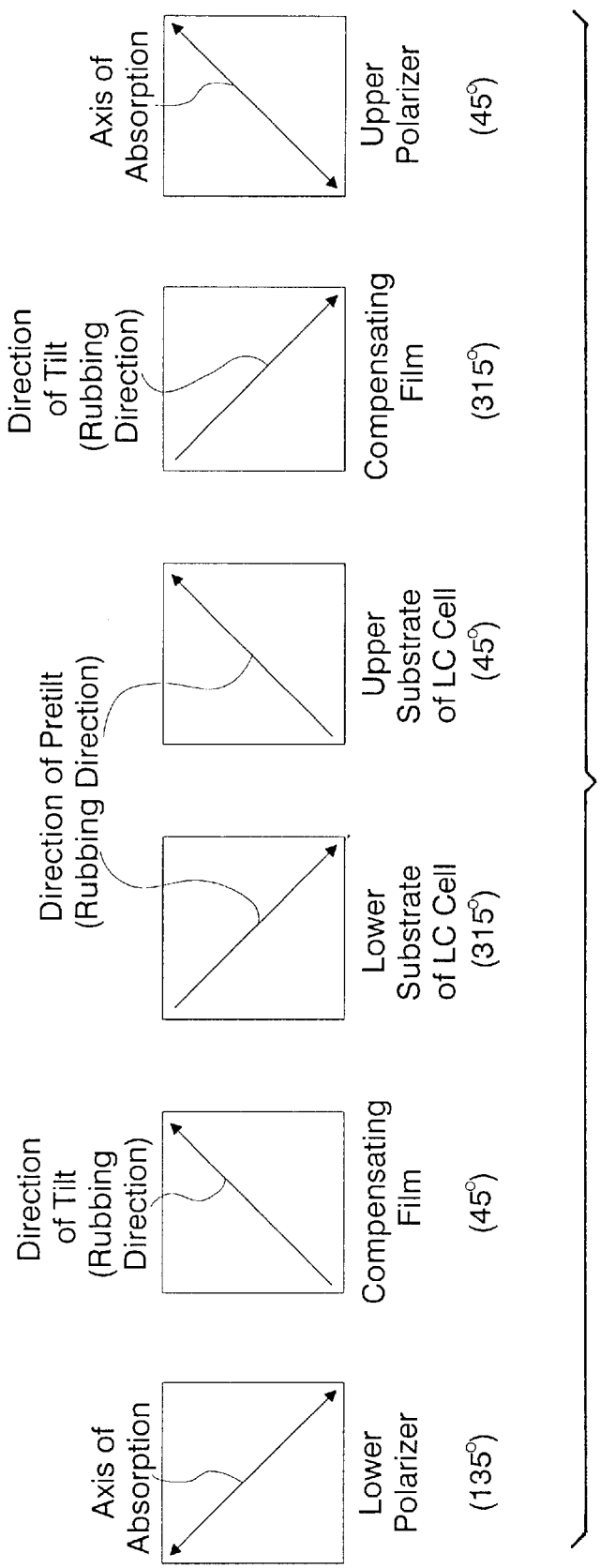
FIG. 19 illustrates the arrangement of axes of optical elements in Example 10.
Figure 20:
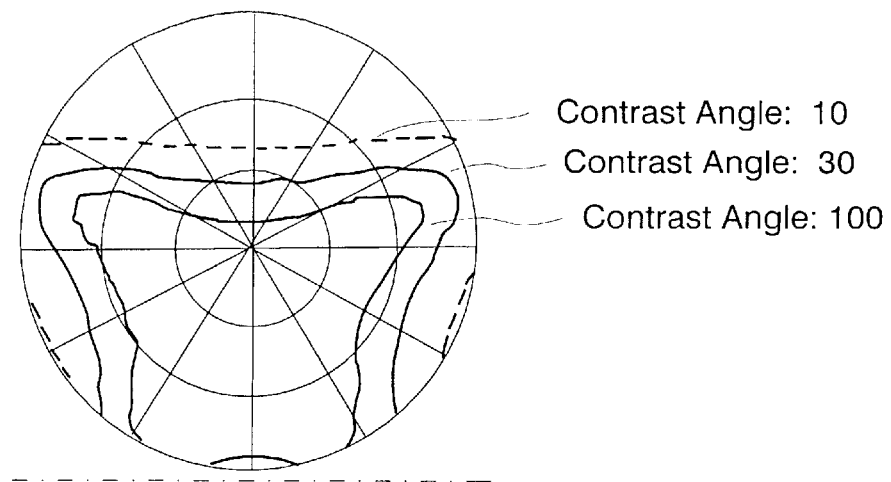
FIG. 20 shows equi-contrast curves of Example 10.
Figure 21:
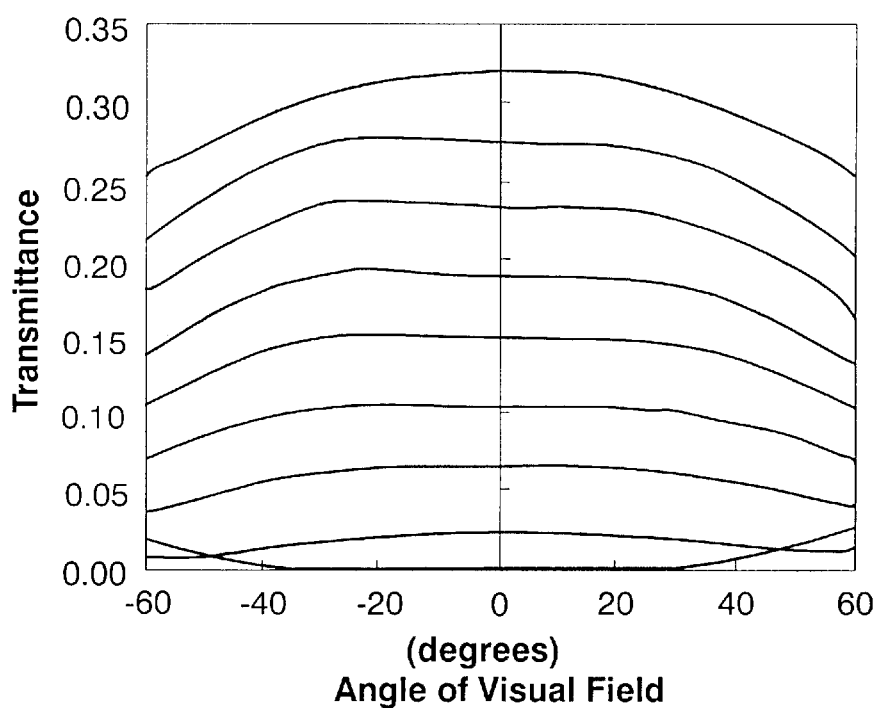
FIG. 21 shows the results of the measurement of lateral gradation characteristics of Example 10.
Figure 22:
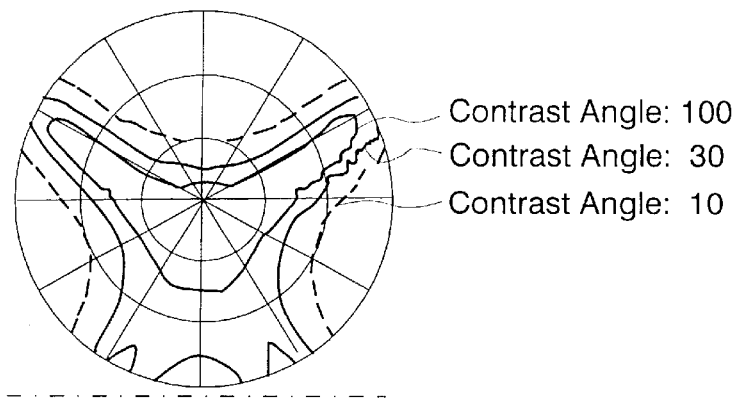
FIG. 22 shows equi-contrast curves of Comparative Example 4.
Figure 23:
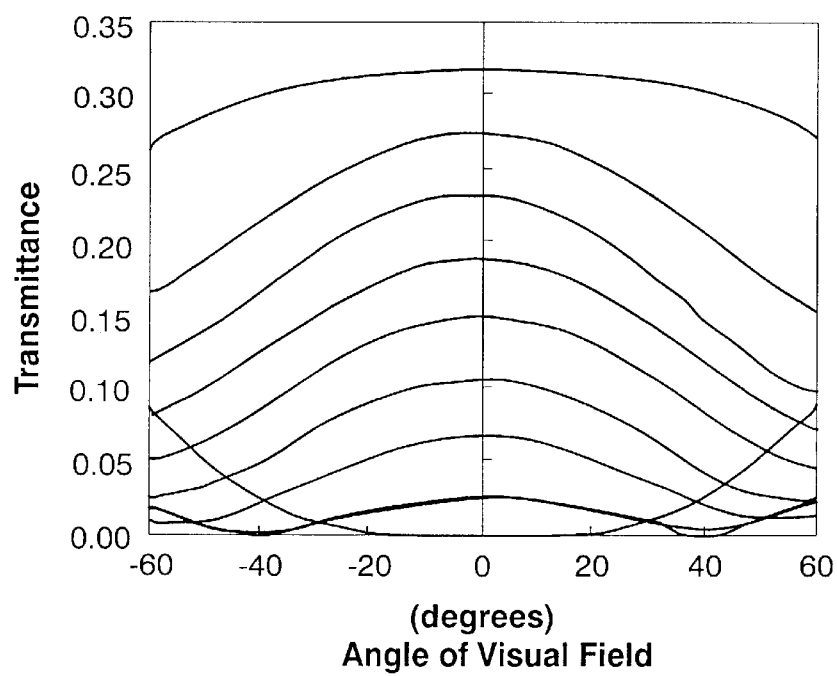
FIG. 23 shows the results of the measurement of lateral gradation characteristics of Comparative Example 4.
Figure 24:
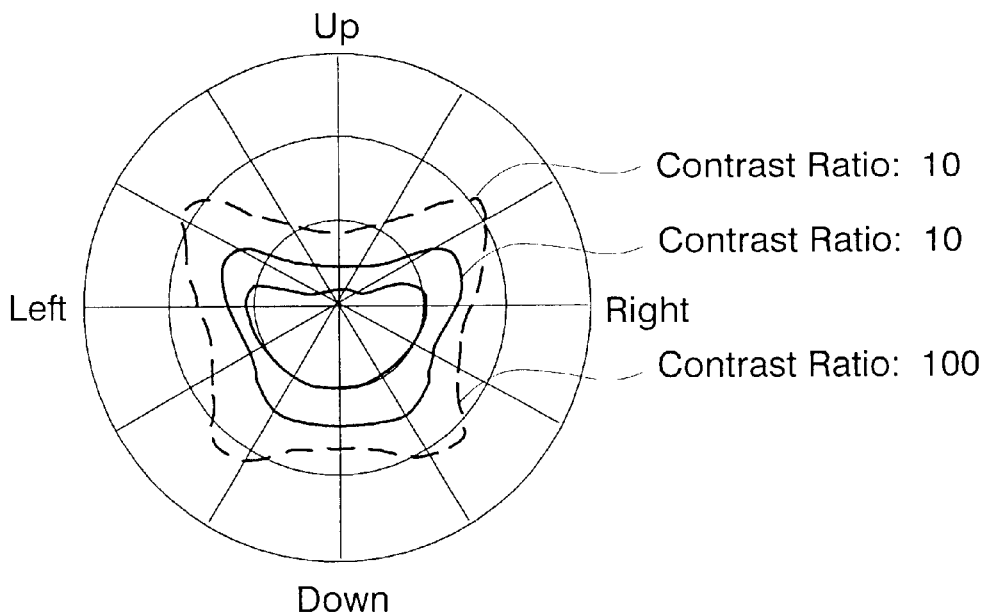
FIG. 24 shows equi-contrast curves of Comparative Example 5.
Figure 25:
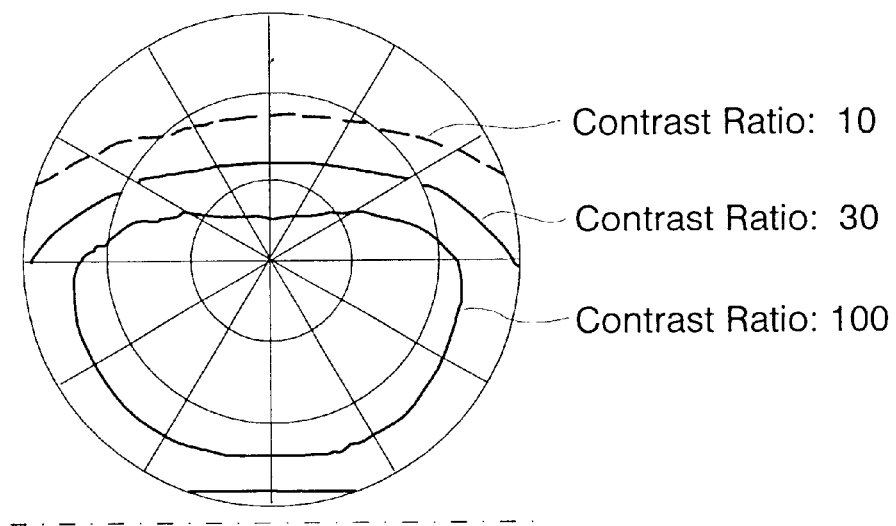
FIG. 25 shows equi-contrast curves of Example 11.
Figure 26:
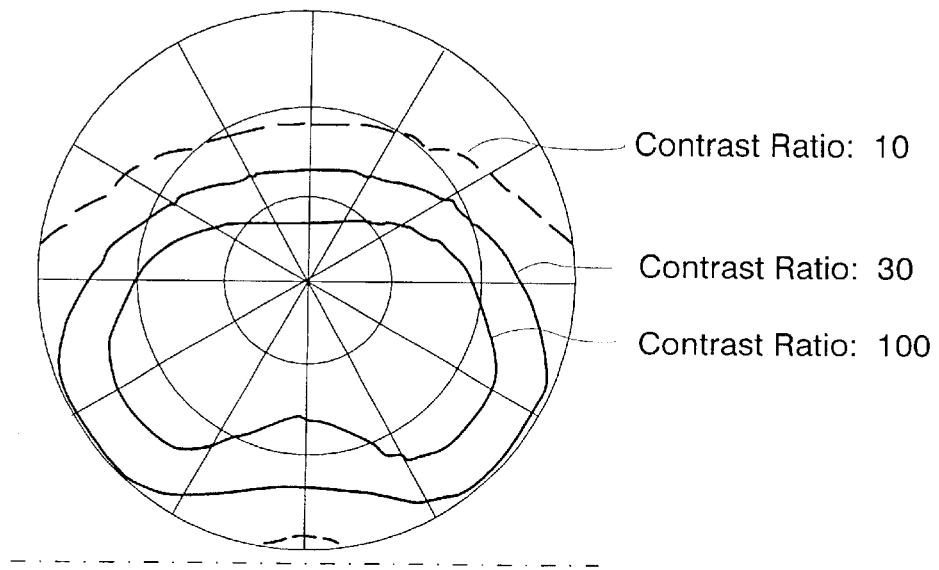
FIG. 26 shows equi-contrast curves of Example 13.
Figure 27:
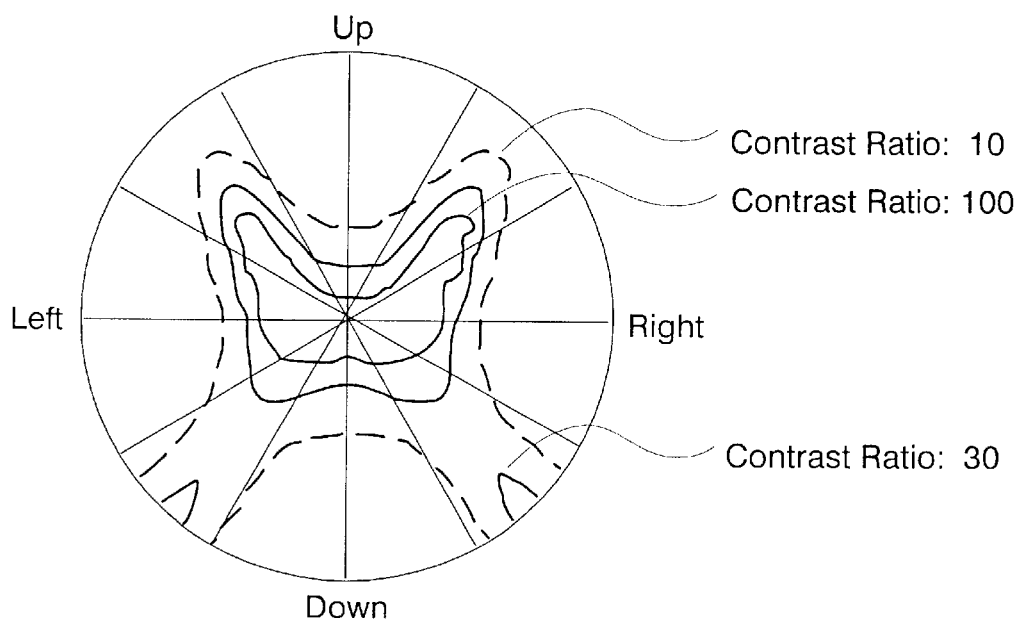
FIG. 27 shows equi-contrast curves of Example 15.
Figure 28:
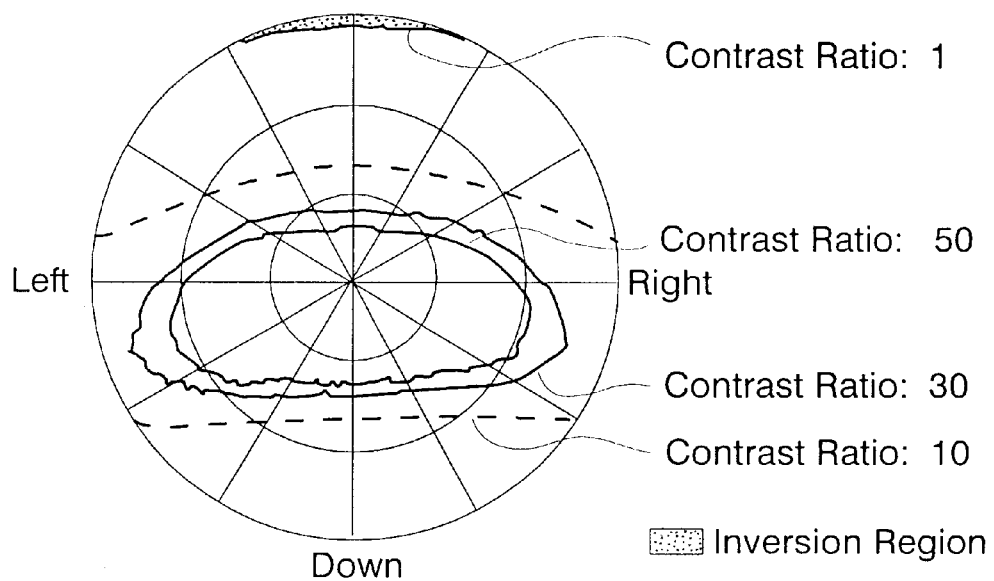
FIG. 28 shows equi-contrast curves of Example 16.
Figure 29:
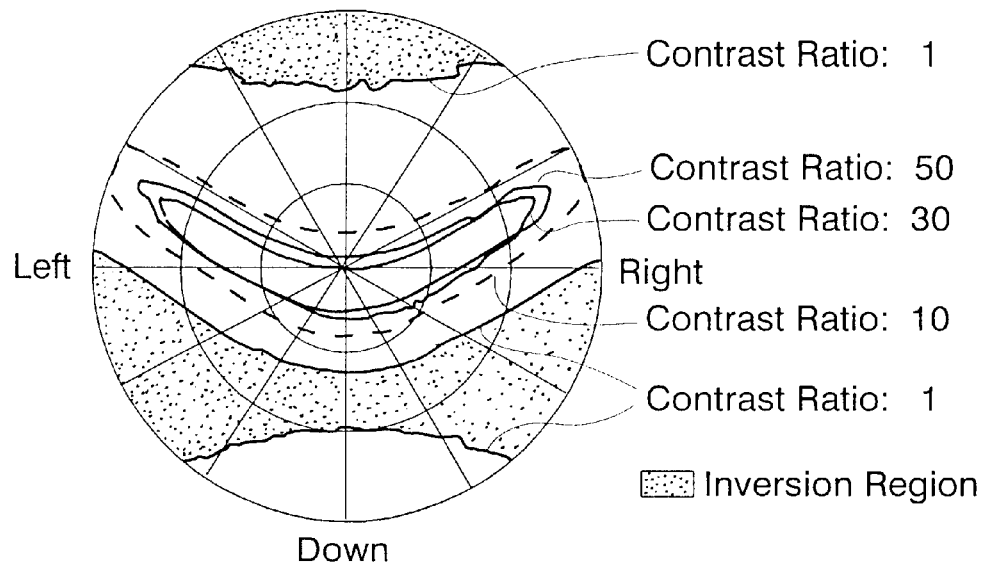
FIG. 29 shows equi-contrast curves of Comparative Example 6.
Figure 30:
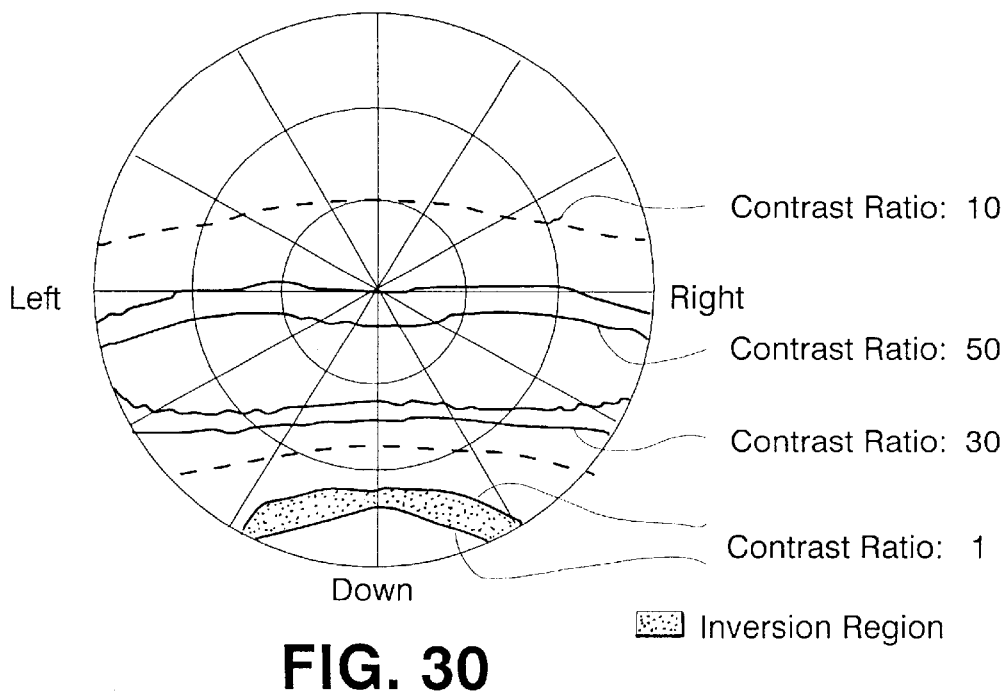
FIG. 30 shows equi-contrast curves of Example 17.
Figure 31:
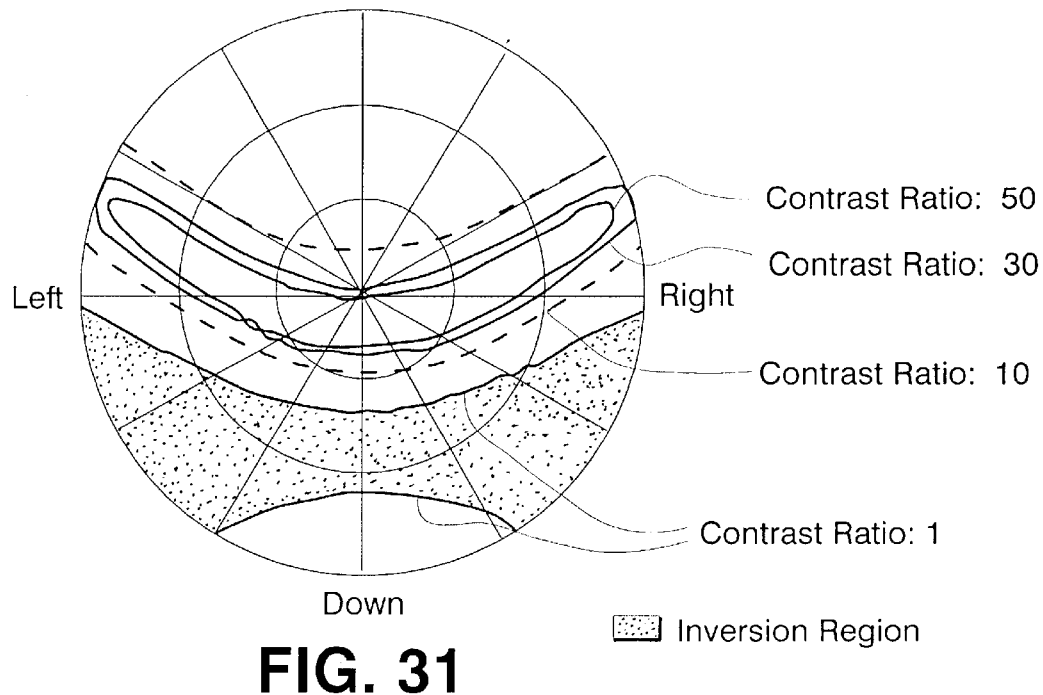
FIG. 31 shows equi-contrast curves of Comparative Example 7.

What is claimed is:

1. An optical film comprising a first liquid crystalline polymer selected from the group consisting of polyesters, polyamides, polyimides, polycarbonates and polyesterimides which has at one or both ends of the polymer chain a monofunctional structural unit selected from the group consisting of

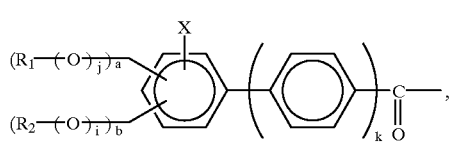

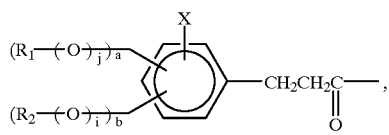

-continued

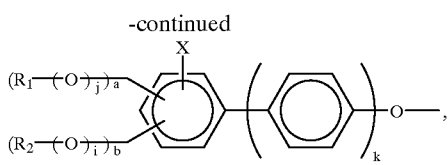

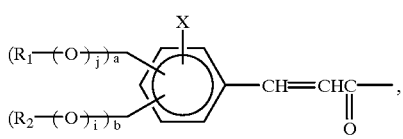

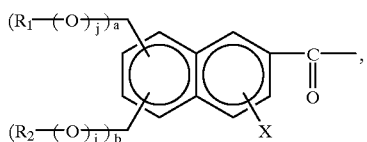

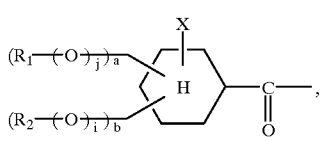

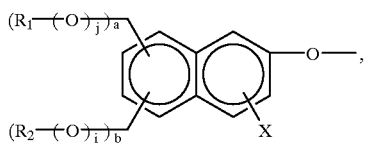

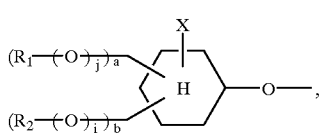

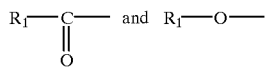

wherein $R_1$ and $R_2$ may be the same or different; $R_1$ and $R_2$ are a $C_3$–$C_{20}$ alkyl or a $C_2$–$C_{20}$ fluoroalkyl group; X is hydrogen or halogen; i is 0 or 1; j is 0 or 1; k is 0 or 1; a is 0 or 1; and b is 0 or 1, with the proviso that $a+b \neq 0$;

said first liquid crystalline polymer homeotropically oriented exhibiting optically positive uniaxiality wherein a nematic hybrid orientation, created in a liquid crystalline state, is immobilized; and a second liquid crystalline polymer which has a logarithmic viscosity at least 0.01 dl/g higher than that of said first liquid crystalline polymer and a glass transition point at least 5° C. higher than that of said first liquid crystalline polymer and which exhibits optically positive uniaxiality.

2. The optical film according to claim 1, wherein the second liquid crystalline polymer is homogeneously or homeotropically oriented.

3. The optical film according to claim 1, wherein the amount of the first liquid crystalline polymer contained in the optical film is 5 to 70 wt %.

4. An optically compensating film which is used for a liquid crystal display element and which is composed of the optical film according to claim 1.

5. A twisted nematic liquid crystal display device comprising at least an active liquid crystal cell having a pair of transparent substrates each provided with an electrode and a nematic liquid crystal together with an upper polarizer and a lower polarizer positioned, respectively, over and under the substrate, wherein at least one optical film according to claim 1 is positioned either between the substrate and the upper polarizer or between the substrate and the lower polarizer or both between the substrate and the upper polarizer and between the substrate and the lower polarizer.

6. The optical film of claim 1 where X is hydrogen, fluorine or chlorine.

* * * * *